United States Patent [19]

Edstrom et al.

[11] 3,798,613

[45] Mar. 19, 1974

[54] CONTROLLING PERIPHERAL SUBSYSTEMS

[75] Inventors: Gene H. Edstrom, Longmont; Edward P. Lutter, Boulder; Francis L. Robinson, Longmont, all of Colo.

[73] Assignee: International Business Machines Corporation, Armonk, N.Y.

[22] Filed: Oct. 27, 1971

[21] Appl. No.: 194,079

[52] U.S. Cl. .............................................. 340/172.5
[51] Int. Cl. ........................ G05b 19/22, G06f 11/04
[58] Field of Search .................. 340/172.5; 235/153

[56] References Cited

UNITED STATES PATENTS

| | | | |
|---|---|---|---|
| 3,568,160 | 3/1971 | Talarczyk | 340/172.5 |
| 3,570,006 | 3/1971 | Hoff et al. | 340/172.5 |
| 3,573,741 | 4/1971 | Gavrn | 340/172.5 |
| 3,201,760 | 8/1965 | Schrimpf | 340/172.5 |
| 3,234,523 | 2/1966 | Blixt et al. | 340/172.5 |
| 3,268,872 | 8/1966 | Kimlinger | 340/172.5 |
| 3,325,788 | 6/1967 | Hackl | 340/172.5 |
| 3,343,141 | 9/1967 | Hackl | 340/172.5 |
| 3,344,403 | 9/1967 | Foulger et al. | 340/172.5 |
| 3,386,082 | 5/1968 | Stafford et al. | 340/172.5 |
| 3,434,112 | 3/1969 | Yen | 340/172.5 |
| 3,462,741 | 8/1969 | Bush et al. | 340/172.5 |
| 3,518,632 | 6/1970 | Threadgold et al. | 340/172.5 |
| 3,525,080 | 8/1970 | Couleur et al. | 340/172.5 |
| 3,654,617 | 4/1972 | Irwin | 340/172.5 |
| 3,659,273 | 5/1972 | Knauft et al. | 340/172.5 |
| 3,633,178 | 1/1972 | Zopf | 340/172.5 |
| 3,550,133 | 12/1970 | King et al. | 340/172.5 |
| 3,500,328 | 3/1970 | Wallis | 340/172.5 |
| 3,462,741 | 8/1969 | Bush et al. | 340/172.5 |
| 3,411,143 | 11/1968 | Beausoleil et al. | 340/172.5 |
| 3,303,476 | 2/1967 | Moyer et al. | 340/172.5 |

*Primary Examiner*—Gareth D. Shaw
*Assistant Examiner*—Jan E. Rhoads
*Attorney, Agent, or Firm*—Herbert F. Somermeyer

[57] ABSTRACT

In a set of chained I/O commands, a controller sets up a mode of operation other than that normally executed. Such mode is maintained for all chained commands by a control signal, such as SUPPRO, supplied over the I/O channel to the controller. Upon deletion of the control signal, the I/O controller automatically resets to a normal mode. In a variation, an EXECUTE signal is supplied together with the SUPPRO signal. The I/O controller responds to the EXECUTE signal to execute commands in accordance with the mode previously set up. With the EXECUTE signal being deleted for a given command, chained to the mode set-up command and with SUPPRO maintained, the I/O controller executes the command in a normal mode and then resets to the commanded or imposed mode for subsequently chained commands. Another aspect is exchanging microprogram control signals between loosely coupled systems for effecting a greater variety of programmed interrelationships while maintaining the loose coupling. A further aspect is enlarged usage of microprogramming techniques.

16 Claims, 36 Drawing Figures

PATENTED MAR 19 1974

3,798,613

SHEET 04 OF 26

CONTROLLING PERIPHERAL SUBSYSTEMS

DOCUMENTS INCORPORATED BY REFERENCE

Commonly assigned patent application, John W. Irwin, Ser. No. 077,088, filed Oct. 1, 1970, now U. S. Pat. No. 3,654,617, discloses an environment in which the present invention may be practiced. particularly I/O controller 11 of the Irwin application shows an I/O controller in which the programs described in this application may be resident in order to accomplish the objectives of the present invention. That application also discloses sets of programs resident in such I/O controller which execute functions during the normal mode of operation. The description in this specification complements that of the Irwin application in showing how a CPU can more intimately control a programmable controller for enhancing the versatility of a data processing system. The term microprogram as used by Irwin is termed "program" herein.

Commonly assigned patent application, G. H. Edstrom, Ser. No. 169,193, filed Aug. 5, 1971, relates to the present invention in that the mode of operation of an I/O controller is modified with such modification being maintained in the I/O controller until receipt of an entirely new peripheral subsystem operation as indicated by a start I/O (SIO) command. The modified mode of operation, as taught in that case, is maintained whether or not chaining or the control signal is maintained from the controlling system to the I/O controller.

Gregory et al U S. Pat. No. 2,960,683, illustrates an I/O controller in a tape environment.

Moyer et al. U.S. Pat. No. 3,303,476, shows an I/O channel usable with the present invention.

Hackl U.S. Pat. No. 3,343,141 shows extrinsic variation of a microprogram.

Beausoleil U.S. Pat. No. 3,368,207 shows file protection in I/O storage.

Marsh et al. U.S. Pat. No. 3,377,619 shows initial selection procedures for an I/O subsystem.

Amdahl et al. U.S. Pat. No. 3,400,371 shows a CPU.

Brown et al. U.S. Pat. No. 3,404,376 illustrates an I/O controller in a tape environment.

Bush et al. U.S. Pat. No. 3,462,741 shows transferring control signals between two systems.

Wallis U.S. Pat. No. 3,500,328 shows a microprogrammed controller.

Beausoleil et al. U.S. Pat No. 3,336,582; Beausoleil et al. U.S. Pat. No. 3,411,143; and King et al. U.S. Pat. No. 3,550,133; show instruction, CAW's, CCW's, and the relationship between a CPU and peripheral subsystems and channels.

BACKGROUND OF THE INVENTION

The present invention relates to interaction of a controlling data processing system and a controlled peripheral data processing subsystem, particularly as to enhancing the variety of functions performed under commands supplied to the peripheral subsystem. It also relates to programmed interaction between loosely coupled data-handling systems.

The present invention is particularly useful in connection with diagnostic procedures automatically invoked by a data processing system to determine the quality of performance of a peripheral subsystem. Additionally, the invention has application where virtual operating modes are desired to be invoked by a controlling data processing system. The present invention facilitates programmed effected intimate control over such virtual modes by the controlling data processing system.

As set forth in some of the documents incorporated by reference, concurrent diagnostic procedures in data processing peripheral subsystems are an important feature for ensuring reliable and high-quality operation. Communication between a controlling data processing system and any of its peripheral subsystems is by a channel having a limited number of lines. Generally, CCW's (channel control words) carry commands and various code permutations which are interpreted by the peripheral subsystem for invoking peripheral subsystem functions related to data processing operations being executed in a connected central processing unit (CPU). Since each CCW is of finite size, a limited number of code permutations can be transmitted to a peripheral subsystem within a given set of CCW's. It has also been the practice to associate data bytes with channel commands to indicate data field lengths, addressing limitations, search keys, and the like. These bytes are used in connection with the execution of a command following preset sequences. Coaction between such systems is a loose coupling.

It is well known that chaining dedicates an I/O subsystem to a CPU via a given channel. In systems manufactured by the International Business Machines Corporation, a signal called "suppress out" (SUPPRO), associated with commands supplied through the channel to the peripheral subsystem, is a control signal indicating chaining; and the I/O subsystem must respond to such SUPPRO for each command to maintain the chain in a sequence of channel commands. Such chaining is useful in diagnostic procedures and in imposed modes of operations in that no other CPU may get access to a peripheral subsystem during such operations. Such chaining thereby prevents errors from being introduced into the system.

In a prior subsystem operating with an International Business Machines Corporation central processing unit, chaining using SUPPRO was an indicia for maintaining a diagnostic mode in a peripheral subsystem in accordance with the below flowchart.

CCW-1 — DIAGNOSTIC MODE command having code 0B. Maintain chaining with SUPPRO. This CCW initiates a diagnostic mode in the peripheral subsystem. Diagnostic flags are set in an I/O controller for that subsystem.

CCW-2 — This CCW must contain a WRITE I/O command. If not, the peripheral subsystem did not respond; that is, the I/O command would be erased with all operations performed as usual. On the other hand, upon completion of the WRITE command, diagnostic mode is automatically reset irrespective of the chaining condition imposed upon the peripheral subsystem by the CPU.

Additionally, if SUPPRO was not maintained between CCW-1 and CCW-2, the diagnostic mode was reset; and the WRITE command would be executed in a normal manner. Accordingly, in this prior system, the two CCW's were intimately related such that the effect on a total system operation is that the two CCW's are in effect a single command split between two CCW's for effecting additional code permutations. Operation of that peripheral subsystem with the limited response did not provide for completely diagnosing the system. Also, the effect on the CCW interpretation was limited to a particular subset of code permuations in a set of two CCW's.

For diagnostic and imposed mode operational purposes, it is desired to have a greater flexibility in the I/O command structure for more completely diagnosing peripheral subsystem operation or enhancing programmed control while maintaining a loose intersystem coupling.

As a greater variety of peripheral subsystem functions are incorporated, the various commands supplied to the subsystem for effecting a greater variety of such functions tax the capability of CCW's. For example, in magnetic tape subsystems, there is an increasing number of types of modes of operation all requiring forward and backward compatibility of the subsystem with various operating systems and devices. Peripheral subsystems can be constructed to accommodate all of such variations in modes of operation by adding circuitry to the I/O controller and to the various tape handlers. Certain economies of operation can be effected if the data processing system, through its CCW's, can impose different operating states in the peripheral subsystem through microprogram means without the additional circuits and still effect such additional functions. This problem also arises in multiprocessing and parallel processing environments. Programmed interaction can be of significance to processing efficiencies.

Accordingly, it is desired that the interrelationships between data processing systems and peripheral data processing subsystems receive greater flexibility in the command structures.

SUMMARY OF THE INVENTION

It is an object of the present invention to provide a greater versatility in inter-system program operation by enabling selective imposition of various modes of operations under intimate control of a controlling data processing system with respect to another data processing system.

In accordance with one aspect of the present invention, a set of chained I/O commands is supplied by a CPU to a peripheral subsystem wherein one of the commands forces the peripheral subsystem to assume a given mode of operation and to maintain such mode for a plurality of additional commands and only so long as the chaining is maintained. In another aspect, an additional EXECUTE signal is supplied along with the chaining signal and requires the peripheral subsystem to execute all chained commands in accordance with the imposed mode so long as the chaining signal and the EXECUTE signal are simultaneously received. If the EXECUTE signal is not sent with a given command, with the chaining being maintained, that particular command is executed in the normal mode; however, the imposed mode is maintained for subsequently received chained commands associated with the EXECUTE control signal. In this manner, a command signal supplied by a CPU to a peripheral subsystem is subject to various interpretations in accordance with the control signals supplied to the peripheral subsystem.

Such arrangements enable illegal or improper sequences of commands to be executed by a peripheral subsystem for invoking desired responses in accordance with a program of instructions in the controlling system.

In yet another aspect, a microprogram control of one data processing system by another data processing system is accomplished via a loosely coupled data link. A further aspect is "inverse microprogramming" wherein microprogram tests determine function rather than data flow constraints and commands or instructions relate to data flow rather than function. Such inverse microprogramming may be interleaved with usual microprogramming for added versatility.

The foregoing and other objects, features, and advantages of the invention will be apparent from the following more particular description of the preferred embodiments of the invention as illustrated in the accompanying drawings.

BRIEF DESCRIPTION OF THE DRAWINGS

FIG. 8 – IDLESCAN in MPUX.
FIG. 9 – IDLESCAN in MPUY.

Figure 10:
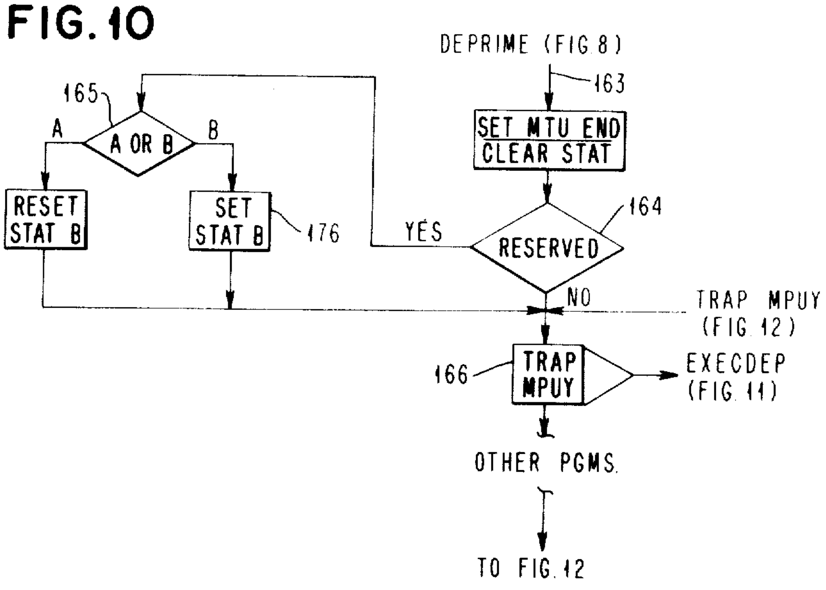
Figure 11:
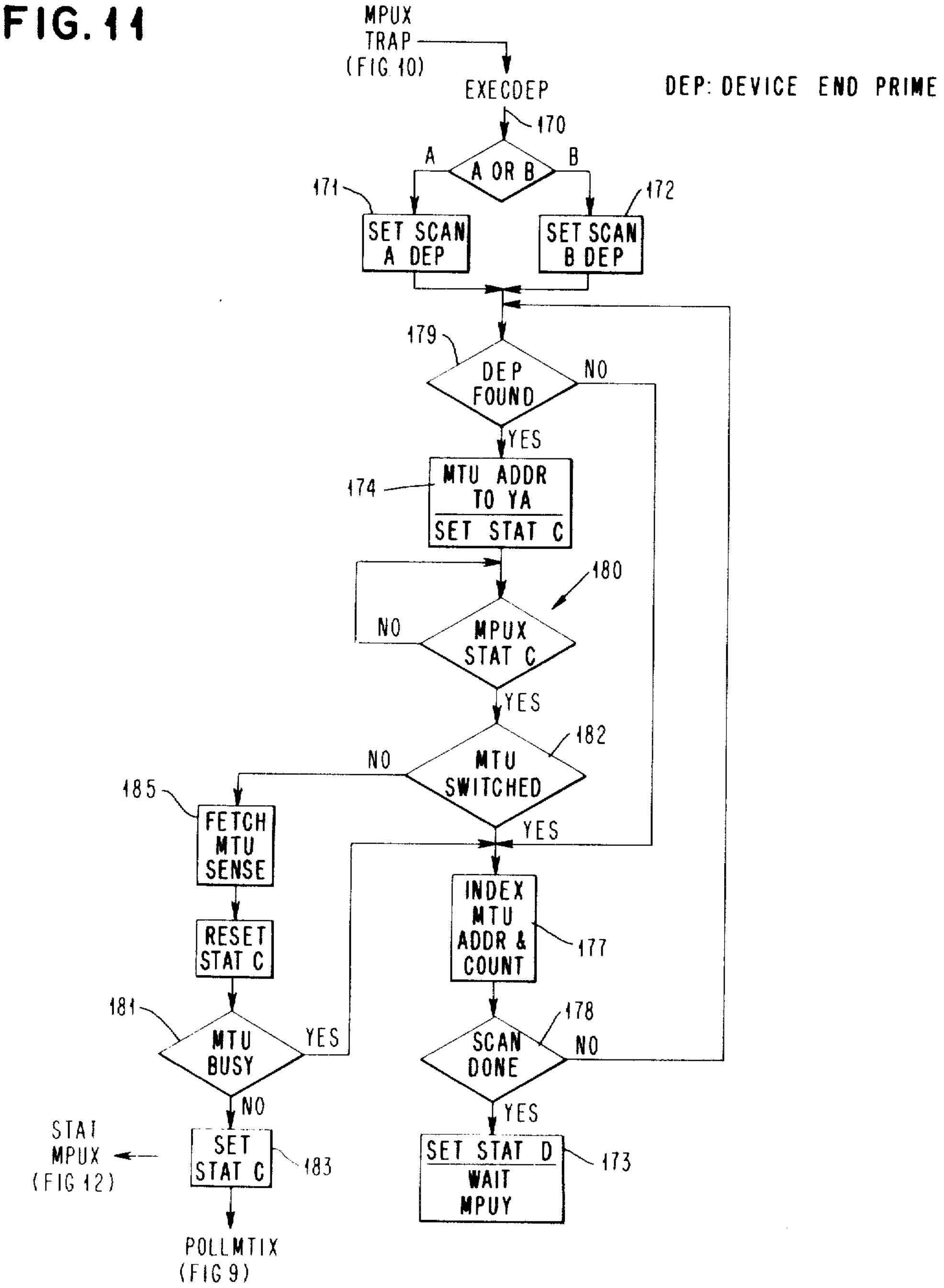
Figure 12:
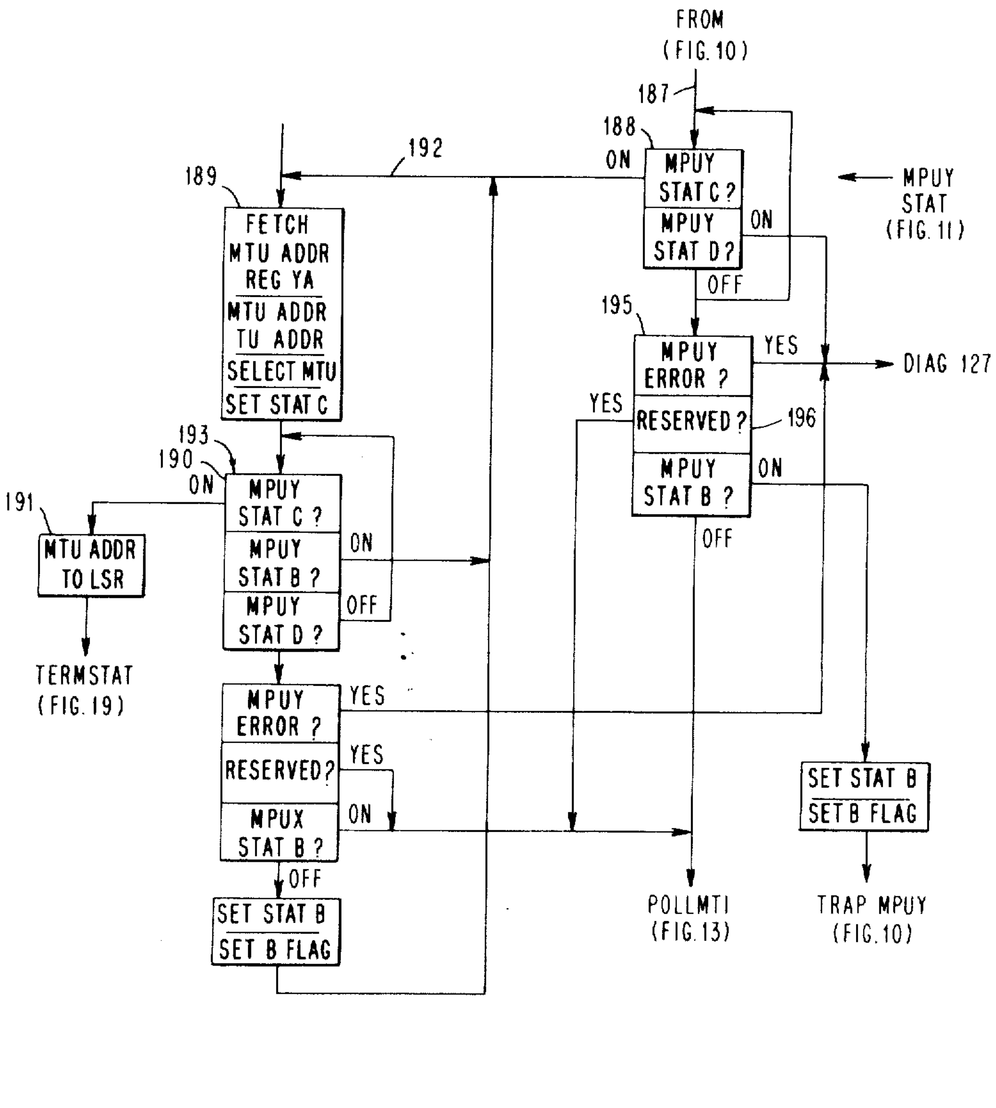
Figure 13:
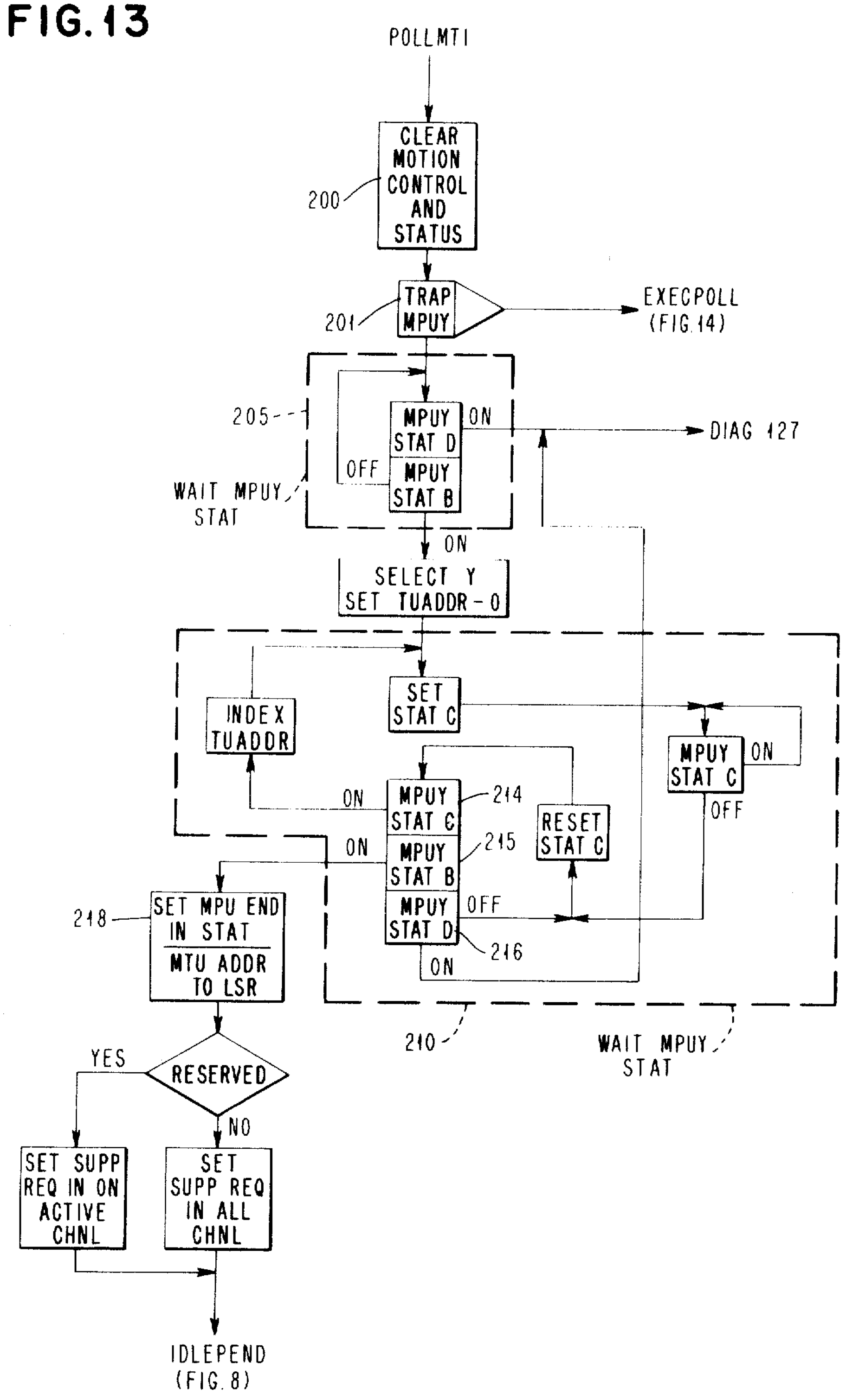
Figure 14:
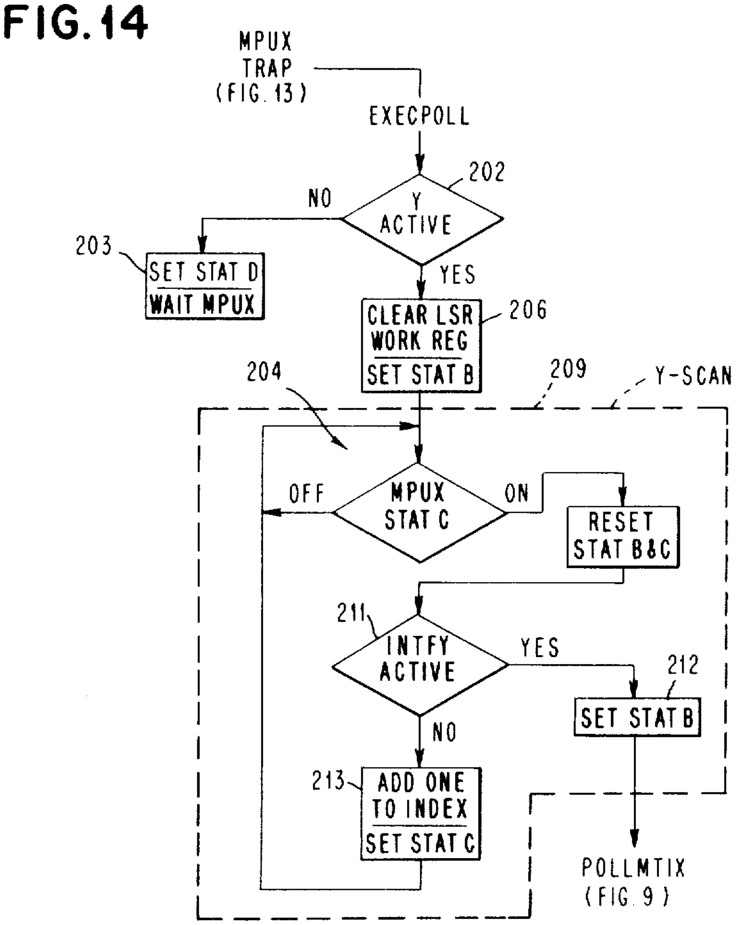

The function of interrupt scanning is shown in:

FIG. 10 – DEPRIMES in MPUX.
FIG. 11 – POLL DEPRIMES in MPUY.
FIG. 12 – MPUX checking MPUY status and verifying on MTU address received from interface X (INTFX).
FIG. 13 – MPUX polling interface Y (INTFY).
FIG. 14 – MPUY polling interface Y (INTFX).

MPUX MICROPROGRAMS

Figure 15:
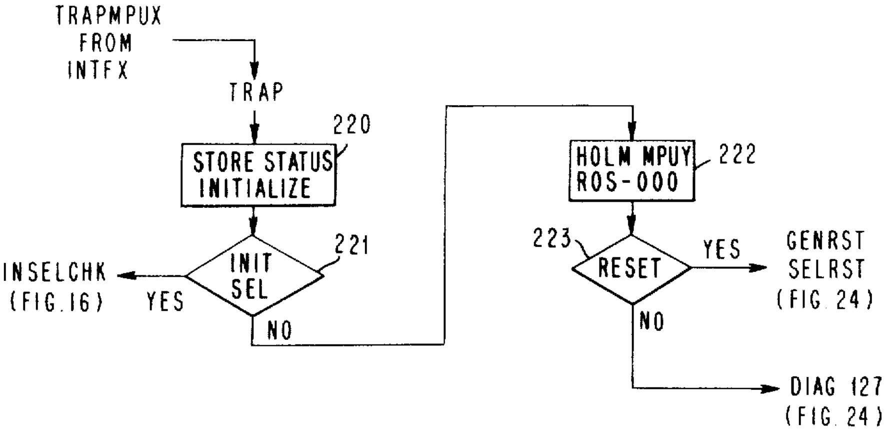
Figure 16:
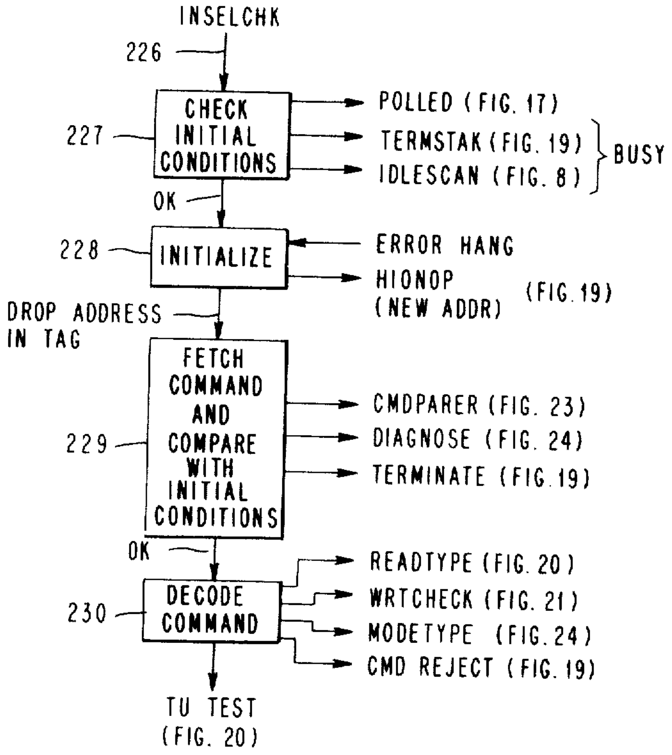
Figure 17:
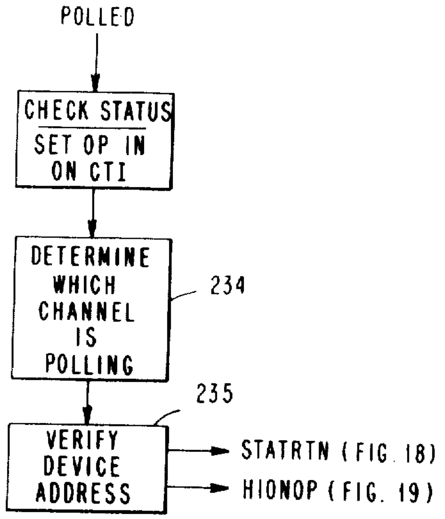
Figure 18:
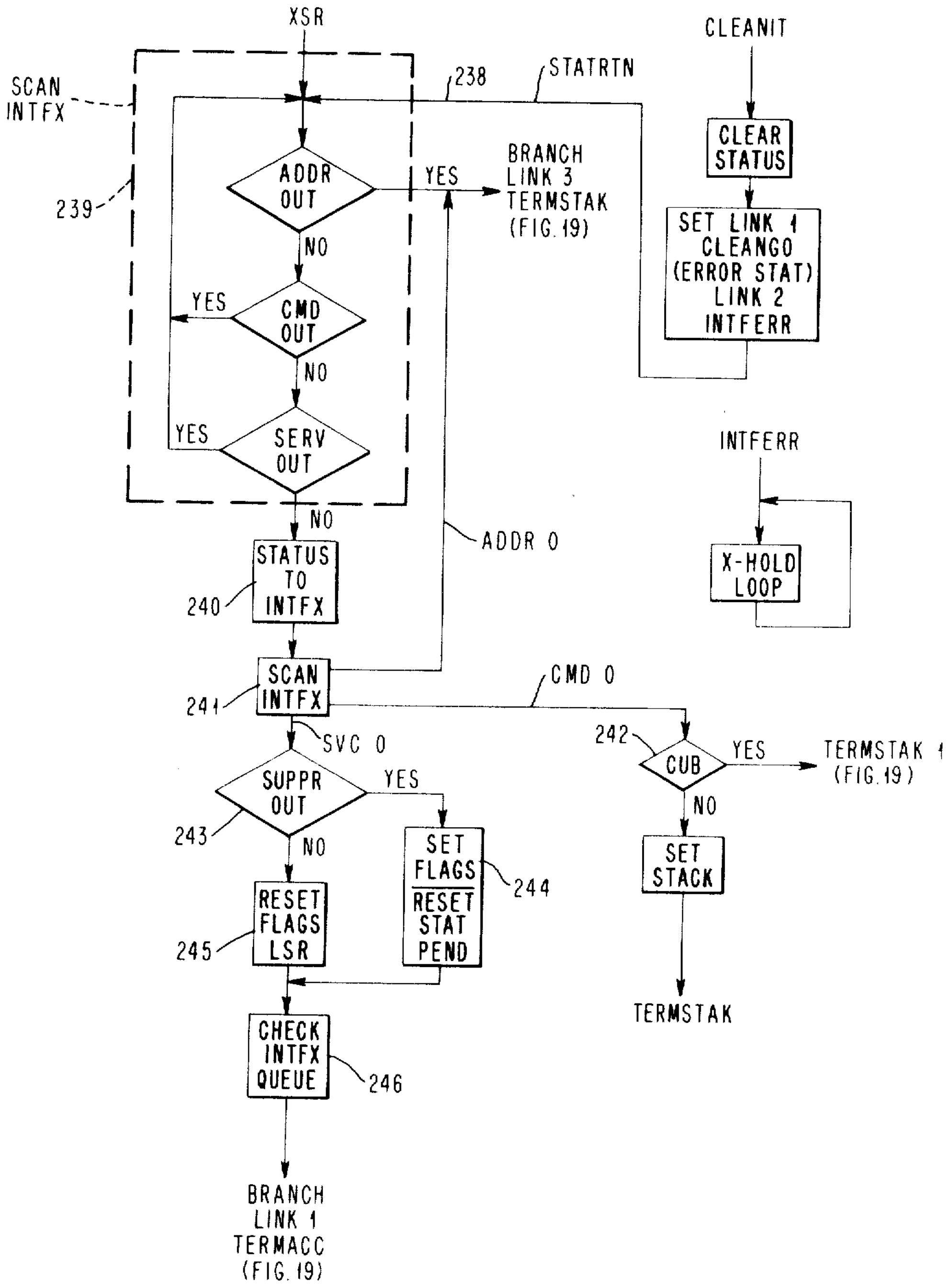
Figure 19:
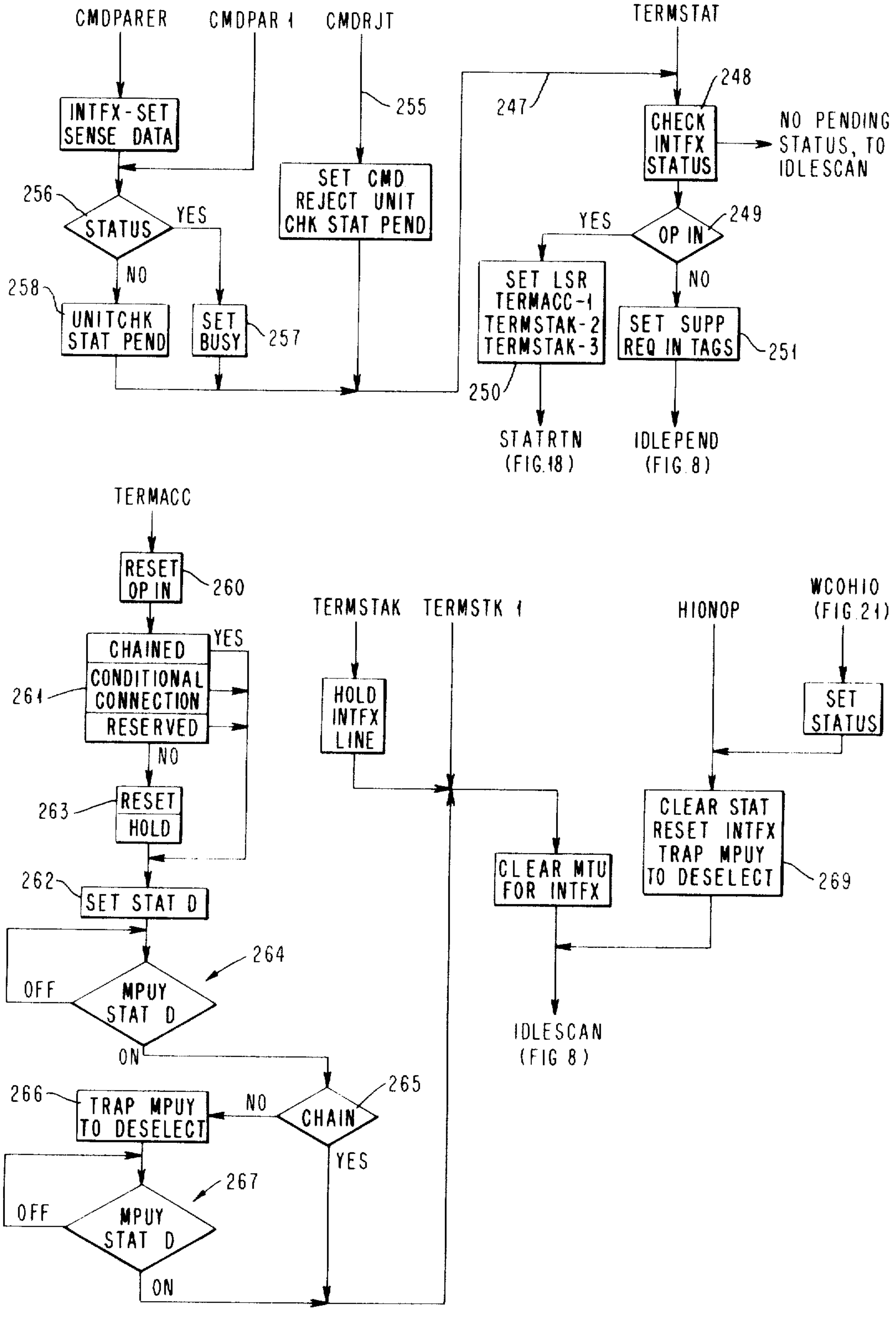
Figure 20:
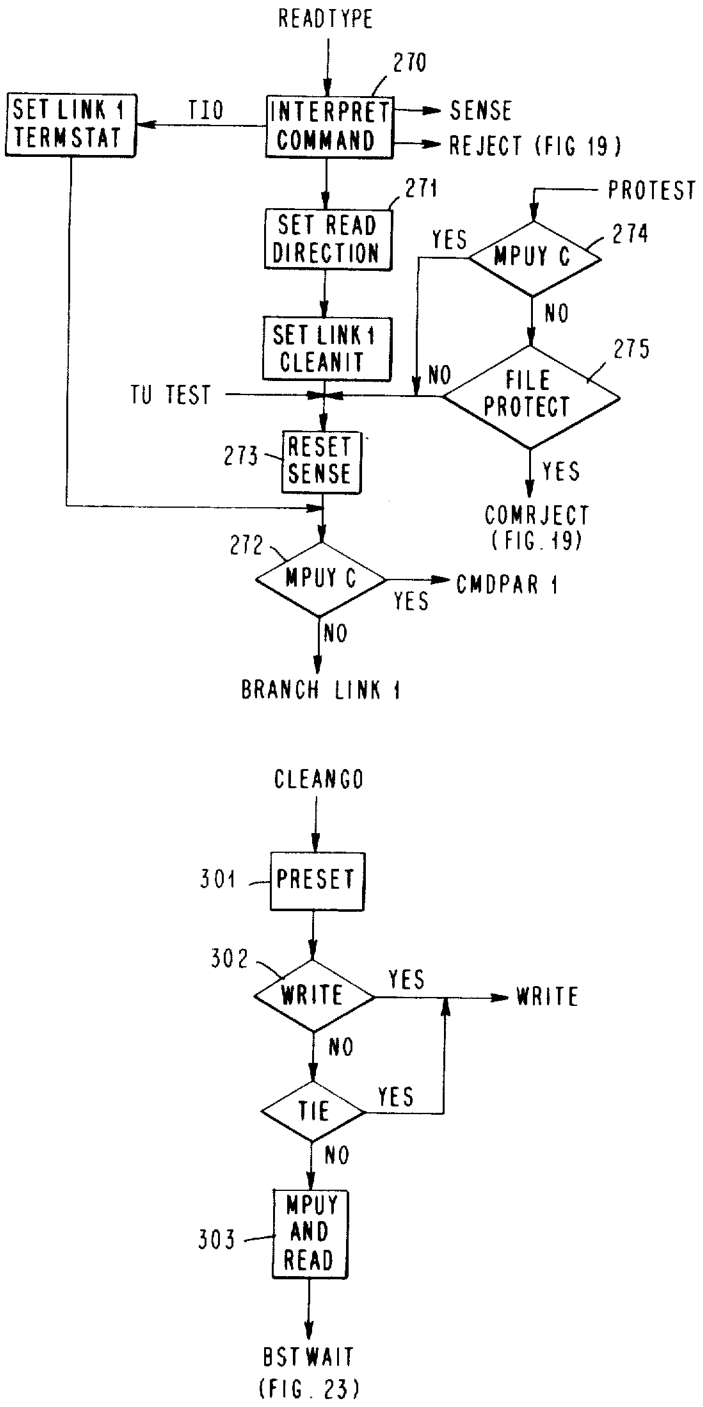
Figure 21:
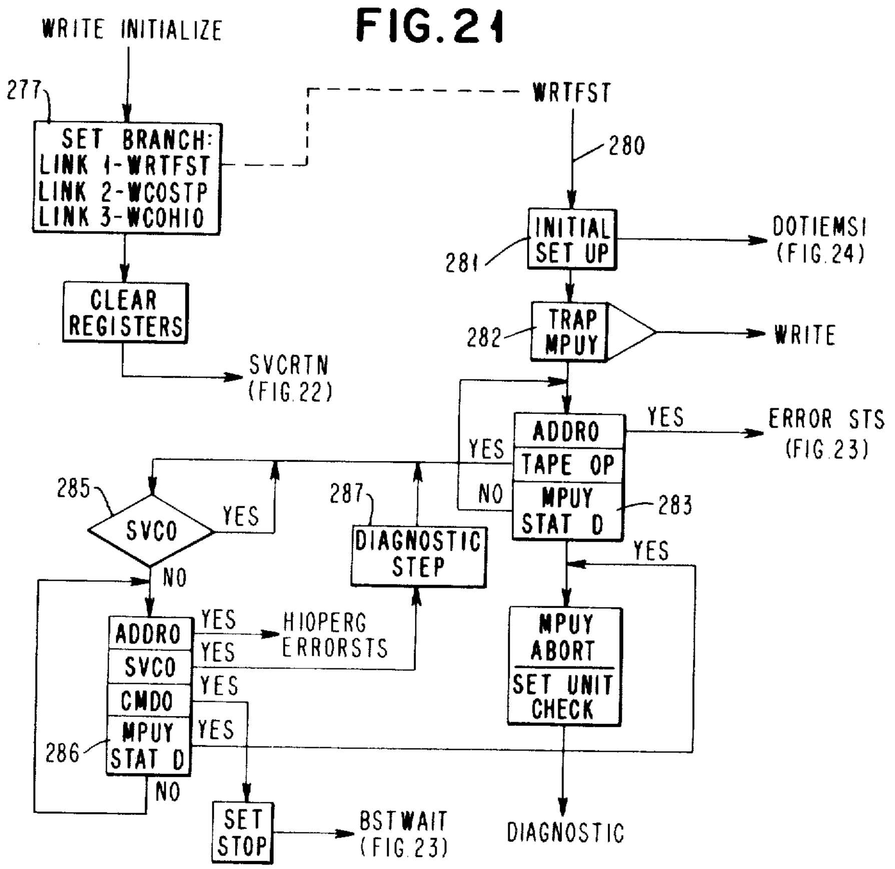
Figure 22:
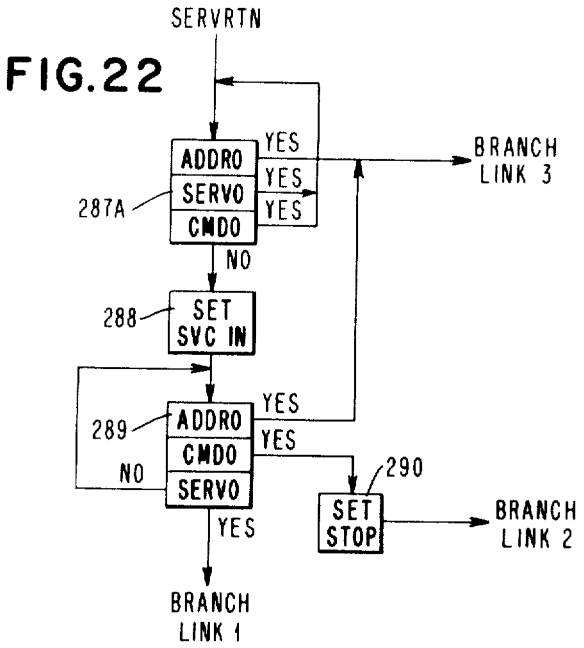
Figure 23:
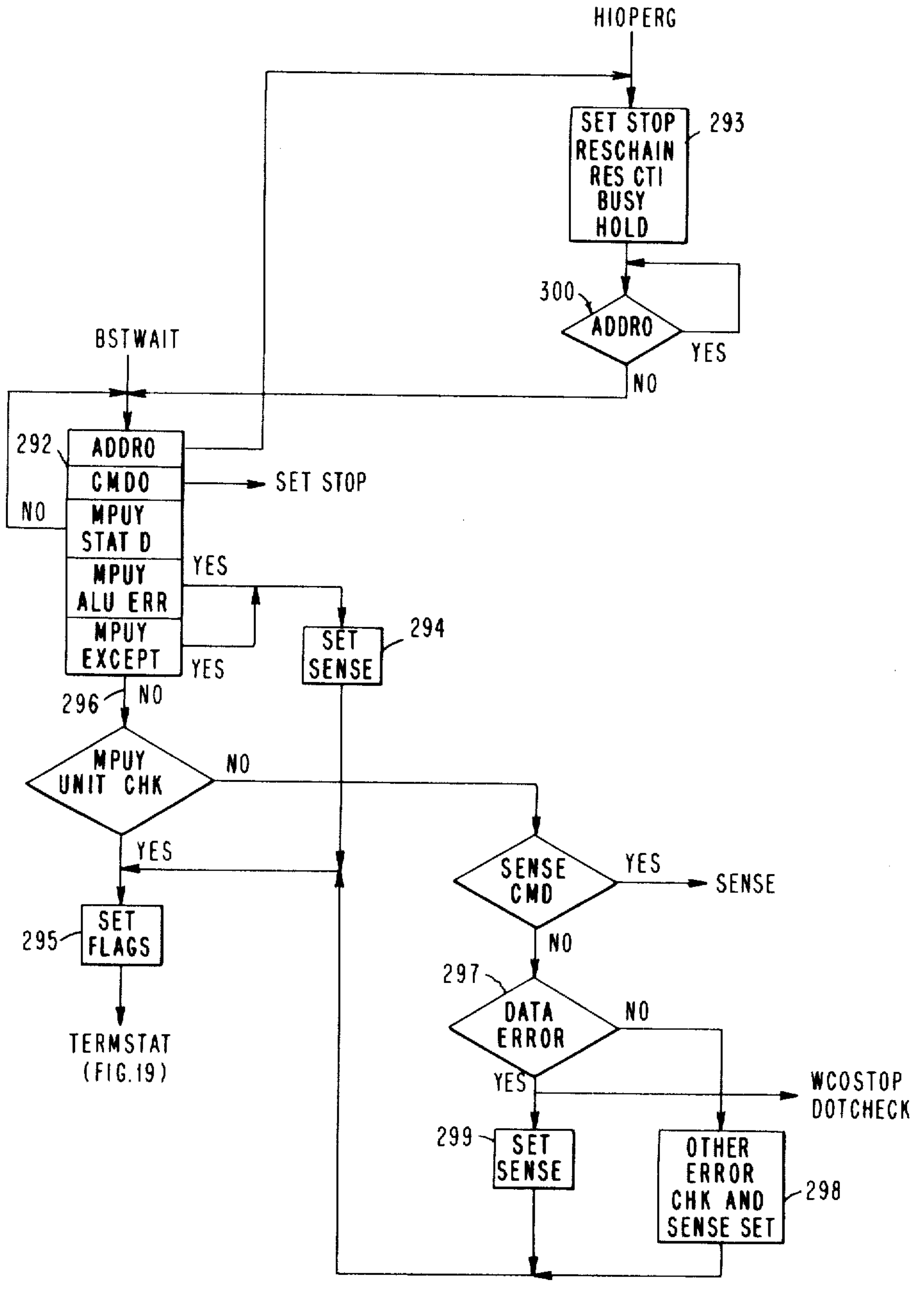
Figure 24:
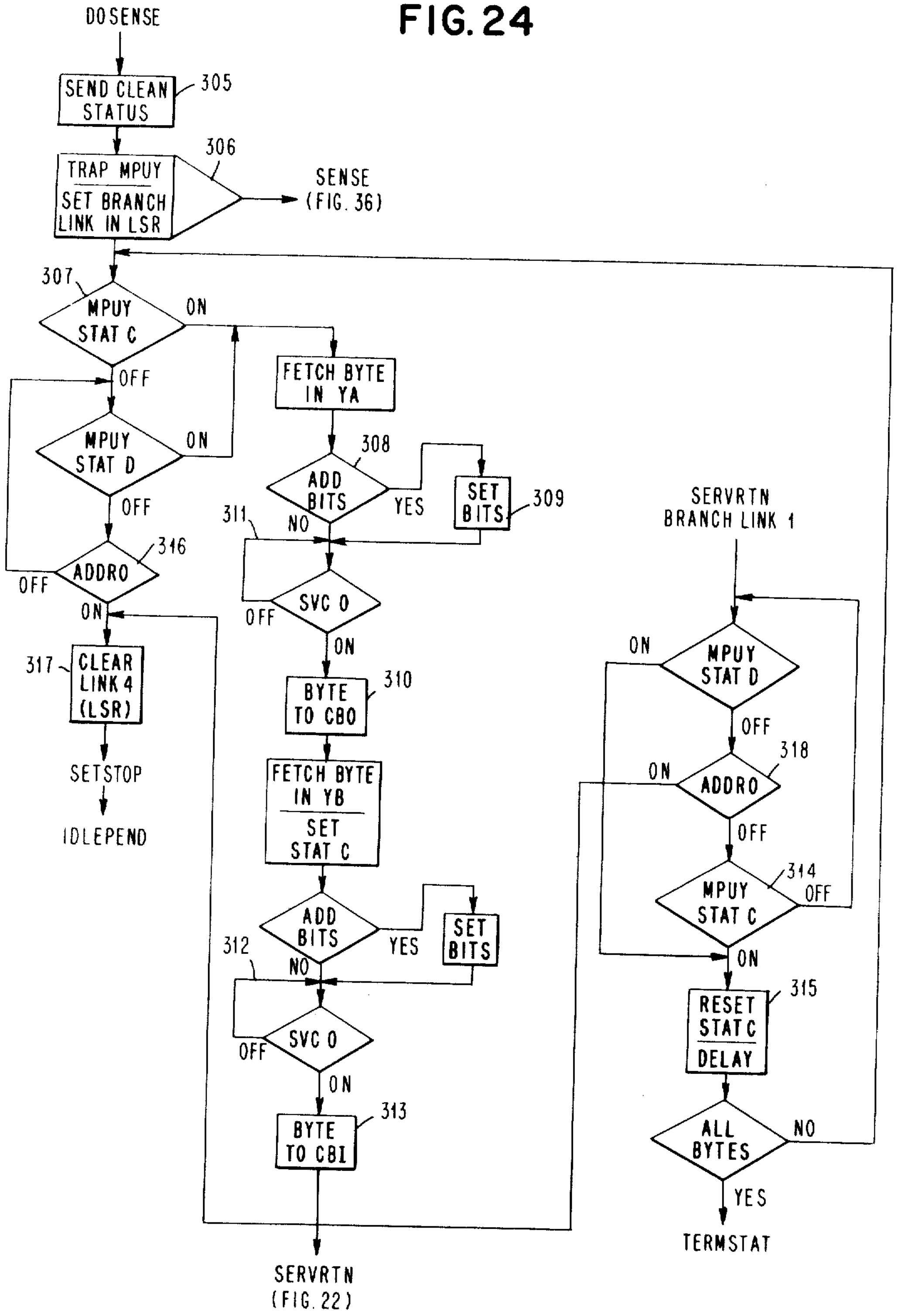

FIG. 15 – X-trap.
FIG. 16 – X-initial selection.
FIG. 17 – X-polled.
FIG. 18 – X-status.
FIG. 19 – X-termination.
FIG. 20 – X-read type and MTU tests.
FIG. 21 – X-write.
FIG. 22 – X-service return
FIG. 23 – X-error status.
FIG. 24 – X-sense.

MPUY MICROPROGRAMS

Figures 25, 26:
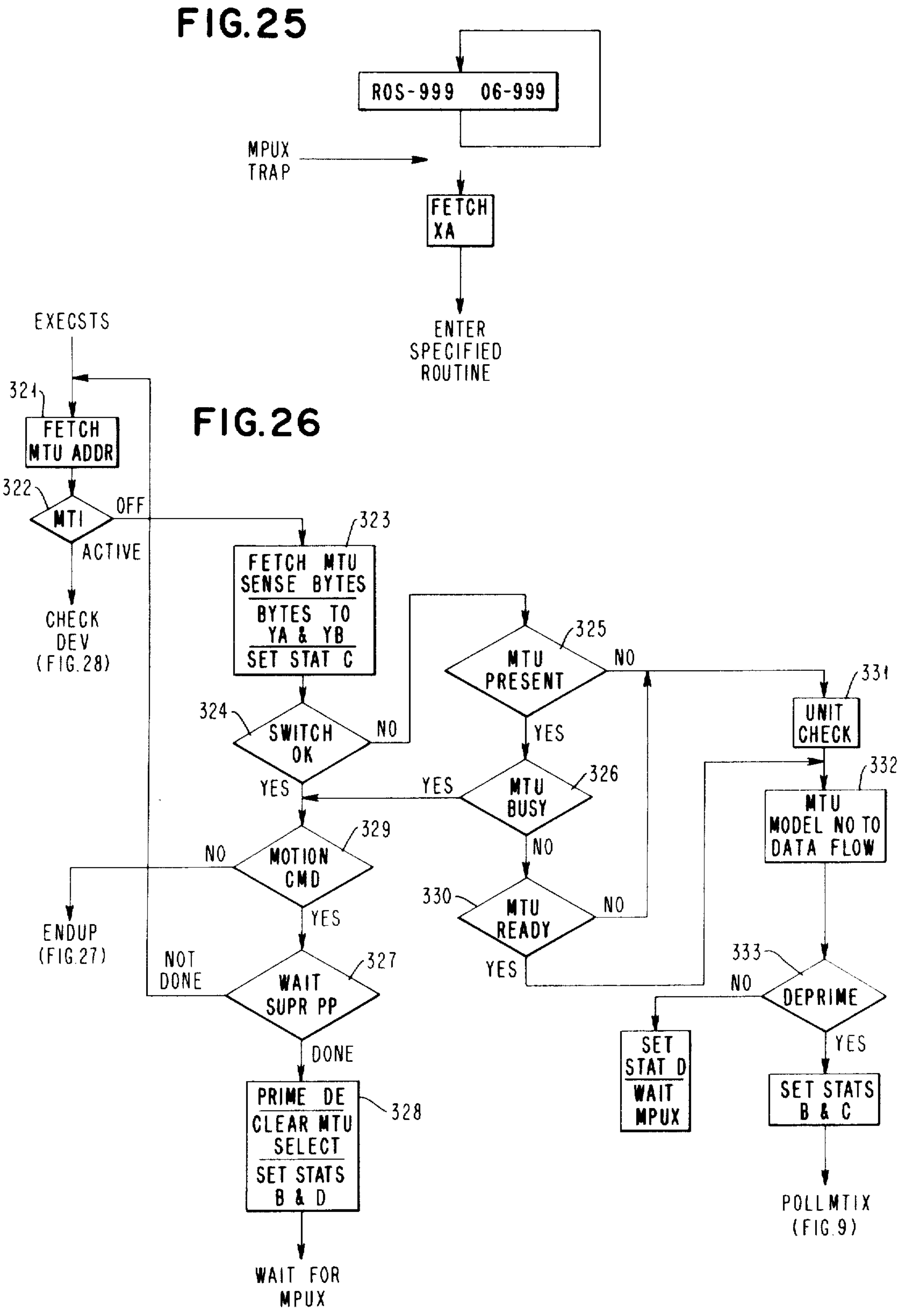
Figures 27, 28:
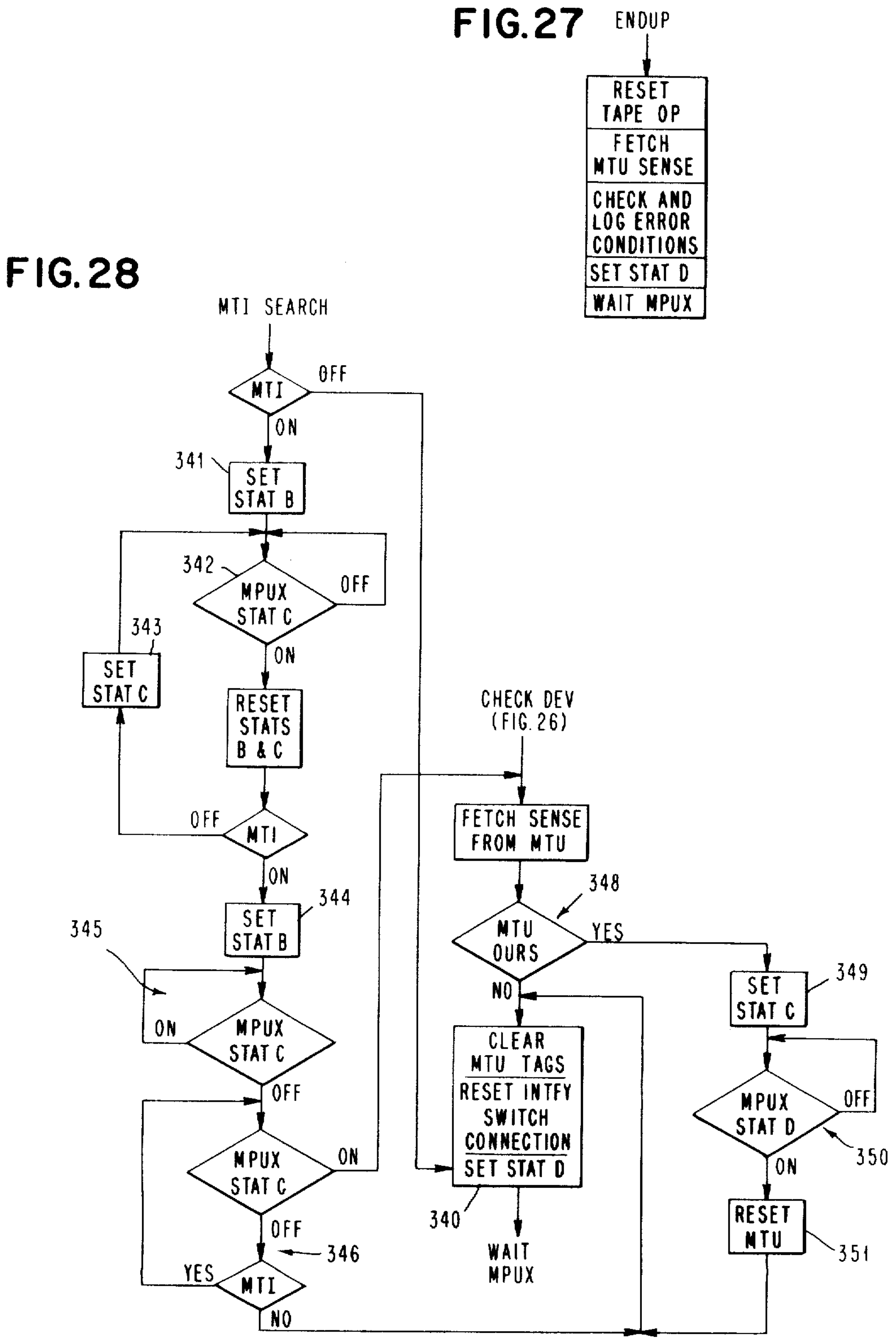

FIG. 25 – Y-trap.
FIG. 26 – Y-initial selection.
FIG. 27 – Y-termination.
FIG. 28 – INTFY search.

Figure 29:
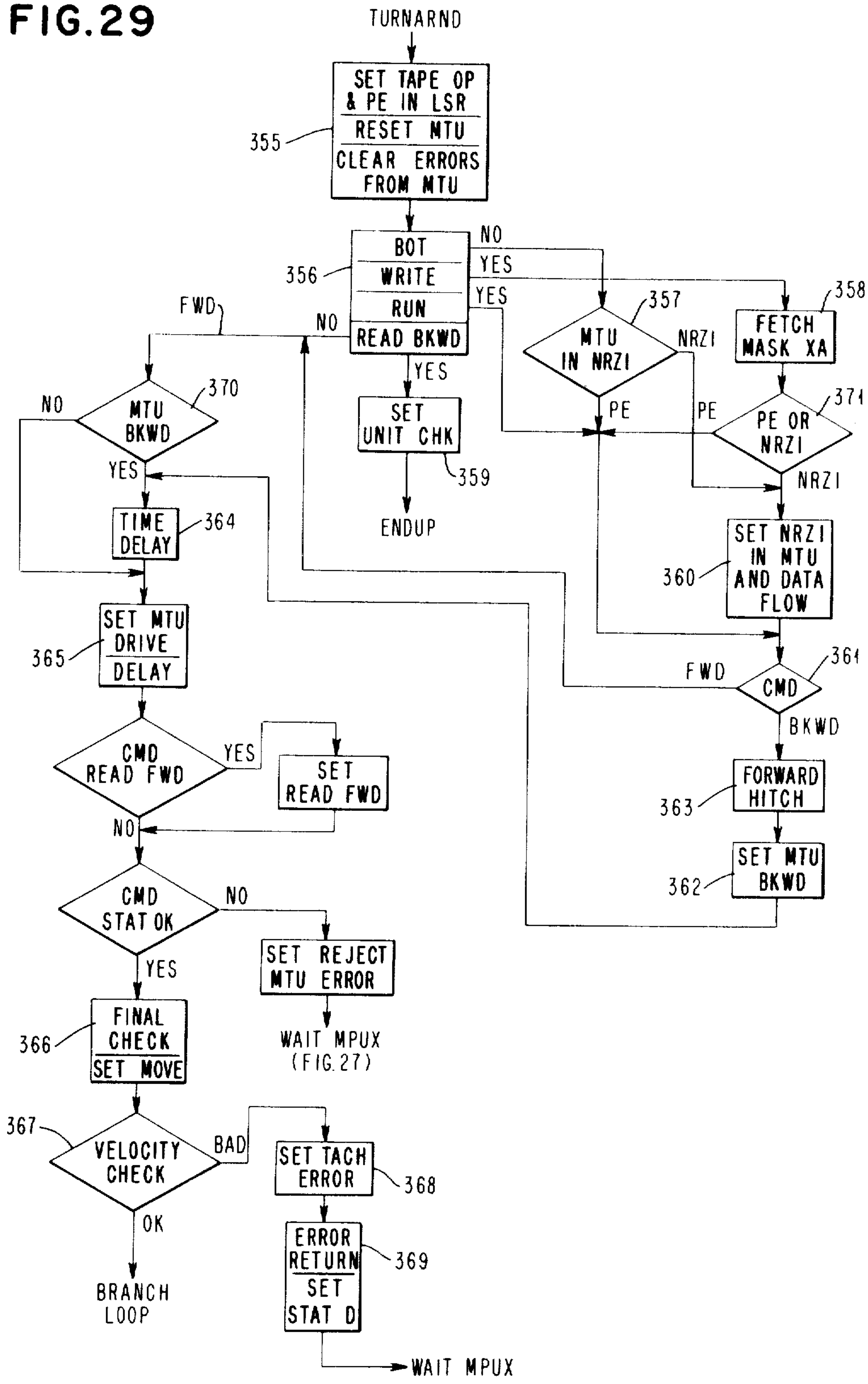
Figure 30:
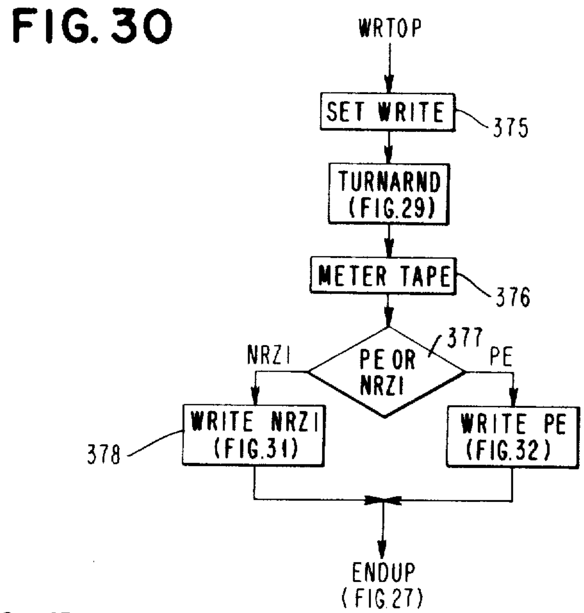
Figure 31:
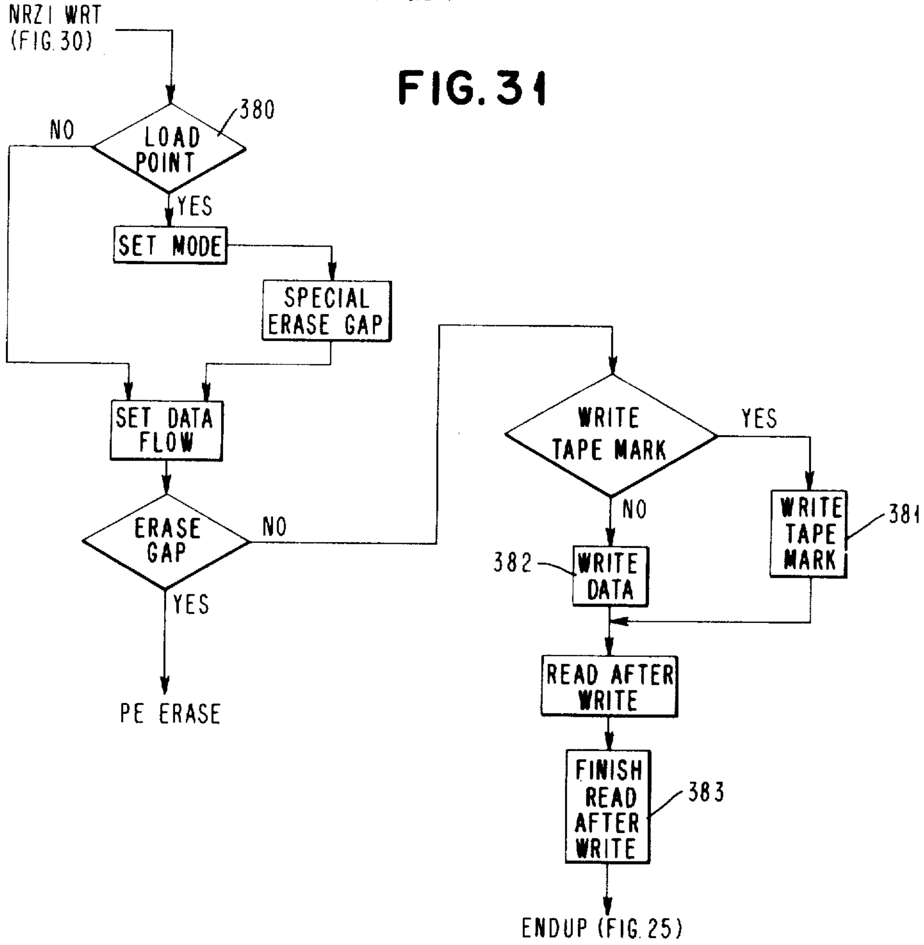
Figure 32:
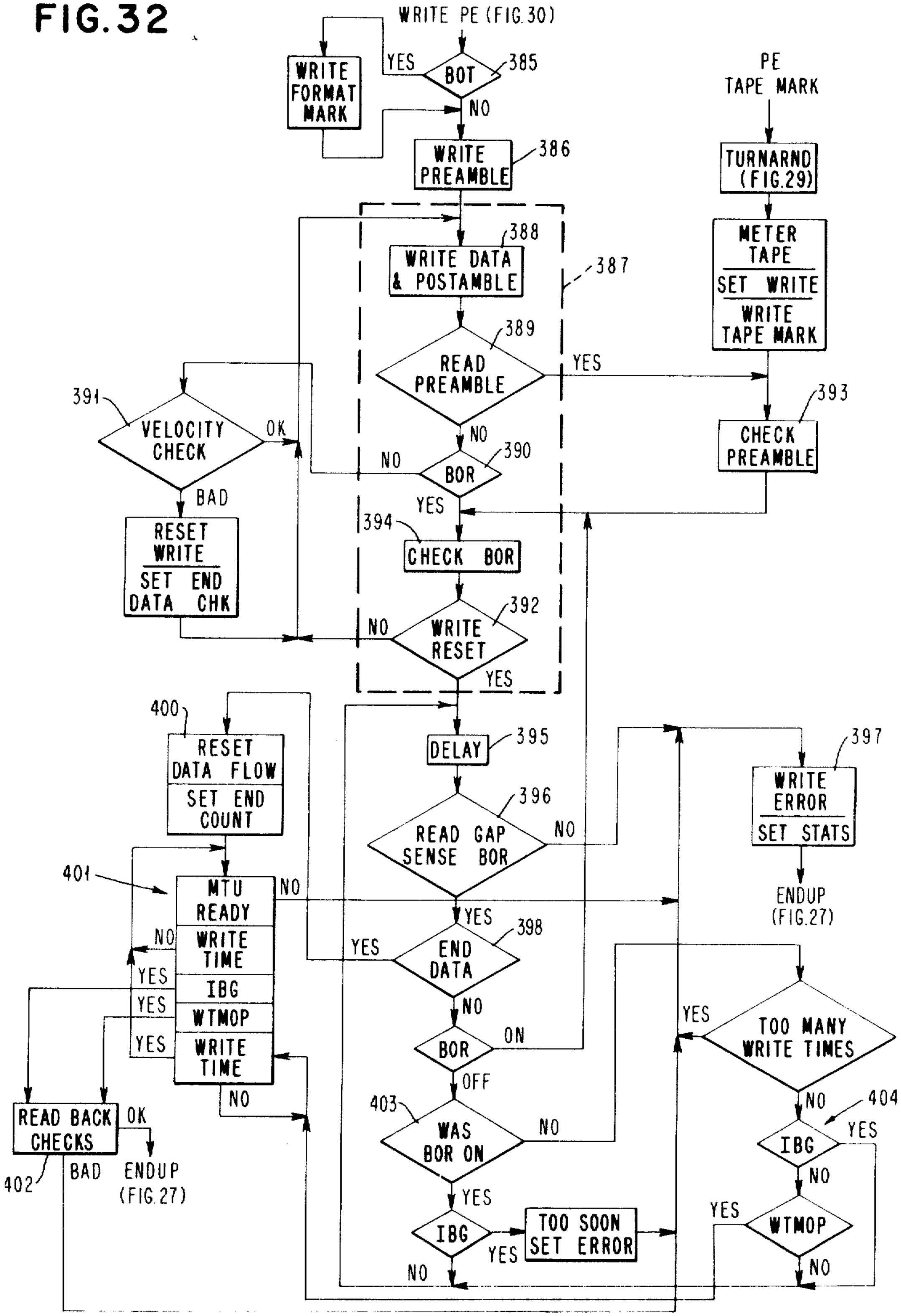
Figures 33, 34:
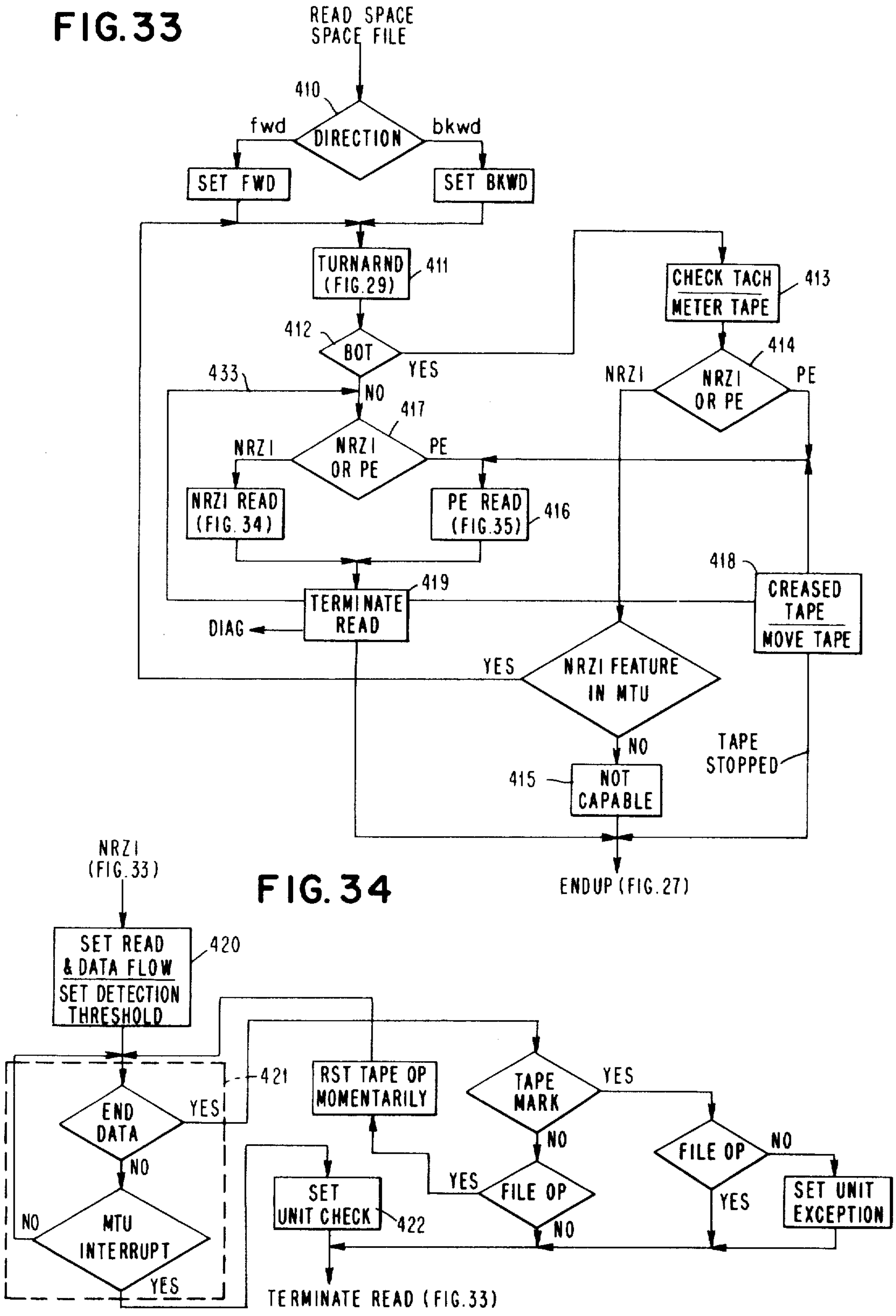
Figure 35:
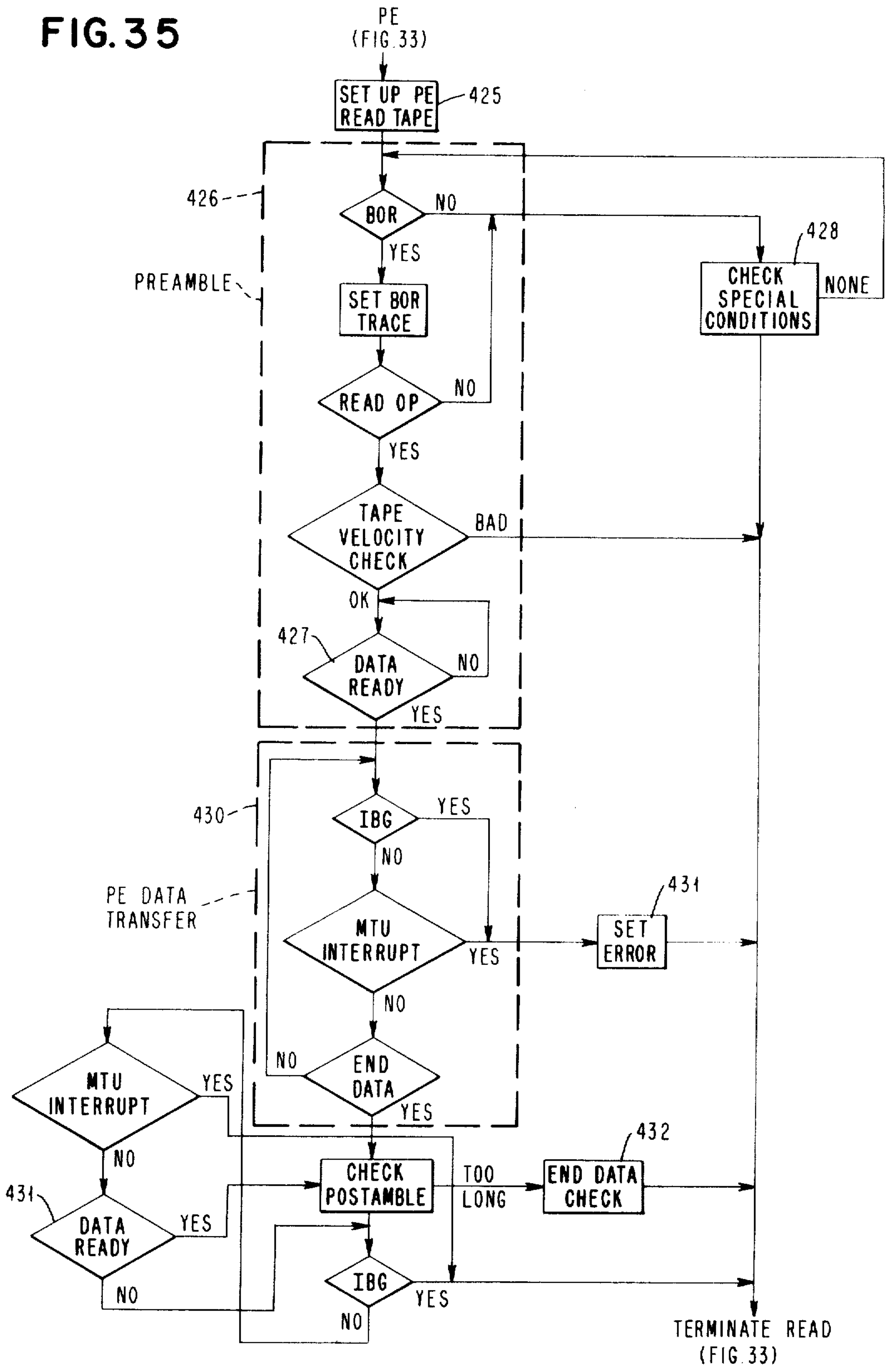
Figure 36:
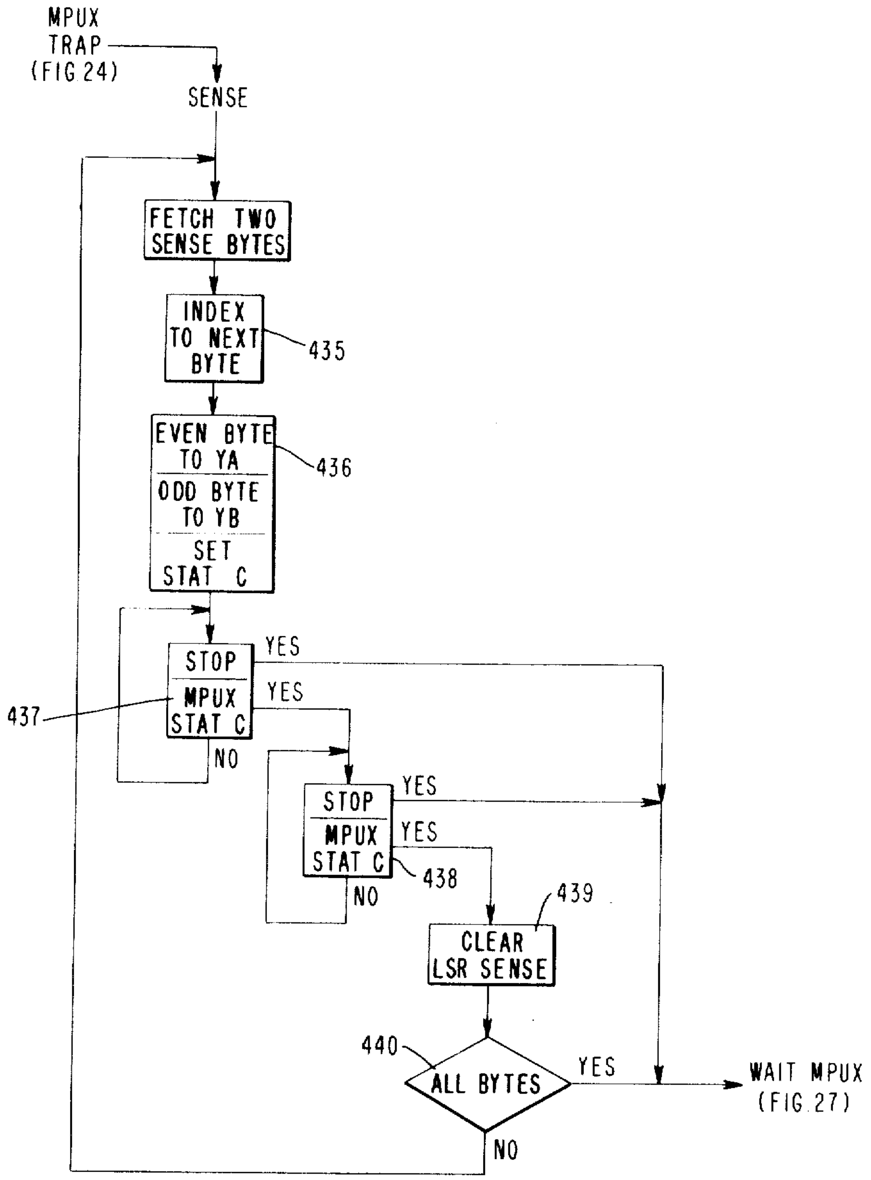

FIG. 29 - Motion control.
FIG. 30 - Y-write.
FIG. 31 - Write NRZI.
FIG. 32 - Write PE.
FIG. 33 - Y-read.
FIG. 34 - Read NRZI.
FIG. 35 - Read PE.
FIG. 36 - Y-sense.

GLOSSARY OF ABBREVIATIONS AND ACRONYMS

This glossary provides a ready reference to the abbreviations repeatedly used in describing the invention:

ADDR — Address
ADDRI — Address In (a tag signal supplied by an I/O controller indicating address signals appear on CBI)
ADDRO — Address Out (a tag signal indicating address signals are being sent in bus out lines)
ALU — Arithmetic-Logic Unit
BKWD — Backward
BLK INT — Block Interrupt (I/O controller flag blocking SUPPRI)
BLK UC — Block Unit Check (I/O controller flag blocking UC status after a burst operation)
BOC — Branch On Condition
BOR — Beginning of Record (remains active during entirety of record readback signal envelope)
BOT — Beginning of Tape
CBI — Channel Bus In (lines for carrying data signals from I/O controller to CPU via INTFX)
CBO — Channel Bus Out (lines for carrying data signals from a channel to an I/O controller)
CCW — Channel Control Word
CHNL — Channel
CMD — Command (a set of control signals)
CMDO — Command OUt (a tag signal telling an I/O controller to change operation in accordance with predetermined criteria)
CPU — Central Processing Unit
CTI — Channel Tag In (a set of lines for tag signals supplied from an I/O controller to a data channel concerning the interpretation of other signals supplied over CBI)
CTO — Channel Tag Out (a set of lines for tag signals supplied from a data channel to an I/O controller interpreting other signals supplied over CBO)
CU — Control Unit, an I/O controller
CUB — Control Unit Busy (a tag signal)
DE — Device End (a tag signal from an I/O device indicating end of an operation)
DEP — Device End Prime (see below)
DEPRIME — Device End Prime (a flag signal in a memory unit indicating a data channel has previously requested access to an I/O device. Upon receipt of a device end (DE), signals are supplied to the channel to provide access to the I/O device)
DIAG — Diagnostic
DIAGNOSE — A command ordering an I/O controller to enter a diagnostic mode of operation
FWD — Forward
GENRST — General Reset
IBG — Interblock Gap
IC — Instruction Counter
IDLEPEND — A wait routine for the channel microprogram unit used to wait for further instructions from a data channel
IDLESCAN — A microprogram used to scan for DEPRIMES
IHS — Information Handling System
INTF — Interface Circuits
I/O — Input/Output or Input/Output Device
IOS — I/O System (a CPU program operating under OS and added to control I/O operations)
IR — Instruction Register
LSR — Local Store Register
MIS — Multiple Interface Switch
MPU — Microprogrammable Unit
MPUX — Microprogrammable Unit X (used in connection with a data channel)
MPUY — Microprogrammable Unit Y (used in connection with an I/O device)
— Magnetic Tape Unit
NOP — No operation (do-nothing command)
OLT — On-Line Test (a CPU program for exercising and testing a peripheral device connected to the CPU)
OLTEP — On-Line Test Executive Program (a controlling program for OLT's)
OP — Operation
OPIN — Operation In (a tag signal)
OS — Operating System (a CPU control program)
RES — Reserved
ROS — Read Only Store
RST — Reset
RTN — Return
SDI — Subsystem Device Interface (a multiplexing switch selectively connecting several CU's to a plurality of I/O devices)
SELO — Select Out (a tag signal from channel to CU attempting a selection (connection))
SELRST — Selective Reset
SFBKWD — Space File Backward
SFFWD — Space File Forward
SIO — Start I/O (a command initiating an I/O OP)
SPACE OP — An MTU Space Operation (moves or spaces tape)
STAT — Status
STATIN — Status In (a tag signal indicating CBI has a status byte)
STIN — Status In (see STATIN)
STS — Status
SUPPRI — Suppressible Request In (a tag signal)
SUPPRO — Suppress Out (a tag signal)
SVCI — Service In (a tag signal)
SVCO — Service Out (a tag signal)
TACH — Tachometer
TAPE OP — Tape Operation
TCB — Task Control Buffer
TIO — Test I/O
TM — Tape Mark
TU — Tape Unit, also MTU
TUADDR — Tape Unit Address Register
TUBI — Tape Unit Bus In
TUBO — Tape Unit Bus Out
TUTAG — Tape Unit Tag Register
XA — Exchange Register XA
XB — Exchange Register XB
YA — Exchange Register YA
YB — Exchange Register YB.

GENERAL DESCRIPTION

CPU 110 sends command signals and receives status and data signals through channel processor 114 with respect to the I/O subsystem including I/O controller 11 and one or more peripheral devices I/O. Such devices may be magnetic tape handlers. I/O controller 11 may be the controller described in detail in the Irwin application, supra, or any other programmed controller, mini-computer, and he like. The other units may be constructed in accordance with known techniques such as referenced in the Edstrom application, supra, no limitation thereto intended. In accordance with the invention, the interrelationship between CPU 10 and I/O subsystem 11, I/O is enhanced and made more flexible by selectively imposing momentary operating states within the I/O subsystem, preferably via microprogram means.

In accordance with one aspect of the invention, a SET DIAGNOSE CCW, together with a set of flag bytes (microprogram bits) at 15A, is generated as an I/O command by the CPU via channel processor 114. These are supplied to I/O controller 11 together with an SUPPRO signal at 16A. SUPPRO chains I/O controller 11 to processor 114. In response to SET DIAGNOSE at 15A and SUPPRO, I/O controller 11 sets up a new mode at 17A. Upon completion of the setup, command 1, chained to SET DIAGNOSE 15A, is supplied to I/O controller 11. I/O controller 11 responds by executing command 1 in the imposed mode because SUPPRO is still maintained as indicated by the hatched lines to the left of FIG. 1. Commands 2, 3, and 4 are similarly chained to SET DIAGNOSE 15A and executed as indicated in the flowchart. At 19A, I/O controller 11 can selectively perform command 3 in a normal manner rather than in the imposed mode in accordance with later description. For the present discussion, at step 19A command 3 is executed in the imposed mode of operation. Command 4 is then issued with command 4 being executed by the I/O controller. Upon lifting SUPPRO at 20A, the imposed mode is removed with all I/O controller operations returning to normal or another predetermined operational state. Commands 1–4 may be data processing type commands, such as read tape, write tape, rewind tape, etc.

With regard to command 3, at step 19A, two signals (SUPPRO and EXECUTE) can be simultaneously supplied from the channel or CPU to an I/O controller for imposing the flag byte mode of operation set up in step 15A. SUPPRO is used to maintain the mode information within the I/O controller while the EXECUTE control signal 18A causes the I/O controller to execute commands received in accordance with the imposed mode. Removal of the EXECUTE control signal at 21A causes the I/O controller to maintain the imposed mode, but execute that particular command in a normal manner.

In an additional aspect, microprogram bits or flag bytes are supplied from one data processing system 110 to a receiving data processing system (I/O controller) 11 via loose intercoupling or channel 114. System 11 stores the microprogram bits and is conditionally responsive thereto in accordance with subsequent received operational requests, CCW's, or commands. System 11 interprets the microprogram bits either to affect system states (software program or hardware) to selectively alter system response to such later commands or interpret such later command to effect a system function predetermined by the microprogram bits with data flow characteristics determined by such later command. In the latter interpretation, the system function usually commanded by such later command (in the absence of activated microprogram bits) is not performed; the system function related to the microprogram bits predetermines the function. Such action may be termed "inverse microprogramming;" that is, one usually regards microprogram bits as affecting data or signal flow, not implicitly effecting a system function—such function resulting from a code portion of a command or instruction. Expanding interpretation of microprogram bits as well as command codes for initiating funtions in accordance therewith enhances intersystem flexiblity.

I/O CONTROLLER 11

The I/O controller in which the present invention is illustrated is that described in the Irwin application, supra or may be any other programmed I/O controller. The microprograms discussed in this particular patent application could all reside in MPUX of the Irwin application. The Brown et al. and Gregory et al. patents show hardware-sequenced controllers operable with two different channel schemes. Initial selection procedures are also shown in Moyer et al. and Marsh et al. patents, supra. That is, those microprograms are designed to cooperate with CPU and channel during selection and subsequent operations for effecting the practice of the present invention. These microprograms determine the response of I/O controller 11 to the various channel commands supplied to it and respond for maintaining the imposed mode of operation.

Both processors MPUX and MPUY are identically constructed. As generally shown, MPUX includes a set of signal transfer circuits 50A which provides intercommunication between the various elements of MPUX, registers 14, 15, data flow 13, and channel 114, as well as intercommunication between the internal elements. MPUX includes read-only store 65 which contains the control programs. Alternatively, ROS 65 may be electrically alterable. Control 69 responds to instruction words fetched from ROS 65 to effect operations within MPUX, as is well known. Control 83 includes clocking control, interpretation of instruction words, branch-on-conditions, and the like. As an auxiliary control to 83, transfer decode 70 responds to code permutations fetched from ROS 65 to set up gating circuits within MPUX for transferring signals between the various units, as well as permitting program generation of external synchronization signals. Transfer decode is a set of gating circuits which is responsive to the clock signals from control 83 and the code permutations from ROS 65 to selectively gate a clock signal from one spot to another. Additionally, interregister transfer between various registers in MPUX (registers not shown) is facilitated. Included are transfers to and from registers 14, 15, as well as to and from channel 11 and data flow 13. ALU 72 is the arithmetic logic unit within MPUX and performs a usual addition, subtraction, and other functions associated with the microprocessor. LSR 75 is a set of local storage registers, or electronic scratch pads, which under program assignment are used as work registers, queuing registers, status registers, and the like as can be determined from examination of the flow charts within this application. The Irwin et al. application, supra, also clearly shows the usage of LSR 75. A more detailed description of the processors follows in connection with FIGS. 4 and 5. The microprograms are described with respect to FIGS. 8–36. These microprogram bits are selectively interpreted by MPUX or MPUY to perform functions or to set up data flow paths for functions to be performed by later-received commands, as will become more apparent.

In the flowchart immediately below, the response of I/O controller 11 to a channel trap, response to a SET DIAGNOSE command for imposing the new mode of operation through the use of selectively erasable flags, is shown in Steps M1 through M18. The establishment of the imposed mode is set forth in Steps M19 through M31. The maintenance of such imposed mode is set forth in Steps M1 through M18. Steps M32 through M35 illustrate operation of the micros during a read-type of operation, i.e., data transfer from a device toward a CPU, while Steps M37 through M39 show the initiation of the write-type of operations. Subsequent flowcharts in the specification illustrate in detail the operation of the I/O controller in the imposed and normal modes of operation.

The flag bytes imposing the various modes of operation on I/O controller 11 are of two categories. The inventive portions include those flag bytes which are maintained only when I/O controller 12 is maintained in the chained condition; i.e., SUPPRO is maintained in the active condition. Removal of SUPPRO erases the flags. These flags are contained in the SET DIAGNOSE data byte 1. A byte 2 set of flags, showing the modification of the imposed mode and when used in combination with the byte 1 flags, form a part of the present invention. An erasure is made only upon an SIO/TIO trap. Such flag bytes have been described by Edstrom in his copending application, supra. Bytes 3 and 4 of the SET DIAGNOSE flag bytes are used to modify and set limits of operation of the modes of operation set up by flag bytes 1 and 2. The use of flag bytes 3 and 4 for limits in addressing and modes of operation, i.e., time-outs, data field lengths and limits, and the like, is well known and not further described.

FLOWCHART OF I/O CONTROLLER 11 RESPONSES (Unless otherwise noted, Steps are performed in the listed sequence.)

SIO TRAP SEQUENCE — STEPS M1–M18

M1 — SIO/TIO trap. A trap signal causes MPUX to access the instruction word at ROS-000 with the code permutation on CBO indicating that the trap relates to an SIO or TIO. In accordance with tag signals from channel (SIO = OP OUT, HOLDOUT, SELO, and ADDRO), the SIO/TIO trap routine set forth in Steps M1–M18 is executed. This flowchart is a simplified version of the trap routine for clearly setting forth the invention. FIGS. 15 and 16 of the Irwin application, supra, are also simplified flowcharts relating to this routine but do not accent the inventive concepts set forth herein.

M2 — Operation In (OPIN) flag is actuated by the microprogram via the transfer decode of MPUX. OPIN signal is supplied as a tag-in signal to the channel in accordance with known IBM 360 interface criteria. OPIN indicates that the I/O controller 11 is responding to the SIO/TIO trap and its operations.

M3 — This is a wait loop awaiting the channel to send tag ADDRO indicating that CBO has a code permutation showing the address of the device associated with the SIO/TIO channel command.

M4 — Upon receiving ADDRO, the code permutation on CBO is fetched by the micro-routine and moved to CBI; and ADDRI is activated to transfer decode of MPUX. This action returns the address supplied by the channel over CBO to CBI so that the channel can verify I/O controller 11 has properly received the device address.

M5 — A branch-on-condition (BOC) on the chaining flag in LSR 75. The chaining flag, as will be explained later in Steps M15 and M25, indicates to the microprogram that SUPPRO has been received and that I/O controller 11 is chained to the channel. If chaining is indicated, Step M7 is performed. If chaining flag is not active, proceed to Step M6.

M6 — If chaining is not active, flag bytes 1 and 2 are erased. NOte that both flag bytes are erased because this is an SIO/TIO routine (byte 2 erasure) and chaining has been inactivated (byte 1 erasure).

M7 — This is a BOC wait loop waiting for the channel to send command out (CMDO). CMDO at this portion of the microprogram and selection routine indicates that CBO contains a channel command or CCW. This step is entered either from M6, in the event chaining is broken, or M5, in the event chaining is being maintained. Note that with chaining maintained, none of the flags are erased.

M8 — The code permutation on CBO is fetched because of the CMDO tag being active and is transferred to a memory register in LSR 75 for later interpretation.

M9 — This is a BOC operation based upon a status pending flag in LSR 75. If the flag is active, that is, there is status to be presented to the channel (initial status), this status is transferred to LSR 75 to await Step M11 and then Step M10 is performed. If no status is pending, the microprogram proceeds directly to M10.

M10 — This is a BOC operation based upon signals supplied to I/O controller 12 from the addressed device. Each device supplies a ready/not-ready signal to I/O controller 11. If the device is ready, that is, it can perform an operation to be designated by a CCW, Step M11 is performed. If the device is not ready, an error condition in the subsystem has occurred; and a unit check signal is supplied to channel 114 over CBI. The operation is then terminated to await further commands from the channel.

M11 — After sensing device ready, the tag ADDRI which was activated in Step M4 is inactivated. I/O controller 11 is now ready to present the status stored in Step M9. Initial status which was accumulated is now supplied to CBI, and tag STATUS IN is activated indicating to the channel that the code permutation on CBI represents initial status.

M12 — This is a wait loop BOC operation waiting for service out (SVCO) to be activated by the channel. The I/O controller 11 waits until SVCO is activated to proceed. This is a tag signal instructing I/O controller 11 to proceed under certain specified conditions including acknowledgement of receipt of the status on CBI by the channel. Upon SVCO being active, I/O controller proceeds to M13.

M13 — This is a BOC operation detecting continued chaining by sensing for SUPPRO tag in accordance with the documents incorporated by reference. If SUPPRO is active, Step M15 is performed. If inactive, Step M14 is performed.

M14 — With SUPPRO inactive, the chaining flag in LSR 75 is reset; and then Step M16 is entered. At this time, byte 1 flags are not affected.

M15 — If SUPPRO is active, the chaining flag in LSR 75 is set. Note that the chaining flag may have already been set by a previous operation of the microprogram. However, repeatedly setting the flag after it has been set does not alter its active condition.

M16 — This is a BOC operation based upon decoding the command fetched in Step M8 and stored in an LSR memory register. The command is fetched from the memory register and sensed to see whether or not SET DIAGNOSE is the command. If it is the command, Step M19 is entered for setting up the imposed mode of operation. If SET DIAGNOSE is not the command, further decoding is required. Note that additional commands chained to a SET DIAGNOSE command will be decoded by Steps 17 et seq as additional commands.

M17 and M18 — Step M17 determines whether or not the command is a read-type as used in tape subsystem nomenclature. If it is, the program branches to Step M32. If not, it proceeds to Step M18 wherein the program determines whether or not the command is a write-type of command. If it is, Step M37 is performed. If not, another type of command is to be performed not pertinent to the present description, although other additional commands may be used in connection therewith.

SET DIAGNOSE ROUTINE

M19 — Fetch flag bytes 1–4 from CBO and stored in LSR. These four flag bytes are subsequently interpreted by the program for imposing the mode of operation commanded through the SET DIAGNOSE CCW. Byte 1 is stored in register 1 of LSR; byte 2 is stored in register 2; and similarly for bytes 3 and 4. Byte 1 will be interpreted in accordance with whether the additional command is a read- or write-type, while byte 2 is interpreted the same for both categories of operation as set forth in the table below.

FLAG BYTE INTERPRETATION (Byte 1 Erased by $\overline{\text{SUPPRO}}$, Byte 2 Erased by SIO/TIO)

| | | |
|---|---|---|
| Byte 1 - Read | 1–0 | Not Used |
| | 1–1 | IBG Measurement |
| | 1–2 | Read Access Measurement |
| | 1–3 | GO-DOWN Time; Bytes 3 and 4 contain time |
| | 1–4 | Read Stop |
| | 1–5 | DMR; Byte 3 has GO-UP time and Byte 4 has GO-DOWN time |
| | 1–6 | TUBO Mask; Byte 3 has mask |
| | 1–7 | Change Direction |
| Byte 1 - Write | 1–0 | Diagnostic Mode Set |
| | 1–1 | Not Used |
| | 1–2 | Inhibit Postamble |
| | 1–3 | GO-DOWN Time; Bytes 3 and 4 contain time |
| | 1–4 | Inhibit Preamble |
| | 1–5 | LWR |
| | 1–6 | TUBO Mask; Byte 3 has mask |
| | 1–7 | Change Direction |
| Byte 2 | 2–0 | Block Unit Check |
| | 2–1 | Set Device Busy |
| | 2–2 | Block Interrupt |
| | 2–3 | ARM CUB |

The interpretation of the bits in the various flag bytes (microprogram bits) will be discussed in detail as various imposed mode operations are described in flowchart form. Table II in the section "Microprogram Sequence for MPUX Enabling Concurrent Diagnostics" lists some of the flag byte bits and the register in LSR in those programs using such bits. The byte 2 flag bits are described in detail in the Edstrom patent application supra, particularly with respect to block interrupt, ARM CUB, and set device busy. The block unit check flag operates in the same manner as the block interrupt, except that it relates to data error reporting rather than interruption reporting. In addition to the diagnostic flags listed above with respect to the imposed mode of operation, there are additional flags relating to various functional routines for bypassing, modifying, blocking, or initiating particular subsystem functions peculiar to such routines themselves such as described in the Edstrom patent application supra, as well as others not mentioned for the sake of brevity. In addition to resetting the diagnostic flags in the table, as described with respect to Steps M6, and resetting the chain flag, as set forth in various program steps, the I/O controller 12 resets flag bytes on a bit-by-bit basis, particularly for SET CUB, SET DEVICE BUSY, LOOP-WRITE-TO-READ, etc. Generally, the flags listed above are subjected, based upon their functional relationship to the I/O controller, to the below types of control.

1. The flag is active only internal to a command chaining, i.e., SUPPRO must be active before the flags will be interpreted. This includes both bytes 1 and 2.
2. The flags are active and interpreted only during a chaining operation even though reselection may be unchained; these are the byte 2 flags.
3. The flags are active only internal to a specific command chain. These are the byte 1 flags and represent an important aspect of the present invention.
4. Some flags (not shown nor described herein) can remain active only when the commands are not chained. Such flags are used for interlocking concurrent tests in diagnostic procedures, interlocking various data processing unrelated programs, etc.
5. The flags are active and used by a microprogram only during selective internal portions of a chained sequence of CCW's. These points become more clear later on in the description.

M20 — This is a BOC which checks the GO-DOWN flag in byte 1, bit 3. If the GO-DOWN flag is active, i.e., a binary 1, then Step M21 is performed; otherwise, Step M21 is ommitted with Step M22 being performed.

M21 — This is the GO-DOWN step in which the functional command is delayed in accordance with the code permutation contained in bytes 3 and 4 appended to the SET DIAGNOSE CCW. The microprogram counts to zero, with the length of the count being directly related to a GO-DOWN time, i.e., a delay wherein the addressed peripheral device remains inactive. Such delays are useful in analyzing peripheral unit motion performance.

Ending Status

M22 — This step may also be entered from Step M36 in addition to entry from Step M20 or M21. The program assembles ending status. Ending status is that status reportable to the channel and CPU upon completion of the operation or recipt of a CMDO during the performance of a commanded operation. CMDO signifies to the peripheral subsystem to stop the operation. Note that the entry from M20 and M21 is upon the completion of the SET DIAGNOSE command, while the entry from Step M36 is from the additional commands. Accordingly, ending status Steps M22–M31 are common to all CCW executions.

M23 — The ending status assembled in M22 is supplied to CBI with the STATIN tag signal being raised. STATIN will be maintained through Step M24.

M24 — A wait loop BOC operation awaiting the SVCO tag from channel acknowledges receipt of the ending status supplied in Step M23. Upon receiving SVCO, the wait loop is broken; and the program proceeds.

M25 — This is a BOC operation testing for SUPPRO; i.e., during the termination of the command execution, I/O controller 11 senses whether or not chaining is effective. If it is, Step M26 is performed; if not, Step M27 is performed.

M26 — The program sets the chain flag in LSR to the active condition. It then proceeds to Step M28.

M27 — The program resets the chain flag in LSR and then proceeds to Step M28.

M28 — This step signifies to the channel that the command sequence is being terminated by inactivating STATIN and OPIN tag lines via transfer decode 70 of MPUX.

Figure 8:
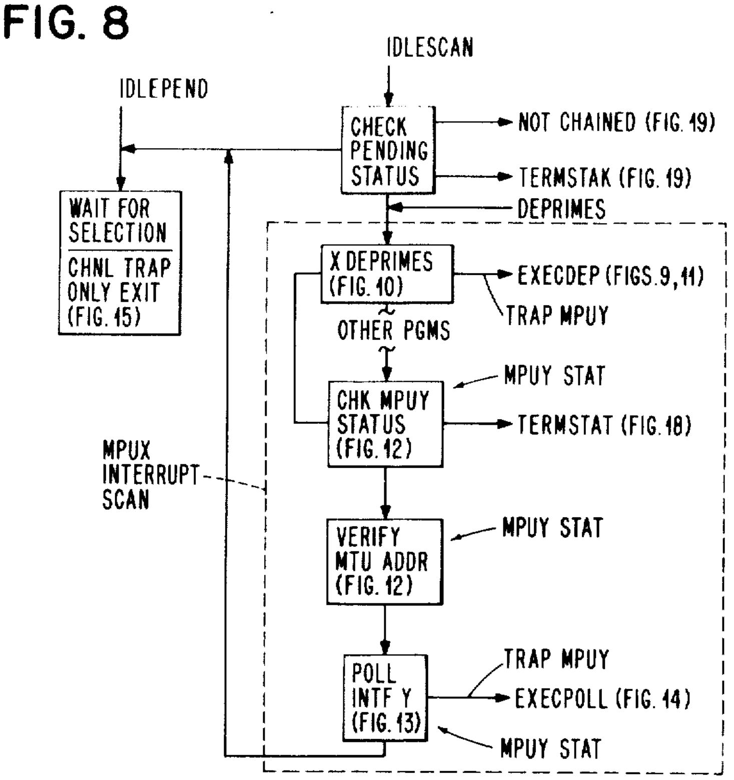
FIGS. 8 to 36 are abbreviated illustrations of microroutines set forth in FIG. 7 as tabulated below.

M29 — A BOC operation checks the chain flag, set or reset in Steps M26 and M27. If the flag is active, Step M30 is performed. If not, the program exits to IDLESCAN routine such as shown in FIG. 8.

M30 — This is a wait loop awaiting further commands or instructions from the channel. If SUPPRO is active, the I/O controller 11 interprets that tag as "wait for further instructions and maintain your electrical connections to channel blocking all requests or selection signal other channels" (see the Edstrom application, supra). During the wait looping, i.e., SUPPRO is continuing to be active, channel sends a TRAP command to I/O controller 11 trapping (forcing) it to Step M1 at ROS address 000. This forces I/O controller 11 to leave the Step M30 wait loop. On the other hand, if SUPPRO is inactivated, I/O controller 11 proceeds to Step M31.

M31 — I/O controller 11 resets the chain flag in LSR 75 of MPUX. Note that the flags in bytes 1 and 2 are not erased at this time. Those flags are handled in Step M6 as previously described. From Step M31, I/O controller may enter the IDLESCAN routine referred to above.

READ-TYPE COMMANDS

M32–M35 — These four serially performed steps detect whether or not the byte 1 read flags are activated as set forth in the table above. These include the DMR flag bit 5, the IBG measure flag bit 1, read stop flag bit 4, and read access flag bit 2. If any of these flags are active, then Step M36 is performed; i.e., the diagnostic function associated with the respective byte 1 flags. If none of the flags are activated, the program goes to a read operation program such as the X-read-type and test program shown in FIG. 20. Steps M32–M35 may be incorporated in that program as a part of INTERPRET command step 270.

Write-Type Commands

M37–M39 — Decode write-type of commands in byte 1 write. The diagnostic write mode is bit 0; the LWR bit 5 and inhibit preamble bit 4, inhibit postamble bit 2. If any of these flags are active during the write mode, Step M36 is performed. Otherwise, a write operation 138, such as shown in FIG. 21 is performed. Steps M38–M39 may be incorporated within step 281 during the initial setup.

M36 — This program step may include several different functions in a generic sense; that is, there is a separate routine for DMR, IBG measure, read stop, read access, diagnostic write, LWR, and the preamble control. All these are lumped together as Step M36 for brevity with the functions associated with the various byte flags being described in greater detail later. The diagnostic function M36 is favorably compared with diagnostic program 127 shown in FIG. 6. From Step M36, ending sequence beginning with Step M22 is always entered.

DIAGNOSTIC APPLICATIONS

The below flowcharts broadly illustrate an operational environment in which the invention can be advantageously practiced. Following these flowcharts is a detailed showing of subsystem response illustrating important aspects of the invention. In the latter, upon receipt of a READ command by a magnetic tape subsystem, the subsystem response is either to 1. transfer data signals from a record tape to I/O channel 114 via controller 11,
2. transfer data signals from a write portion to a read portion of data flow 13 without exchanging signals with a magnetic tape, or
3. perform a series of functions in accordance with microprogram bits and transfer-generated signals to I/O channel 114, i.e., a data or signal flow direction associated with the commanded function of READ without performing the fixed function of transferring signals from a tape to an I/O channel.

FLOWCHARTS

Diagnostic Operation A—FRU Diagnostic

An example of using the present invention in a diagnostic procedure is set forth below as a flowchart series of CCW's for locating a field replaceable unit (FRU) that may be failing in a peripheral subsystem. The present invention is used in ACCW-4 and ACCW-5. The flowchart is abbreviated for eliminating unnecessary description.

The diagnostic is intended to execute all the functional commands for a peripheral subsystem in a manner to detect and isolate hardware errors or failures in a subsystem. If a peripheral command fails, the resulting sense data is analyzed in the CPU to determine the FRU that is most likely causing the failure. If the diagnostic happens to stop after detecting and analyzing the first hardware error, such FRU's are identified in code permutations and in a printout from the CPU. All CCW's are chained in this flowchart.

ACCW-1 — This is a no operation CCW which establishes contact with the peripheral subsystem and initiates the chaining.

ACCW-2 — This CCW positions the magnetic media at load point in accordance with ASA standards and tests the ability of the controlling unit in the peripheral subsystem, such as I/O controller 12, to perform a SENSE command and determine the type of peripheral device being tested. Included in this CCW is a REWIND command for moving the tape to the load point and SENSE to transfer the information acquired to CPU. The sense bytes contain predetermined code permutations not pertinent to the practice of the present invention.

ACCW-3 — This CCW causes the peripheral subsystem to move the tape away from load point for reasons beyond the scope of the present invention. Sense bytes are also transferred during this CCW.

ACCW-4 — The SET DIAGNOSE command referred to above implements the program set forth in the previous flowchart for establishing the imposed mode of operation, i.e., for diagnostics. Byte 1 in the write mode has bit 5 activated for effecting a loop write to read (LWR). The additional command chained to the SET DIAGNOSE causes a tape mark (ASA standard) to be written; however, because of LWR, it is not actually written on tape but is looped from the write chain through circuitry into the read chain. The TCU then analyzes read circuits to see whether or not a tape mark code permutation is received. This action verifies the ability of the peripheral subsystem to write a tape mark as well as checking some of the hardware circuits in data flow circuits 13. The signals supplied for writing the tape mark are generated within the I/O controller 11, but not sent to the I/O device in known loop write to read techniques such as those set forth in the IBM TECHNICAL DISCLOSURE BULLETIN, Mar. 1970, Page 1,614.

ACCW-5 — This is an LWR command chained to the SET DIAGNOSE of ACCW-4 which does an LWR using selected code permutations over and above the tape mark code permutation. This is a more complete check on the read and write circuits of I/O controller 11.

Subsequent CCW's are not pertinent to the practice of the invention and are not described for that reason. The next following command erases the flag bytes returning the system to the usual mode of operation.

Diagnostic Operation B—Controller Test

This on-line diagnostic imposes a new mode of operation on I/O controller 11 for verifying operation of its command sequence, variable lengths, sense analysis circuits, command chaining, command decoding, and the ability to reject illegal commands. Both bytes 1 and 2 of the SET DIAGNOSE flag bytes are used as will become apparent. The portion of interest to the present invention is the chaining relating to decoding commands. These include the I/O controller's ability to properly decode CCW command code permutations such as those commanding an erase gap, write tape mark, rewind, loop write to read, etc. The flowchart below assumes that the tape has been rewound to load point in first-executed BCCW-1 program step. All CCW's are chained.

BCCW-2 — SET DIAGNOSE command is included in CCW. Additional command codes are WRITE TAPE MARK and SENSE. In byte 1, the write bit 5 LWR is activated and maintained in accordance with the microprogram flowchart. Upon completion of the SENSE command, the chain is maintained.

BCCW-3 — Another SET DIAGNOSE with an LWR bit activated together with an LWR command (bit 5) and a SENSE bit executes LWR at load point as opposed to the A test which tested the LWR away from load point.

BCCW-4 — Byte 1 is erased at the end of CCW-3 with a MODE SET command CCW chained to an ERASE GAP command and a SENSE command. This MODE SET places the I/O controller and the peripheral subsystem in an erase mode and erases the tape for moving the tape away from load point.

BCCW-5 — A SET DIAGNOSE command has the LWR bit 5 in write byte 1 active and includes WRITE TAPE MARK and SENSE command bits. SENSE command transfers the result of the test to the CPU.

BCCW-6 — This is essentially a repeat of BCCW-3, but away from load point. Selected code permutations are supplied in bytes 3 and 4 which are attached to the LWR additional command.

BCCW-7 — The SET DIAGNOSE command is bit 7 active for changing the direction, i.e., reversing tape motion. Included with this SET DIAGNOSE is a FILE SPACE BACKWARD additional command. Upon completion of that command, a SET DIAGNOSE command specifying bit 7 again for changing the tape direction is issued. The operating status of the addressed tape drive changes operating status from forward status to backward status without tape motion and verifies the changes in status to the SENSE command.

BCCW-8 — A SET DIAGNOSE has the LWR bit in the write byte and a SENSE bit. Since the mode set has the peripheral subsystem in a backward tape move status, this chain executes LWR while in the backward status using a predetermined code pattern.

BCCW-9 — A repeat of BCCW-2, but in the backward direction.

BCCW-10 — SET DIAGNOSE is not used. Two commands, WRITE TAPE MARK and SENSE, effect recording a tape mark on the tape in the usual manner.

BCCW-11 — MODE SET sets the peripheral subsystem to a data processing mode as opposed to an erase mode. Included in the MODE SET are REWIND for moving the tape to load point, ERASE GAP for moving the tape in the forward direction away from load point, WRITE TAPE MARK for recording a tape mark on the tape, and a SENSE command. The SENSE command verifies that the tape unit i.e., the I/O device, has maintained the assigned density while executing a sequence of the five commands.

DIAGNOSTIC OPERATION C—TAPE MOTION VERIFICATION

This diagnostic measures the speed of the media when tape is moving in the forward direction and then in the backward direction. Included in the test is verification of capstan control circuits and capstan tachometer circuits. Since the backward and forward checking is the same, only the forward checking is shown in flowchart form.

CCW-1 — SENSE command is issued which verifies that the addressed I/O device has the proper features and is ready for performing the test.

CCCW-2 — SET DIAGNOSE command with the byte 1 change direction bit issued chained to a forward space block (FSB).

CCCW-3 — Continuing the chaining, a second SET DIAGNOSE is issued adding the microprogram DMR bits with bytes 3 and 4 specifying respectively the go-up and go-down time.

CCCW-4 — A READ FORWARD command is then chained to the DMR for executing DMR. While this execution is described in simplified form later, a more complete description is found in Breitenbach et al supra, particularly the DMR flowchart beginning with step 210.

CCCW-5 — Chained to the READ FORWARD is another SET DIAGNOSE containing go-down time having bit 3 of byte 1 active. This corresponds to time *t*3, *t*4, of FIG. 8 of Breitenbach et al., supra.

CCCW-6 — Chained to the go-down time is another SET DIAGNOSE with the DMR bit active and bytes 3 and 4 indicating go-up and go-down time.

CCCW-7 — Chained to this is a READ FORWARD command which performs the read access portion of the DMR corresponding to the time in FIG. 8 subsequent to *t*4.

CCCW-8 — Chained to this is another SET DIAGNOSE with a go-down delay, bit 3 active.

Chained to these are additional commands not pertinent to a further understanding of the invention.

EXAMPLES OF MICROPROGRAMMING CONTROLS

Figure 3:
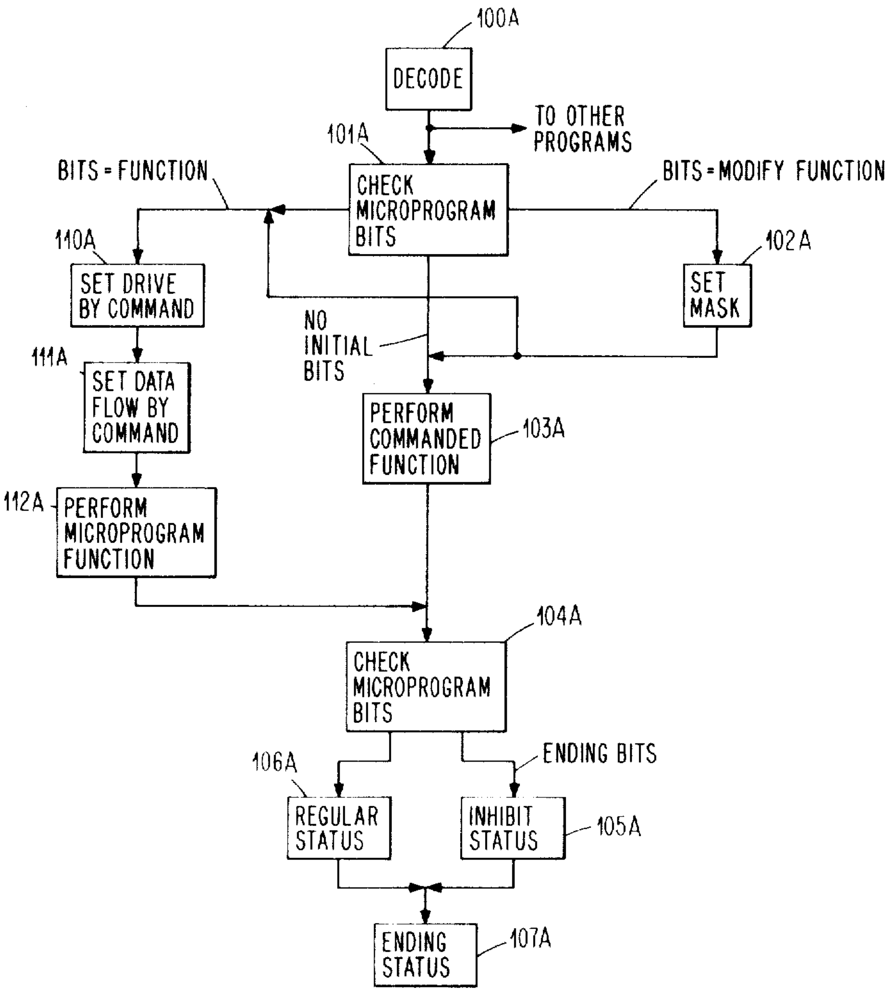
FIG. 3 is a simplified flowchart of a microprogram used in connection with the invention and detailed in the specification.

FIG. 3, which is a simplified flowchart of I/O controller 11 response to commands and associated microprogram bits, is now described. Decode 100A corresponds to Steps M1–M18 of the above program flowchart; that is, the command is fetched from the controlling system, and chaining is verified for maintaining the byte 1 microprogram bits. In some instances, not shown in the flowchart, M1–M18 is a selected set of commands (not further described) which may not be modified by microprogramming means. If such are detected, the controller exits to other programs in ROS 65. An example is a command reject wherein the command sent to I/O controller 11 is an illegal command for the subsystem.

Usually, step 101A is entered for checking whether or not there are any microprogram bits activated which have to be interpreted in the initial portion of the controller response to the received command. This action corresponds to Step M19 of the above-referred-to flowchart and relates to byte 1 bits. Depending on which bits have been activated, as set forth in the above table, one of several program routes may be followed. If there are bits which modify the commanded function, then step 102A is entered. In the illustration, bit 6 of byte 1 is activated for the controller to set up a program mask, as set forth in the IBM TECHNICAL DISCLOSURE BULLETIN article, supra. Other modifications of the commanded functions may be instituted at this time. After setting up a modification to the data flow is step 102, the commanded function is performed at 103A; or if a microprogram function is to be performed, step 110A is entered.

If none of the microprogram bits are active at step 101A, then step 103A is directly entered for performing the commanded function without modification. This includes the usual tape subsystem commands, for example, READ FORWARD, READ BACKWARD, SPACE FILE, and the like, which are well known.

Figure 1:
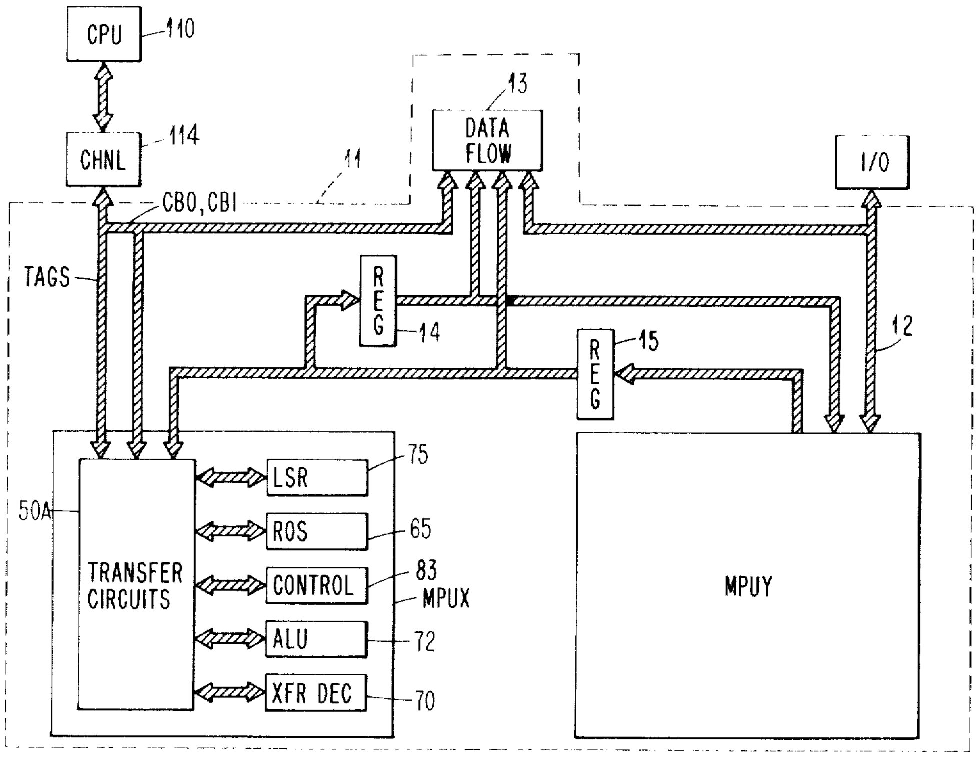
FIG. 1 is a simplified block diagram of a system incorporating the present invention.

On the other hand, microprogram bits checked in step 101A may indicate a microprogram function is to be performed. In this case, steps 110A–112A are performed in sequence, either following step 102A as explained above or directly from step 101A in the absence of function modifying microprogram bits. First, the associated I/O device or magnetic tape drive is activated in accordance with the commanded function (which will not be performed). For example, in a READ FORWARD command, the tape drive is set to move tape in the forward direction; or in a READ BACKWARD command, the tape drive is activated to move tape in the backward direction. Such drive is represented in FIG. 1 by an I/O device. Then, the program at 111A sets up data flow circuits 13. In the READ command, it would set up for transfer of signals from an I/O device 13 to channel 11; or in a write mode, from channel 114 to such I/O device. In certain instances, the read and write portions of data flow 13 may be looped together as will become apparent and has been well known for several years.

After setting up signal flow and tape motion direction, in accordance with the command received by controller 11, it then performs the function indicated by the microprogram bits checked in step 101A.

Upon completion of either the function at 112A or at 103A, ending status bits are checked at 104A. If there are no bits activated, regular status is gathered at 106A for reporting during ending status routine 107A. On the other hand, if certain bits are activated, the execution of ending status routine is modified by inhibiting transfer of certain status bits at 105A. Such inhibitory actions are described in greater detail in the Gene H.

Edstrom copending application, Ser. No. 169,193; filed Aug. 5, 1971; and commonly assigned. Insofar as the practice of the present invention is concerned, those functions are briefly described in one of the following flowcharts.

Correlating FIG. 3 to the flowchart above, steps 102A, 110A, and 111A correspond generally to Steps M32–M39 of that flowchart. Further, steps 104A–107A correspond generally to Steps M22–M31; while steps 103A and 112A correspond generally to Step M21. There is no one-to-one correspondence between the FIG. 3 illustration and the flowchart operation. This is intentional in that FIG. 3 illustrates a slight variation of practicing the present invention over and above that illustrated in the flowchart.

EXECUTION OF ACCW—4

A SET DIAGNOSE command has byte 1 equal to 00000110. This means bits 5 and 6, the LWR, and the TUBO mask have been activated. If SET DIAGNOSE is followed by a READ command, bit 5 is interpreted as DMR. However, in this instance, SET DIAGNOSE is followed by a WRITE command which interprets bit 5 as loop-write-to-read (LWR). For LWR, the write portion of data flow 13 is looped directly to read portion. The I/O device is not affected. In addition, TUBO mask bit 6 has been activated. Byte 3 contains the mask information for simulating a dead track during an LWR. I/O controller 11 branches through steps 110A and 111A; however, because the LWR bit is activated, the I/O device (or drive) is not affected.

At 112A, the LWR function dictated by bit 5 and as modified by bit 6 of byte 1 is executed. Since a tape mark is being written, not all tracks or channels within data flow 13 are activated. Accordingly, data flow 13 may or may not detect a dead track affecting a tape mark. The response of I/O controllers during the final ending status 107A, as gathered during step 106A, will provide an error condition or no error condition depending upon the mask set up in step 102A. It is understood that the LWR function of ACCW-4 can be performed with bit 5 only activated; that is, the mask is not implemented.

EXECUTION OF ACCW-5

This is also an LWR similar to ACCW-4. However, instead of a tape mark, selected code permutations supplied with the WRITE command chained to the SET DIAGNOSE determine which code permutations are supplied through the write and read portions of data flow 13. In this instance, utilization of the mask bit 6 of byte 1 is more flexible and can be more meaningful for diagnosing data flow 38 performance.

EXECUTION OF BCCW-5

This is also an LWR microprogram commanded function and is executed as above described. Note that the SENSE command bits in the chained command associated with the write function activate a transfer of status signals at 107A greater than that provided in usual ending procedures. Such operation is beyond the scope of the present invention and is not further described.

EXECUTION OF BCCW-7

Byte 1 of the SET DIAGNOSE has only bit 7 activated, which is interpreted to mean "change direction of tape motion." Chained to the SET DIAGNOSE is an FSB (forward space block) additional command. In this case, step 103A is directly entered from step 101A; i.e., the command to be performed is not modified nor is a microprogram indicated command substituted for the commanded function. Rather, an additional subsystem function is microprogram added to the function commanded by the controlling system.

The additional command of FSB is executed at 103A. Upon completion of that function, I/O controller within step 103A checks byte 1 for bit 7 and, if active, it sends a command to I/O device to reverse direction of tape motion. It then exits step 103A to step 104A for checking the ending status microprogram bits. There may be no tape motion in the execution of this command; i.e., tape drive status may be established in controller 11 without sending command or control signals to an I/O device.

EXECUTION OF CCCW-2, 3, ET SEQ.

This is a series of CCCW's using various portions of the invention in a sequence to perform a given diagnostic function as set forth in the diagnostic application portion.

In CCCW-2, the first SET DIAGNOSE has byte 1 bit 7 followed with an FSB command which is executed as above described.

Following this forward space block with a change in tape motion direction to backward, the second SET DIAGNOSE adds the byte 1 bit 5 microprogram bit followed by a READ command which interprets bit 5 as a DIAGNOSTIC MEASURE READ (DMR). Bytes 3 and 4, respectively, specify go-up and go-down time. In executing this function, the controller fetches byte 3 from LSR 75 and counts it out while maintaining the MOVE command signal to an I/O device for causing the tape drive to move tape backward a given period of time in accordance with the code permutation in byte 3. Upon expiration of the byte 3 time, by counting bytes received from the tape and decrementing the byte toward zero and testing for zero as is well known, the MOVE command to I/O device is inactivated. At this time, an oscillator (not shown), which may be a series of program steps, counts go-down time (byte 4) toward zero. At the end of the go-down time, ending status is given to the channel.

Chained to this command is a READ FORWARD command which then reads the block spaced over at CCCW-2. During this command, the actual read function is not performed because of the DMR flag being active and the program branching to step 110A to set the tape device to move tape in the forward direction as commanded by the READ FORWARD, set the data flow in accordance with the READ command at 111A, and then performing the microprogramming function of DIAGNOSTIC MEASURE at 112A. In this microprogrammed function, tachometer signals from I/O device are supplied to I/O controller 11. I/O controller 11 determines the elapsed time between successive positive transitions of the supplied tachometer pulses. Upon each positive tachometer pulse, control 83 responds to the change in polarity to transfer the count accumulated in LSR 75 as a data byte to channel 114 in accordance with known techniques. This is repeated for the duration of the go-up time and during a first portion of the go-down time until the tape has actually stopped.

The go-down time in CCCW-6 is changed for maintaining the tape in a stopped condition for a predetermined time.

Upon expiration of that time, ENDING STATUS is again sent to the channel with a new command requested.

At CCCW-7, another SET DIAGNOSE with DMR bit active is forwarded. Chained to this is a READ FORWARD command for determining read access from a stop condition to a downstream data block. The READ FORWARD indicates the direction of data flow, i.e., to I/O controller 11. The data supplied to I/O channel 11 is not data from the tape but rather the counts generated by I/O controller 11 between successive ones of positive transitions from tachometer signals supplied by I/O device 13. The generation of the count may be by counting program steps as a time base between two successive positive transitions as is well known. Each time a positive transition is detected, control 83 stops the count and causes the count, as accumulated in LSR 75, to be transferred to I/O channel 114.

Upon expiration of the go-up time, there is another go-down time which causes the tape to stop. Since DMR bit is active, the elapsed time between successive positive transitions of a tachometer signal is again sent until the tape is stopped. No further action occurs until expiration of the go-down time, at which time steps 104 et seq are performed.

INTERPRETATION OF OTHER MICROPROGRAM BITS

Byte 1 bit 1, when followed by a READ command, measures an IBG length using the technique described with respect to CCCW-2 et seq. Bit 2 is a read access measurement as described with respect to CCCW-8.

Bit 4 is a read stop bit which enables a normal READ command to be executed at 103A with the tape being automatically stopped.

In the write area, bit 0 being active indicates a DIAGNOSTIC WRITE. A special pattern can be written on magnetic tape. Upon completion of DIAGNOSTIC WRITE, all flags in the microprogram area are erased, the tape is stopped, and the I/O controller waits for further instructions from channel 114. In this particular instance, the microprogram bit 0 of byte 1 indicates to the I/O controller from the controlling system that the diagnostic flags are to be reset upon completion of the DIAGNOSTIC WRITE function. Note that other flag bits or microprogram bits are not reset upon completion of the microprogram commanded function.

Depending upon design considerations, any of the microprogram bits may be reset upon completing a function, either microprogram determined or commanded. In one constructed embodiment, the LWR microprogram bit 1–5 on write was reset at the end of the commanded write function, while the DMR microprogram bit 1–5 on read was not so reset upon completion of the commanded read function. In that particular embodiment, the DIAGNOSTIC WRITE bit was not reset upon completion of the microprogram function.

In byte 1, in the write mode, bits 2 and 4 respectively inhibit postamble and preamble. This is used in diagnostics with phase-encoded recording. It is remembered that the postamble and preamble are a series of binary zeroes recorded in adjacent data blocks for synchronizing VFC in a self-clocking system. By inhibiting the recording of these preambles and postambles, diagnostic time can be reduced.

BYTE 2 MICROPROGRAM BITS--ENDING STATUS BITS

Byte 2 has four bits relating to the present invention. Bit 0 is block unit check, bit 1 is set device busy, bit 2 is block interrupt, and bit 3 is ARM CUB (control unit busy). A brief description of such functions will suffice for practicing the present invention with respect to using these flag bytes as a microprogram variation of functions being performed in accordance with commanded operations. The ARM CUB flowcharts are detailed later. The below flowchart represents the functions performable in FIG. 3 at steps 104, 105, or 106, not necessarily in the same sequence.

Step E1 — FUNCTION: Assemble ending status. Various indicators stored in LSR 75, as well as latches in CU (latches not shown), are sensed by a program executed from ROS 65 and assembled into a selected work register in LSR 75 for transmittal to I/O channel 114 simultaneously with a STATIN signal during step 107A of the FIG. 3 flowchart.

Step E2 — FUNCTION: Sense for BLOCK UNIT CHECK flag being active at step 104A of FIG. 3. This determines whether or not a UNIT CHECK signal can be sent to channel 114. If the BLOCK UNIT CHECK flag (byte 2 bit 0) is active, inhibit status at 105A; that is, erase any UNIT CHECK signal that may have been assembled during E1.

Step E3 — FUNCTION: Check LSR 75 for byte 2 bit 1. LSR 75 is read out and exclusive-OR compared with a mask associated with an instruction word in ROS 65. If the DEVICE BUSY flag is active, DEVICE BUSY is indicated to I/O channel 114 in initial status of the next command sequence.

Step E4 — FUNCTION: Byte 2 bit 3 ARM CUB is checked. If this bit is active, I/O channel 114 has commanded I/O controller 11 to send a CONTROL UNIT BUSY signal in the following initial status portion (not shown) closely associated with Steps M1–M18 and decode 100A. This bit does not affect any ending status, but is sent as an anomalous indication during initial selection. Also, byte 2 bit 2, BLOCK INTERRUPT, is checked to see whether or not interrupts or request in's are to be blocked. Such reguest in signal requests further action from I/O channel. Blocking such request signals enables a greater variety of diagnostic procedures to be implemented and verification of interface circuit operation.

Since the above programming, for effecting the described function, is readily established, further detail is omitted for clarity and simplicity.

SUMMARY

As can become apparent from a reading of this description, the microprogram modification of commanded functions, substitution of microprogram commanded functions for that normally associated with a received command, adding microprogram functions to commanded functions, establishing data flow in accordance with data flow associated with the normally commanded function, and modifying commanded functions using microprogram techniques, can be applied to multiprocessing systems, CPU-peripheral subsystems, and the like with equal facility. Various imposed modes, through the use of microprogram bits, enable a greater flexibility between associated data processing devices of systems. Note that initial status, ending status, or functions to be performed, can be substituted for or modified in accordance with microprogramming in accordance with the present invention.

I/O CONTROLLER 11 AND ITS RELATIONSHIP TO THE SYSTEM

I/O controller 11 operates with the channel described in the Moyer et al., U.S. Pat. No. 3,303,476. FIGS. 1 and 3 of that patent describe all tag signals used herein except SUPPRESSIBLE REQUEST IN which is defined with respect to MPUX (channel MPU) microprograms. It also assumes that the interface between the controller and the I/O devices follows a similar bus-out, bus-in, tag-line arrangement. In addition to the functions described in the Moyer et al patent supra, a tachometer input line is provided to I/O controller 11, as later described.

Figure 4:
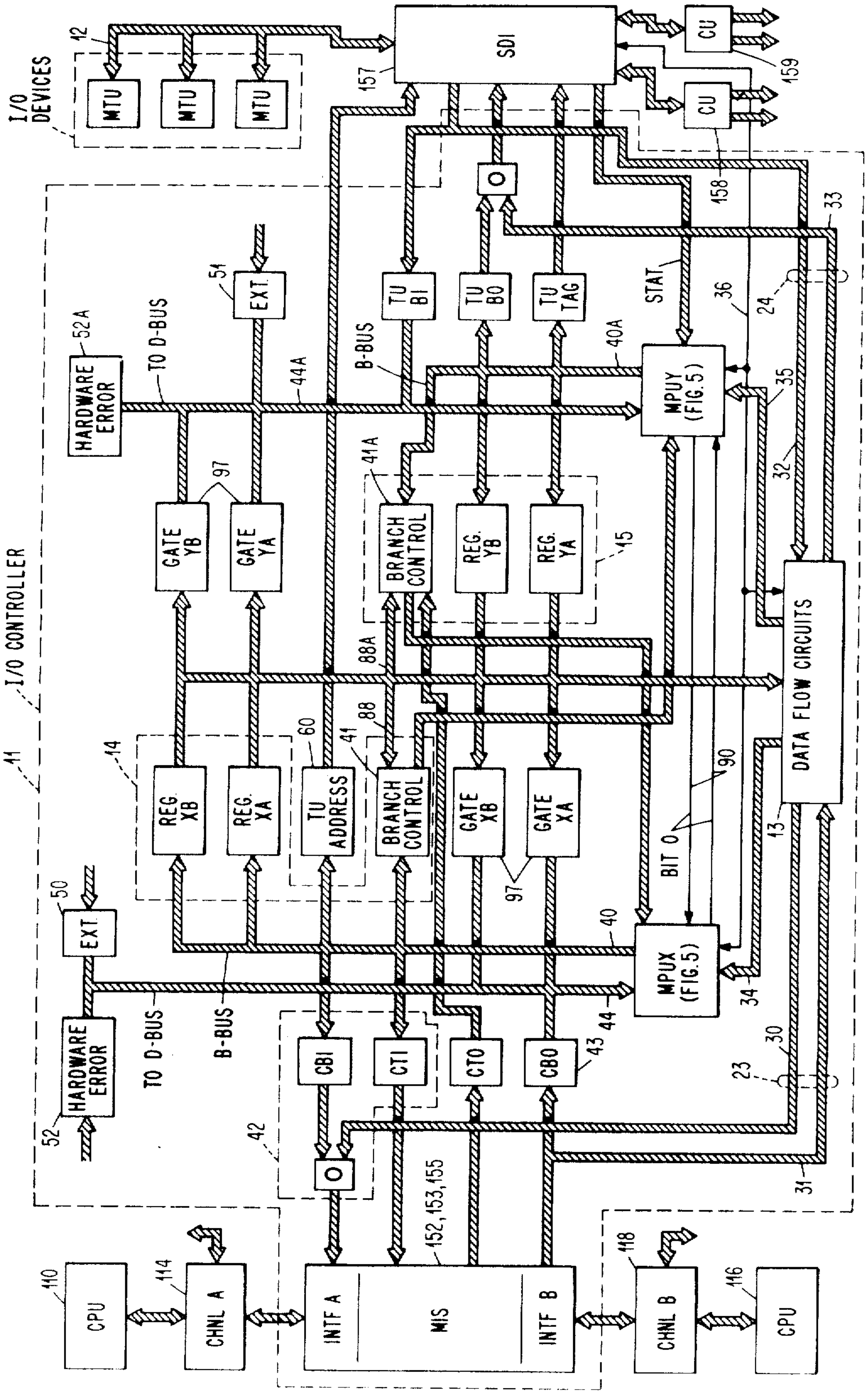
FIG. 4 is a simplified logic block diagram of an I/O controller usable with the FIG. 7 illustrated system.

The term "CPU" is hereafter used to include the channel portions of data processors. I/O controller 11 provides control for exchanging information-bearing signals between CPU's and I/O devices, such as magnetic tape units (MTU's) via cable 12 (FIG. 4).

I/O controller 11 has three main sections. MPUX is a microprogrammable unit (MPU) providing synchronization and control functions between the I/O controller 11 and channels 114 and 118. MPUY performs similar functions with I/O devices via SDI 157. In a magnetic tape subsystem, MPUY provides motion control and other operational related functions uniquely associated with the I/O device. The third section is data flow circuits 13, which actually process the information-bearing signals. Data flow circuits 13 may consist of entirely a hardware set of sequences and circuits for performing information-bearing signal exchange operations. In an I/O controller associated with a magnetic tape recording system, such data flow circuits include writing circuits for both PE and NRZI, readback circuits for both encoding schemes, deskewing operations, certain diagnostic functions, and logging operations associated with operating a magnetic tape subsystem.

Since MPUX and MPUY are independently operable, each having its own programs of microinstructions, program synchronization and coordination are provided. To this end, MPUX has exchange registers 14 while MPUY has exchange registers 15. The signals from the MPU's temporarily stored in these registers are supplied directly to data flow circuits 13 for effecting and supervising data flow and signal processing operations. Additionally, such signals are simultaneously provided to the other MPU. That is, register 15 supplies MPUY output signals to MPUX and register 14 supplies the MPUX output signals to MPUY. The respective MPU's under microprogram control selectively receive such signals for program coordination.

The channels exchange control signals with MPUX over CTO (channel tag out), CTI (channel tag in), CBO (channel bus out), and CBI, plus trap control line 17. When the trap line is actuated, MPUX aborts all present operations and branches to a fixed address for analyzing signals on CBO. These signals force MPUX to perform channel commands or selected functions. In a similar manner, MPUX has trap control line 18 extending to MPUY. MPUY responds to an actuating signal on line 18 from MPUX in the same manner that MPUX responds to a trap signal on line 17. MPUY, in addition to exchanging control signals with I/O devices, also has trap line 21 for controlling an I/O device in a similar manner. All information-bearing signals are processed through data flow circuits 13 via full-duplex cables 23 and 24.

Data flow circuits 13 have CBI lines 30 and CBO lines 31. Each set of lines has a capability of transferring one byte of data plus parity. Similarly, tape unit bus in (TUBI) lines 32 transfer signals to data flow circuits 13 and MPUY to the I/O devices via SDI 157. Tape unit bus out (TUBO) lines 33 carry information-bearing signals for recording in MTU's plus commands from MPUY and MTU addresses from MPUX. Status signals are supplied both to MPUX and MPUY over status cables 34 and 35. Velocity or tachometer signals supplied by the selected and actuated MTU are received over line 36 by MPUX, MPUY, and data flow circuits 13.

MPUX has output bus 40 (also termed B bus) supplying signals to its exchange registers 14. These include branch control register 41, register XA, and register XB. Output bus 40 is also connected to the channel exchanging registers 42. These registers are CTI and CBI. CBI is channel bus in, while CTI is channel tag in. CTI transfers the tag signals from I/O controller 11 to CPU as described in the Moyer et al patent and other control signals for interfacing operations.

Additionally, CBO gate 43 receives bytes of data for data flow circuits 13 and for MPUX. Gates XA and XB similarly gate exchange signals from the MPUY exchange registers 15. Gate XA receives the control signals from register YA while gate XB receives exchange signals from register YB. CBI register is shared by MPUX and data flow circuits 13. The CBI lines are multiplexed in accordance with the Moyer et al patent. CTI supplies tags indicating what the bus in signals mean.

Signals in TUBO register output lines 33 are interpreted by the MTU's in accordance with the signals in TUTAG (tape unit tag) register.

External signals are supplied to MPUX and MPUY via external registers 50 and 51, respectively. Such external signals may be from another I/O controller, from a maintenance panel, communication network, and the like. Also, hardware detected errors are lodged in register 52 for sampling by MPUX.

I/O controller 11 has an efficient initial selection process. MPUX responds to a channel SELO request for service of an MTU to provide MTU address over output line 40 into TU address register 60; from there, the address is sent to all MTU's. The appropriately addressed MTU responds to MPUY that the selection is permissible or not permissible. If permissible, a connection is made; MPUY notifies MPUX via register YA. Mpux then completes the initial selection by responding to the requesting channel via CTI and MIS 155. Data processing operations then ensue.

MICROPROGRAMMABLE UNITS (MPU'S)

The MPU's contain microprograms which determine the logic of operation of I/O controller 11. MPUX contains a set of microprograms in its control memory designed to provide responsiveness and data transfers with the channels. In a similar manner, MPUY contains a set of microprograms for operation with the various MTU's. Registers 14 and 15 contain signals from the respective microprograms which serve as inputs to the respective programs for coordinating and synchronizing execution of various functions being performed. A better understanding of how the microprograms operate the hardware is attained by first understanding the logic construction of the MPU's which are constructed in an identical manner.

Figure 5:
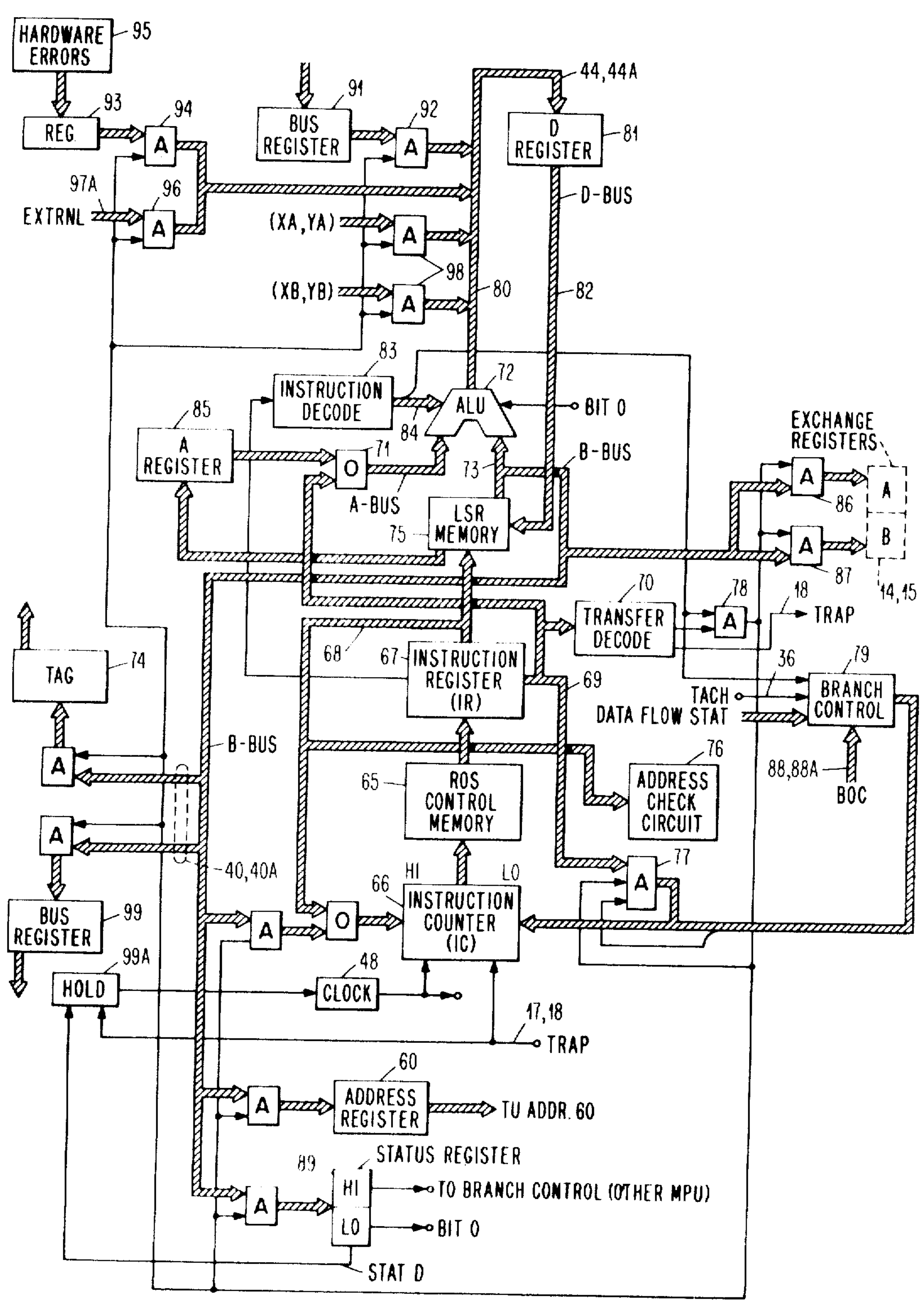
FIG. 5 is a simplified logic block diagram of a microprocessing unit (MPU) usable with the I/O controller illustrated in FIG. 4.

Referring more particularly to FIG. 5, an MPU usable in I/O controller 11 is described in a simplified block diagram form. Data transfers are serially in bytes of eight bits each. The microprograms are contained in read only store (ROS) control memory 65. While a writable store could be used, for cost-reduction purposes, it is desired to use a ROS type of memory. The construction and accessing of such memories are well known. The ROS output signal word, which is the instruction word, is located by the contents of instruction counter (IC) 66. IC 66 may be incremented or decremented for each cycle of operation of MPU. By inserting a new set of numbers in IC 66, an instruction branch operation is effected. The instruction word from ROS 65 is supplied to instruction register (IR) 67 which staticizes the signals for about one cycle of operation. The staticized signals are supplied over cables 68 and 69 to various units in MPU. Cable 68 carries signals representative of control portions of the instruction word, such as the operation code and the like. Signals in cable 68 are supplied to IC 66 for effecting branching and instruction address modifications. Cable 69, on the other hand, carries signals representative of data addresses. These are supplied to transfer decode circuits 70 which respond to the signals for controlling various transfer gates within MPU. The other portions of the signals are supplied through OR circuits 71 to arithmetic logic unit (ALU) 72. In ALU 72, such signals may be merged or arithmetically combined with signals received over B bus 73 for indexing or other data processing operations. MPU has local store register memory (LSR) 75 accessible in accordance with the address signals carried over cable 68. Address check circuit 76 verifies parity in the address. The address signals may also be used in branch operations. AND circuits 77 are responsive to transfer decode signals supplied from circuits 70 through AND circuits 78 to transfer the address signals in an instruction word to IC 66. Such transfer may be under direct control of the operation portion of the instruction word as determined by transfer decode circuits 70 or may be a branch on condition (BOC) as determined by branch control circuits 77 in accordance with the conditions supplied thereto, as will become apparent.

The data flow and arithmetic processing properties of the MPU center around ALU 72. ALU 72 has two byte inputs, the A bus from OR circuits 71 and B bus 73. ALU 72 supplies output signals over cable 80 to D register 81. D register 81 supplies staticized signals over D bus 82 to LSR 75. Instruction decode circuits 83 receive operation codes from IR 67 and supply decoded control signals over cable 84 to ALU 72 and to AND circuits 78 for selectively transferring signals within MPU.

ALU 72 has a limited repertoire of operations. Instruction decode 83 decodes four bits from the instruction word to provide 16 possible operations. These operations are set forth in the Instruction Word List below:

TABLE I

Instruction Word List

| Op Code | Mnemonic | Function |
|---|---|---|
| 0 | STO | Store constant in LSR A set to 0 |
| 1 | STOH | Store constant in LSR, indexed addressing |
| 2 | BCL | Match with Field 1, branch to Addr in Field 2 |
| 3 | BCH | Match with Field 1, branch to Addr in Field 2 |
| 4 | XFR | Contents of one selected LSR location is transferred to selected register or selected input is gated to one selected LSR location |
| 5 | XFRH | See XFR above plus indexed addressing |
| 6 | BU | Branch to 12-bit ROS address in instruction word |
| 7 | 00 | Not used — illegal code |
| 8 | ORI | A OR'd with B, result stored in LSR 75 |
| 9 | ORM | A OR'd with B, result not stored |
| A | ADD | A plus B, sum stored in LSR 75 |
| B | ADDM | A plus B, sum not stored |
| C | AND | A ANDed with B, result to LSR 75 |
| D | ANDM | A ANDed with B, result not stored |
| E | XO | A EXCLUSIVE OR B, result to LSR 75 |
| F | XOM | A EXCLUSIVE OR B, result not stored |

In the above list, the letter "A" means A register 85, "B" is the B bus, and the mnemonics are for programming purposes. The term "selected input" indicates one of the hardware input gates (92, 94, 96 98) to the ALU output bus 80. The term "selected register" indicates one of the "hardware" registers in MPU. These include the interconnect registers 14 and 15 (FIG. 4), tag register 74, bus register 99, address register 60, and IC 66. Note that the transfers from LSR 75 to these selected registers are via B bus 73. In FIG. 4, the B bus for MPUX corresponds to cable 40, while the MPUY B bus is cable 40A. Registers 14 receive signals via AND circuits 86 and 87. In MPUY, AND circuits 86 and 87 supply signals to exchange registers 15. Branch control 79 in FIG. 5 is the internal branch control. Branch controls 41 and 41A of FIG. 7 supply their signals respectively over cables 88 and 87A to the respective MTU's. These branch controls are separate circuits. Tag register 74 in FIG. 3 for MPUX corresponds to CTI register in the channel exchange registers 42. For MPUY, it corresponds to TUTAG register connected to SDI 157. In a similar manner, bus register 87 for MPUX is register CBI in channel exchanging registers 42, while in MPUY it is register TUBO. Address register 60 of FIG. 5 corresponds to TU address register 60 of FIG. 4. MPUY address register 60 is not used.

Status register 89 has several output connections from the respective MPU's. It is divided into a high- and low-order portion. The high-order portion has STAT (status) bits 0–3, while the low-order portion has STAT bit 0 plus STAT bits 4–7 (referred to as STAT A through STAT D, respectively). The low-order portion is supplied to the branch control 79 of the other MPU's. The bits 0 and 4–7 are supplied to the data flow. Bit 7 additionally is supplied directly to the ALU 72 of MPUY as indicated by lines 90 in FIG. 4. This corresponds to a self-trapping operation which will be later described. Interpretation of the STAT bits is microprogram determined.

The signal-receiving portions of each MPU are in four categories. First, bus register 91 is designed to receive tags and data bytes for MPUY; this corresponds to CBO register 43 of FIG. 4. An MPUY bus register 91 is TUBI register. AND circuit 92 is responsive to the transfer decode signals from circuits 70 to selectively gate bus register 81. From thence, the data bytes are supplied to LSR 75. Secondly, D register 81 also receives inputs from hardware error register 93 via AND circuit 94. Hardware error signals (parity errors, etc.) are generated in circuit 95 in accordance with known techniques. Thirdly, AND circuit 96 receives external data signals over cable 97A for supplying same to D register 81 under microprogram control. Fourthly, interchange registers 14 and 15 respectively supply signals to pairs of AND circuits 98 which selectively gate the interchange signals to D register 81 under microprogram control. The receiving microprogram controls the reception of interchange signals from the other MPU.

Generally, the outgoing signals from each MPU are supplied via B bus 73, also a main input bus to ALU 72. The signal-receiving bus is the D bus, which is the input bus for LSR 75 and the output bus for ALU 72.

Since ALU 72 has a limited repertoire of operations, many of the operations performed are simple transfer operations without arithmetic functions being performed. For example, for OP code 4, which is a transfer instruction, the contents of the addressed LSR are transferred to a selected register. This selected register may be A register 85 in addition to the output registers. To add two numbers together in ALU 72, a transfer is first made to A register 85. The next addressed LSR is supplied to the B bus and added to the A register contents with the result being stored in D register 81. At the completion of the ADD cycle, the contents or result of D register 81 are stored in LSR 75. If it is desired to output the results of the arithmetic operation, then another cycle is used to transfer the results from LSR 75 over B bus 73 to a selected output register such as one of the interchange registers or bus register 87.

In FIG. 5, the input to D register 81 is either cable 44 or 44A of FIG. 4. Hardware error circuits 95 and error register 93 of FIG. 5 correspond both to the hardware error circuits 52 and 52A of FIG. 4. External cables 97A receive signals from the external registers 50 and 51 respectively for the two MPU's.

AND circuits 98 of FIG. 5 correspond to the gates XA, XB, YA, and YB of FIG. 4.

Figure 6:
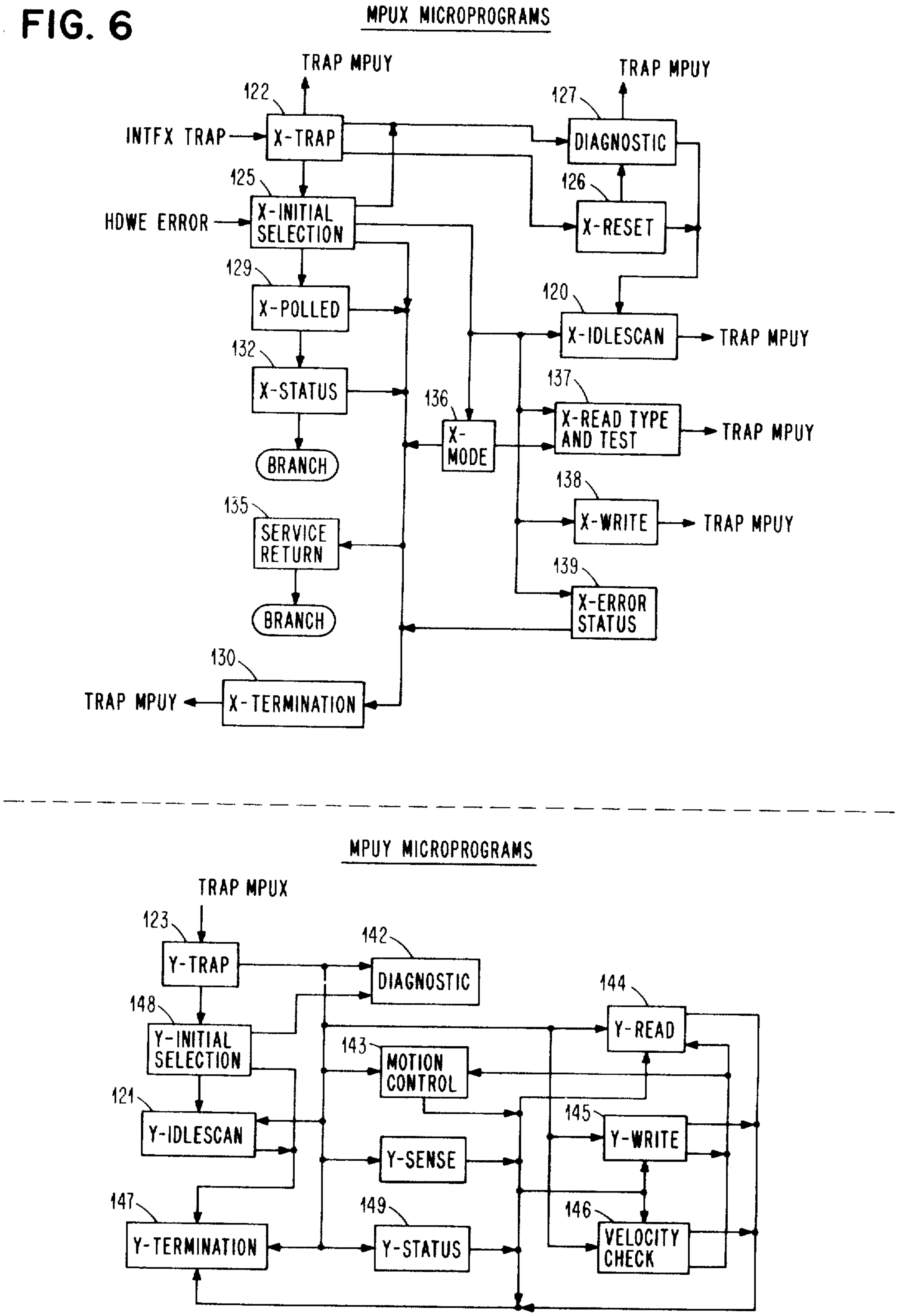
FIG. 6 is a simplified block diagram of microprograms resident in the FIG. 5 illustrated microprocessor used to operate the FIG. 7 illustrated peripheral device subsystem.

Each MPU is trapped to a predetermined routine by a signal on trap line 17 or 18, respectively; the trap signal forces IC 66 to all zeroes. At ROS address 000, the instruction word initiates X-trap routine or Y-trap routine (FIG. 6). For reliability purposes, it is desirable to force MPUY to inactivity. This means that clock or oscillator 48 is gated to an inactive state. During normal operations, clock 48 supplies timing pulses to advance IC 66 and coordinate operations of the various MPU's as is well known. Whenever MPUY has finished its operations, it sets STAT D in register 89. STAT D indicated MPUY has finished its operations as requested by MPUX. The STAT D signal sets hold latch 99A indicating that MPUY is inactive. Hold latch 99A gates clock 48 to the inactive condition. When MPUX traps MPUY, not only is IC 66 preset to all zeroes, but hold latch 99A is reset. Clock 49 is then enabled for operating MPUY.

MICROPROGRAMMING GENERALLY

FIG. 6 shows general relationships between the micro-routines of MPUX and MPUY. This showing is greatly simplified to give a general impression of how the microroutines cooperate to perform I/O controller functions. Many of the functions performed by these micro-routines have been performed before in other I/O controllers, usually by hardware sequences. Some micro-routines of lesser importance to the present invention have been omitted for clarity. The described routines were selected to illustrate the operating relationships of MPUX, MPUY, data flow circuits 13, MTU's, and CPU in evaluating subsystem performance by concurrent diagnostics as more clearly brought out later.

X-idlescan 120 and Y-idlescan 121 monitor pending status, interrupt status, and provide intercommunication between the two MPU's for ascertaining availability of the I/O devices. X-idlescan 120 includes trapping MPUY via Y-idlescan 121 for polling I/O devices via SDI 157 to determine availability of an addressed MTU. Included in X-idlescan is a wait routine which idles MPUX until trapped by a channel. The channel traps MPUX to ROS 65 address 000. At MPUX ROS address 000, X-trap 122 begins. During the execution of X-trap routine 122, MPUY is trapped to ROS address 000 to later execute Y-trap routine 123. In X-trap 122, CTO is sensed for for initial selection. If the initial selection tag is active, X-trap routine branches the microprogram to X-initial selection 125. If there is no initial selection, then either X-RESET 126 or an ALU diagnostic within diagnostic routine 127 is performed. Upon completion of these functions, X-idlescan 120 may be re-entered to complete MTU scanning operations. Initial selection 125 is responsive to certain hardware errors received at 128 to stop I/O controller 11 for indicating detected hardware errors.

During an initial selection, X-polled 129 is entered to further identify the channel request. Also, certain branch conditions are set up in LSR for use later by X-termination 130. MTU address verification may be performed. Upon completion of the branch setups, the X-polled 129 initiates X-status 132. X-status 132 activates CTI to send tag signals to the channel interface indicating controller status in response to the previously received requests. Based upon the branching set up in X-polled 129, the micro-program execution may follow several routes. These primarily end up in X-termination 130 which terminates the MPUX operation. MPUS then scans for further interrupts. With all scanning completed, MPUX waits for further instructions from either channel 114 or 118.

Another routine is service return (SERVRTN) 135 used in conjunction with the channel interface circuits 152 and 153 for timing and control purposes during data transfers. The operation of the above-referred-to data channel in Moyer et al is implemented by SERVRTN 135. Another ossible routine entered from initial selection 125 is X-mode 136, which determines the mode of operation in the controller in response to channel CMDO (command out signals. X-read type and test 137 is entered in the event the initial selection results in a read operation. X-read type and test 137 traps MPUY to predetermined ROS control memory addresses for initializing a read operation within MPUY. In a similar manner, X-write 138 is entered and also traps MPUY to another subroutine for initializing a write operation. Error status 139 transfers error information to CPU. This routine is closely associated with initializing I/O cotroller 11 for read and write. Sense 140 is entered in response to a channel sense command. Sensing transfers sense bytes to CPU for analysis. X-termination 130 also traps MPUY in connection with the selecting activated MTU's and for performing other functions in connection with terminating an operation previously initiated through a channel. MPUY micro-routines respond to MPUX microroutines for controlling various MTU's via SDI 157. These micro-routines also transfer information control signals, I/O devices, and SDI 157 to MPUX for retransmittal to channel and CPU. Upon being trapped by MPUX, Y-trap 123 obtains an MPUY ROS address from XB register and then branches to that address. Such ROS addresses are the first instruction address of several MPUY microprograms. For example, one address initiates diagnostic 142. Diagnostic 142 may initiate one of several microprograms for effecting operations in CU 11 or an MTU for diagnostic purposes. Such program connections are not shown.

On the other hand, Y-trap routine 123 may branch to Y-initial selection 148 to initialize MPUY for activity set forth in additional control signals from MPUX in registers 14. This may include an initiation of status 149, termination 147, or Y-idlescan 121. The MTU operating routines 143–146 may also be initiated from initial selection 148. In addition to exchanging control signals via registers 14 and 15, status information is freely exchanged between the two MPU's for microprogram coordination.

SYSTEM ORGANIZATION

Figure 7:
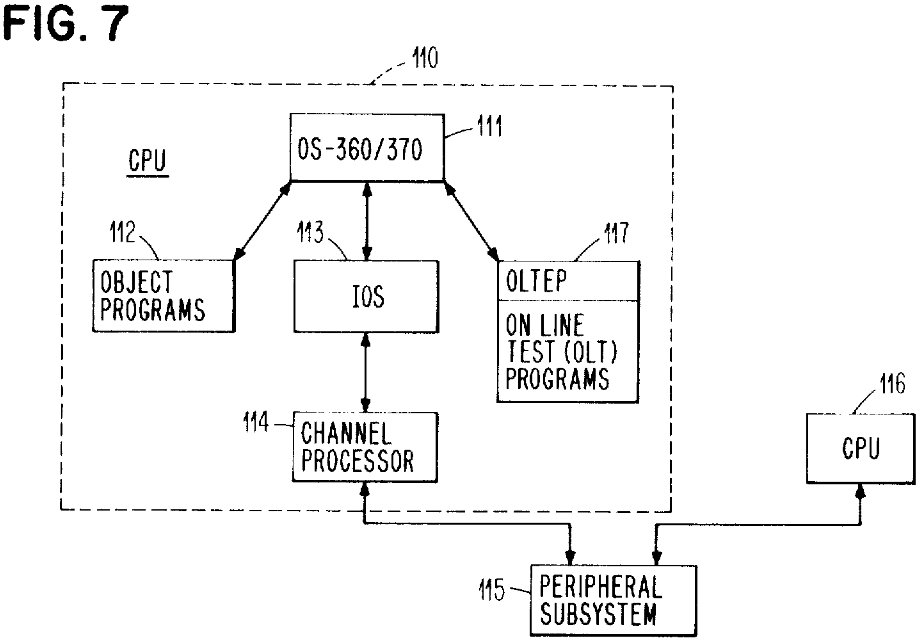
FIG. 7 is a simplified block diagram of a system incorporating the teachings of the present invention.

Referring to FIG. 7, the environment in which the present invention may be practiced is shown in simplified form. CPU 110 has an operating system such as OS/360 or OS/370 at 111. OS is an executive which calls in object programs 112 for performing data processing operations, as is well known. The input/output program module 113 (IOS) program connects a channel processor 114 to OS 111 for effecting input/output operations. Channel processor 114, in turn, communicates with one or more peripheral subsystems 115 which perform the actual I/O operations. The peripheral subsystem additionally, through MIS, in connectable to another CPU 116 which is organized in the same manner as CPU 110. Additionally, CPU 110 has a set of diagnostic programs 117 which includes OLTEP and a set of OLT's. The OLT's may be resident or a disk subsystem (not shown) and callable into magnetic core memory of CPU 110 upon initiation by an IPL. Once an OLT is resident in CPU 110, it calls in operation of peripheral subsystem 115 through the programmed and hardware chains just described. The OLT controls CPU 110 just long enough to initiate operations of peripheral subsystem 115 during a diagnostic mode. During such diagnostic mode, channel processor 114 may be dedicated to the diagnostic procedure. Additionally, CPU 110 may have a plurality of such channel processors. In the alternative, channel processor 114 may service several I/O subsystems with each subsystem being, in turn dedicated to an I/O function such as concurrent diagnostic or a data processing operation. Each channel processor 114, of course, services several peripheral subsystems, only one of which is shown in FIG. 7.

DESCRIPTION OF FLOWCHARTS

Figure 2:
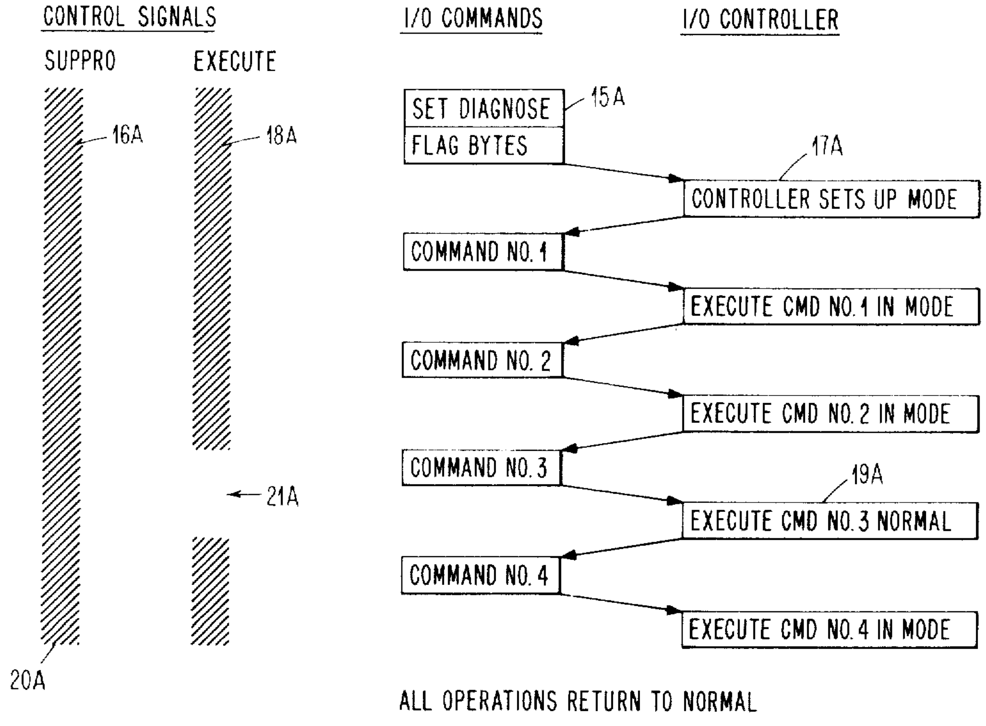
FIG. 2 is a simplified flowchart showing the operation of an I/O controller and a CPU in accordance with practicing the present invention.
Figure 9:
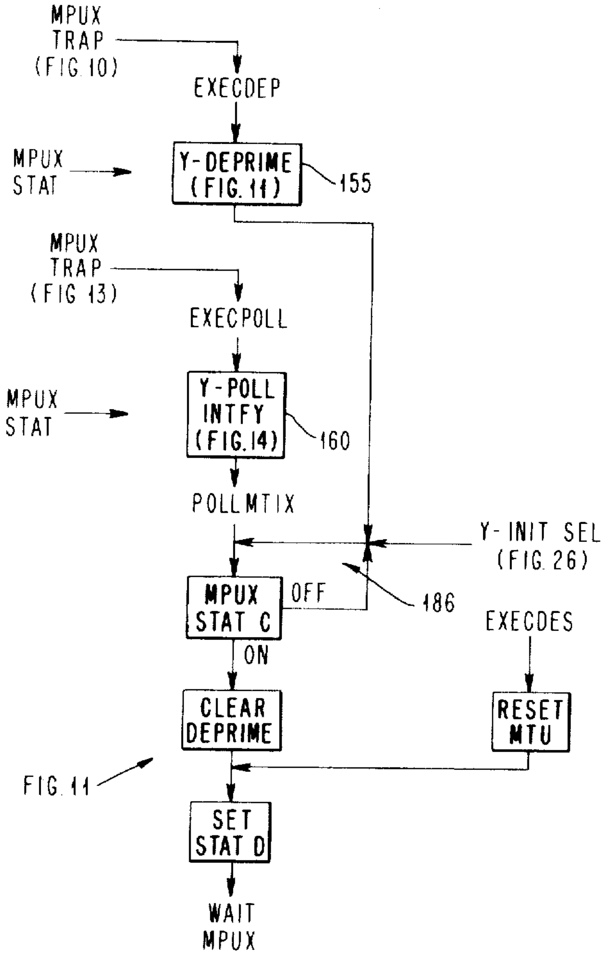

In FIG. 8, upon completion of check pending status 152, four subroutines for interrupt scanning are serially entered. The first is X-DEPRIME 154. This subroutine sets up MPUX for interrupt scanning and traps MPUY to EXEXDEP in Y-DEPRIME 155 (FIG. 9). MPUY subroutine 155, explained in detail later with respect to FIG. 11, scans its LSR byte registers 111–114 as set forth in Table I. Upon a hit, the MTU address is supplied to its interchange register YA; and the B bit of its stat register 89 is set. MPUX, upon detection of stat-B active, fetches the device address via YA gate 97 (FIG. 2). Scanning requires that MUPX set its stat-C bit to indicate that an MTU is being selected. MPUY, upon sensing MPUY stat C, enters check MPUY status 156. This subroutine not only fetches the MTU address, but also checks various status bits, errors, and stores the status in its own LSR. The MTU address is verified in subroutine 157.

After address verification, MPUX enters X-poll INTFY 158. Subroutine 158 traps MPUY to EXECPOLL in Y-poll INTFY 160. In subroutine 160, MPUY polls INTFY for its activity and status. As soon as INTFY is detected as being active, i.e., the selected MTU has responded, the scanning sequence is returned to MPUX indicating that INTFY has been polled (MPUY) stat C is active). MPUX then responds by setting the device status in its own LSR and supplying control signals to INTFX entitled "SUPPRESSIBLE REQUEST IN" which indicate to CPU that the peripheral subsystem is available for performing the requested function. MPUX exits X-poll INTFY 158 to IDLEPEND 150. It then waits for CPU to initiate further action. MPUY exits subroutine 154 to wait MPUX via POLLMTIX as explained with respect to FIG. 11.

With particular reference now to FIGS. 10 and 11, the X-DEPRIME 154 and Y-DEPRIME 155 subroutines are described. Interrupt scan is initiated through the entry of X-DEPRIME 154 at 163. The first action is to set DEVICE END in LSR and clear MPUX status register 89 to all zeroes. This action indicates that channel A activity is being checked first and that no MTU is being selected. Then, in test step 164, MPUX determines whether or not I/O controller 11 has been previously reserved to INTFX. If it has been reserved, then in step 165, MPUX determines whether or not it is channel A or channel B. If it is channel B, stat B is set to 1 requiring MPUY to scan channel B DEPRIMES. Otherwise, stat B is reset indicating that channel A DEPRIMES are to be scanned. In the even that I/O controller 11 was not reserved, step 165 is bypassed.

In step 166, MPUY is trapped to Y-DEPRIME at EXECDEP 155. AT this time, MPUX may enter another program returning to check MPUY status 156 at some later time. In this description, MPUS idles until MPUY has completed Y-DEPRIME 155.

Upon being trapped, MPUY enters Y-DEPRIME subroutine 155 at 170 (FIG. 11). First, MPUY determines whether channel A or channel B is to be scanned. This affects LSR addressing during the scan operation. Depending on whether channel A or B is indicated by MPUX stat B, steps 171 or 172 are entered. These steps set MPUY to either scan A or B DEPRIMES. If there are no hits in the scan, MPUY sets stat D (no primes found) in step 173 and waits for MPUX. When no DEPRIME is found in step 179 at a given LSR location, the microprogram indexes the scan in step 177 to the next MTU address. The scan count is also indexed. Decision step 178 compares the scan count with the number of attached MTU's. If the scan is completed, no DEPRIMES were found. Then step 173 sets stat D and MPUY waits MPUX. If the scan is not done, the next DEPRIME location is examined in step 179.

Upon detection of a DEPRIME in step 179, the MTU address is supplied to YA and stat B is set. Stat C informs MPUX that the MTU address is available in YA. MPUY at 180 then waits for MPUX to fetch the MTU address. When MPUX sets its stat C (FIG. 12, step 189), then MPUY resets its stat C for continuing Y-DEPRIME 155. As soon as MPUS sets stat C, MPUY executes step 182 to determine whether or not the address MTU is switched, i.e., connected to another I/O controller (not shown). If so, the addressed MTU is not available; and the scan continues via indexing step 177. When the addressed MTU is available, its sense data is fetched in step 185. Stat C is then reset. Next, in decision step 181, MPUY determines whether or not the addressed MTU is busy. If it is busy, then the scan is continued via indexing step 177. When the MTU corresponding with the sensed DEPRIME is not busy, MPUY sets stat C in step 183 and enters Y-idlescan (FIG. 9) via POLLMTIX. In POLLMTIX (FIG. 9), MPUY waits at 186 for MPUX to set stat C (FIG. 12). MPUX has fetched MTU address from YA. As soon as MPUX stat C is sensed, MPUY clears DEPRIME in LSR and sets stat D to wait MPUX.

Returning now to MPUX, its last-described operation was step 166 (FIG. 10) wherein it trapped MPUY to perform the operations just described with respect to FIG. 11. MPUX may then enter other programs; but, eventually, it returns to the idelscan routine at 187 of FIG. 12 for checking MPUY status. First of all, in step 188, MPUX determines whether MPUY has set stat C or D, i.e., whether or not a DEPRIME has been detected or a scan has been completed. MPUS waits at 188 until one of the two MPUY stats are activated. First, assuming that stat C is set, then the MTU address must be verified. In step 189, MPUX fetches the MTU address from YA register 15. This MUT address is then transferred in step 189 to TU address register 60 (FIG. 2). Simultaneously, a tag line to MTU's (not shown) entitled "select" is activated such that every MTU examines the address in TU register 60. MPUX also sets stat C to indicate to MPUY that the MTU is being selected. Assuming that MPUY stat C remains on, in branch step 190, the micro-routine moves to step 191 wherein the MTU address is transferred to LSR. This is a memory operation such that MPUX can perform later-described operations with regard to the selection of the addressed MTU. Then the X-termination 130 is entered at TERMSTAT informing INTFX of the acquired status data and enables MPUX to wait for further instrucitons.

Next, assuming that MPUY stat C is off (MTU address was not in YA), stat B of MPUY is on (MTU address now in YA); then the routine is re-entered at point 192 wherein the MTU address is fetched from YA. When stats B, C, and D are all off, MPUX waits MPUY at 193 until one of the three stats is set. Assuming next that MPUY stat D is set on and stats B and C are off, further status checking is required. There may be an error. First, if there is an error, an ALU diagnostic (DIAG 127) is entered. If there is no error, it is again checked whether or not the I/O controller has been reserved by INTFX. If it has been reserved, X-polled 129 (FIG. 17) is now entered. This is done to determine whether or not the I/O controller has been polled on a reserve status. Similarly, if MPUX stat B is on, the same routine is entered. If both of these conditions are off, then MPUX sets stat B and B-interface flag (channel B active). After doing this, the routine is re-entered at point 192 until a change in status causes the micro-routine to branch to one of the other above-described destinations.

Returning now to the wait cycle 188, assume that MPUY stat D is on, i.e, no DEPRIMES have been detected. First, in step 195, MPUY error indications are checked. If there is an error, a diagnostic routine operable with the MPUY is entered. If there is no error, the reserve status of I/O controller is checked in step 196. If it is reserved, or if controller 11 is not reserved and MPUX stat B is off, then X-polled 129 shown in FIG. 13 is entered at POLLMTI. This routine will initiate polling an addressed MTU to determine its status. If the MPUY stat B is on, the A DEPRIMES have been scanned such that B DEPRIMES may now be scanned. The B-interface flag is set on, and the micro-routine returns to step 166 in FIG. 10 for trapping MPUY to scan B DEPRIMES.

X-polled 129 (FIG. 13) is performed as follows. First, in step 200, LSR registers containing motion control and status information are cleared in preparation for acquiring status data from the polling. In step 201, MPUX traps MPUY to Y-poll INTFY 160 at EXEC-POLL as next explained with respect to FIG. 14.

MPUY enters Y-poll INTFY 160 via MPUX trap. First, in step 202, MPUY determines whether or not INTFY is active— that is, are there any control signals being received from any MTU. If there are not any, stat D is set in step 203; and MPUY then waits MPUX. Stat D provides communication to MPUX to ensure that it will follow the correct micro-routine. When INTFY is active, selected scratch-pad registers called "work 1" in LSR are cleared. State B is then set to the active condition indicating to MPUX that INTFY is active. Then MPUY proceeds to waiting cycle 204 until MPUX sets stat C active (MPUY may proceed).

Meanwhile, MPUX had been waiting in two-step decision cycle 205 (FIG. 13) for MPUY to set either stat B or D. If stat D is set and MPUY has been trapped for determining INTFY activity, an error may have occurred in the subsystem. Accordingly, a diagnostic routine is entered. If MPUY stat B has not been reset, MPUX waits for MPUY to set stat B in step 206 in FIG. 14. MPUX then moves to raise the select line (not shown) in INTFY and resets the tape unit address register 60 to all zeroes. This initiates a scan of MTU addresses until MPUY sets stat C on, i.e., INTFY becomes active.

This scan loop includes setting stat C in step 208 causing MPUY to execute Y-scan cycle 209. Scan cycle 209 has its corresponding MPUX scanning in Y-scan cycle 210. MPUY waits at 204 until MPUX has set stat C in step 208. Then, MPUY determines in step 211 whether or not INTFY is active. If it is active, the addressed MTU is ready to go; and stat B is set in step 212. Then, the micro-routine exits the Y-polled subroutine and enters POLLMTIX of FIG. 9. If INTFY is inactive, MPUY in step 213 adds one to the index and sets stat C. Setting stat C informs MPUX that the addressed MTU was not active. Then, MPUY waits at 204 until MPUX has again set stat C.

The corresponding Y-scan cycle 210 in MPUX (FIG. 13) includes a wait cycle having steps 214, 215, and 216. Step 214 senses whether or not stat C of MPUY is on. If MPUY stat C is on, the scan is indexed by indexing TU address register 217. This advances the MTU addressing step 208. MPUX sets stat C enabling MPUY to proceed from 204 (FIG. 14). In step 215 (FIG. 13), stat B of MPUY is sensed for determining whether or not a MTU has made INTFY active. If it has, cycle 210 is exited as will be later described. Step 216 is an error-checking step. If MPUY sets stat D, no activity is indicated. This should be erroneous because of the previous activity of INTFY. In the event that it is active, a diagnostic routine is entered. In the event it is off, step 214 is re-executed; and stat C is reset.

On detection of stat B from MPUY, MPUX informs INTFX that a requested MTU is now available. In step 218, a device-in status line in CTO is activated. This informs INTFX that the MTU is available. In the same step, the MTU address is transferred from TU address register 60 to LSR for future microprogram reference. Next, MPUX determines whether or not the I/O controller is reserved. If it has been reserved, a suppressible request in (SUPP REQ IN) on CTI of the reserving channel A or B is activated. If there has been no reservation, the SUPP REQ IN is raised on all channels in INTFX. MPUX then exits to the wait routine in FIG. 8 entitled "IDLEPEND."

MPUX SUPERVISORY MICROPROGRAMS

FIGS. 15–24 are simplified flow diagrams of the microprograms used in MPUX to effect coordination of operations with INTFX, supervision of certain aspects of data flow circuits 13, and effecting supervisory control over MPUY and MTU's. It should be understood that these microprograms may take several forms and still effect advantages of the present invention. Program segmentation techniques may be used within the microprograms. For brevity, it is assumed that program segmentation has been minimized.

The order of presentation of these programs follow generally the execution of initial selection processes as well as communication during burst and other modes of operation. The microprograms that are described in moderate detail are trap, initial selection, polled status, termination, and sense. Routines read type and test and write are utilized during burst mode. Service return is used in timing the data transfers. Error status and the sense, reset and mode are usable with other microprograms. It will become apparent that MPUX is continuously monitoring CTO for newly received instructions from INTFX. ADDRO, indicating a new selection or early termination, and CMDO, indicating a change in operation, are particularly important.

X-trap 122 is initiated by a trap signal received from INTFX over line 17 setting IC 66 (FIG. 3) to all zeroes. Irrespective of the microprogram being executed at the current time, this action requires MPUX to obtain the next instruction word from ROS address 000. Status stored in LSR, as well as in the various other registers in the I/O controller, ensure that no status data is lost.

In storing status, step 220 first transfers status information to LSR. This includes transferring information from error register 93. The signals stored in interconnection registers 14 are also transferred to LSR at a preselected byte address such that MPUX may recover that information. The interconnection registers are then cleared to all zeroes in preparation for performing functions requested by INTFX. In step 221, MPUX samples whether or not CTO is receiving an initial selection signal from INTFX. If INTFX is indicating initial selection, initial selection 125, as next explained with respect to FIG. 16, is entered. If it is not an initial selection trapping operation, in step 222 MPUX traps and holds MPUY at its ROS address 0000 as described with respect to FIG. 3. In decision step 223, MPUX determines whether or not there is a general or selective reset. Reset enables I/O controller to restart in accordance with INTFx command signals. If none of these conditions occur during a trap, an error has occurred. Diagnostic routines are then entered to determine the source of the error. For brevity, diagnostic routines are not explained in detail. An alternative action is to stop I/O controller and light a trouble indicator for manual intervention.

Initial selection 125 is explained with particular reference to FIG. 16. The routine is entered at point 226 for checking initial conditions in step 227. MPUX, before it can evaluate with the initial selection signal from INTFX means, must determine what all of the initial conditions are for setting up program branching operations to be used later. If ADDRO (Address Out) is inactive on CTO, X-polled 129 (FIG. 13) is entered. ADDRO indicates that INTFX is requesting access to the MTU indicated by signals on CBO (Channel Bus Out). If ADDRO is active, I/O controller 11 responds with either ADDRI (MTU is available) or CUB (Control Unit Busy), as will become apparent.

Further initial condition checking includes CU status pending, whether or not I/O controller 11 is stacked in this operation, whether or not there is a contingent connection, and the like. With any status pending, the pending address of the MTU is compared with the requested address on CBO. If they are the same, ADDRI on CTI is activated. Also, if there was no outstanding status pending or if the addresses are the same, OPERATION IN is raised.

When MPUX has determined all initial conditions are satisfactory (OK) for the INTFX request, the initial subroutine 228 is entered. On the other hand, if the pending MTU address does not compare with the requested MTU address, the microprogram momentarily signals the interface hardware that selection is not possible. The interface hardware returns the CUB signal and continues for the remainder of the selection attempt. If there was a contingent connection, IDLESCAN 120 is re-entered for rechecking that situation. If there was no contingent connection, MPUX places the control unit in PENDING STATUS and initiates termination 130.

Initialize 228 clears out old status, prepares I/O controller 11 for a new operation, and supplies signals to INTFX indicating that I/O controller 11 is prepared to proceed. The MTU address received from INFTX is moved to a pending address register in LSR as well as to interchange registers 14 for transfer to MPUY. It is also supplied to TU address register 60 for selecting the MTU. MPUY is then trapped to fetch MTU address from interchange register XA. MPUX then moves the MTU address to CBI for verifying with INFTX that the correct address was received. Initializing is completed by raising the ADDRI signal in CTI and then checking on whether or not diagnostics are to be performed.

If ADDRO is now active in CTO, termination 130 is entered (FIG. 19). ADDRO being active at this time indicates INTFX wants to terminate the operation. Accordingly, in termination 130, status is again cleared; and MPUY is trapped to deselect the previously addressed MTU. The I/O controller then returns to idle pending 150 to wait for selection. Normally, ADDRO is not active; and MPUX waits for CMDO. CMDO tag indicates a command signal is appearing on CBO. During this wait period, hardware errors may be monitored. For example, if a service-out is supplied, an INTFX error has occurred; then, I/O controller 11 stops all operations pending clarification of that error by either manual intervention or subsequent CPU diagnostics and resultant control signals not pertinent to the present invention.

Upon receipt of CMDO over CTO from INTFX, fetch command 229 is entered. The command is fetched from CBO, checked for parity error, and analyzed by MPUX. For example, there may be a test I/O (TIO), a no operation (NOP), or read, or write, or other form of command. During fetch command, hardware errors, pending status, stacked status, and the like are checked again. If status is pending or stacked and the command is not TIO, then MPUX supplies a CUB INTFX—that is, I/O controller is in the middle of a sequence of operations and cannot receive additional assignments.

During fetch command 229, several branch conditions are set up in LSR for later use by MPUX. For example, if status is pending or stacked and there is a TIO command, there are three possible routines used in the X-termination 130 for completing this portion of the microprogram. The routine executed is a function of various conditions in INTFX and MPUX. Also, whether or not the addressed MTU is busy is checked. If addressed MTU is busy, several branch conditions are set up; the MTU busy status is sent to INTFX by status 132. Also, if a diagnostic flag from INTFX on CTO is active, diagnostic 127 is entered. If none of the above tags occur, decode command 230 is entered. This last action is initiation of a data processing operation such as read, write, and the like.

Decode command 230 takes the CBO signals and analyzes them for determining what function is to be performed. The microprogram branches in accordance with the command code on CBO to either X-read type 137, X-write 138, error status 139 (based upon a command reject), or initiating motion control such as rewind, forward space, erase, and the like. These routine executions replace hardward sequences in earlier I/O controllers. Since the functions are well known, they are not all further described.

For initial selection, X-polled 129 is centered if ADDRO is not active. The initial selection trap with ADDRO inactive indicates that a microprogram request for service has been honored by the I/O channel. Normally requests for service are to process interrupts found during the DEPRIME POLLMTI routines. This micro-routine replaces a previous hardware sequence which examines INTFX poll request, determines which channel (A or B) is polling, and then sets up branch conditions for use later on in initial selection processing. The first step in X-polled 129 checks the status and then activates operational in tag on INTFX acknowledging receipt of the poll. If status is already pending or stacked, the corresponding MTU and CU address are already stored in LSR. If status is neither stacked nor pending, MPUX assembles the MTU and CU address information for INTFX.

In subroutine 234, MPUX determines which channel, A or B, is polling. This is determined by a hardware latch (not shown) which indicates either channel A or B. A notation as to which channel is selecting is placed in LSR, and all REQUEST IN tags are cleared. This means that I/O controller is no longer available for a new request from INTFX. The present poll must be completely processed before I/O controller 11 can communicate with INTFX about a new request.

After MPUX determines which channel is polling within INTFX, the device or MTU address is verified by subroutine 235. The address is sent back to INTFX via CBI of registers 42. At this time, ADDRI tag is raised in register 43 indicating that the information on CBI is an address. Branch conditions in LSR again are established for use later on by the microprograms during initial selection processing. Then, MPUX waits until either the ADDRO tag line or the CMDO tag line is activated. If the CMDO line is activated, MPUX returns status to INTFX via X-status 132. If ADDRO is activated, HIONOP subroutine in termination 130 is entered. This subroutine resets I/O controller 11 and deselects any selected MTU.

Status is supplied to INTFX upon its request or each time a CMDO is processed. For example, during verify device (MTU) address in X-polled 129, a CMDO tag was sensed to initiate a status return. In responding to CMDO, MPUX enters X-status 132 (FIG. 18) at STATRTN 238. First, INTFX is scanned in microprogram cycle 239. This scan consists of scanning for ADDRO, SVCO, and CMDO tags. If ADDRO tag is active, the microprogram branches to TERMSTAK in the termination 130 (FIG. 19). ADDRO active at this time indicates termination of the I/O operation, therefore, termination 130 is entered. If either SVCO and CMDO are active, scan INTFX 239 is repeated until those tags become inactive. This assurance that no outbound tags are active must be performed before any inbound tag can be activated.

INTFX is now ready to receive status information. Immediately, in subroutine 240, MPUX effects transfer of status to INTFX via CBI. Scan INTFX cycle 241, identical to cycle 239, is executed. If CMDO is received during cycle 241, MPUX determines in step 242 whether or not CUB was sent. If I/O controller 11 is in busy status, termination 130 is entered at TERMSTK1 as later explained. If it is not busy, the stack flag (not shown) is set—that is, a request has been stacked in LSR which cannot be processed until the fall of SUPPRO. Then, the microprogram branches to TERMSTAK in termination 130. If SVCO is active, then in step 243 INTFX SUPPRO is tested. If SUPPRO is active, the appropriate latches or flags are set in step 244; and status pending is reset. If SUPPRO is inactive, all the flags in LSR are reset during step 245. The two branches of the microprogram join in step 246 to check INTFX CUE latches (not shown). This checks whether or not any other initial selection attempts were received from either channel A or B while I/O controller 11 was busy. The microprogram then branches to termination 130 at TERMACC. In summary, it can be seen that in the status routine there are three possible branches—TERMSTK1, TERMSTAK, and TERMACC. The first two terminations are based on stacking status and the third on acceptance of status. Termination 130 terminates the presently executed microroutines and prepares the I/O controller for subsequent action with respect to INTFX.

A common entry to termination 130 (FIG. 19) is via TERMSTAK at 247. In subroutine 248, status with INTFX is checked. This includes status pending, status stacked, operation inactive, control unit busy (CUB), channel A or B selecting, are there any CUE's, and the like. If there is no pending status, the program branches to IDLESCAN. CUE is a latch (not shown) indicating Control Unit End. When CUB is active, CUE latch blocks any attempted selection until the controller is no longer busy.

Upon successful testing of status, a test is made for OPERATIONAL IN during step 249. If OPERATIONAL IN has been raised on CTI, an initial selection is indicated as being successfully started. Subroutine 250 sets three branch conditions for entering termination 130 via status routine 132 (FIG. 18) as previously described. If OPERATIONAL IN is not active, SUPPLEMENTAL REQUEST IN tags are established in subroutine 241. The micro-routine then returns to IDLEPEND 150 of FIG. 8.

If there is a command reject by MPUX, the termination routine is entered at 255. MPUX sets the command reject unit check tag and status pending flags and then enters the TERMSTAT at 247.

Another alternative entry into termination 130 is via a command parity error (CMDPARER and CMDPAR1). These two points of entry may be from FIG. 16, fetch command 229. In the CMDPARER entry, INTFX sense data is set up. If CMDPAR1 is the entry, status pending is checked in step 256. If there is status pending, the CUB is set in step 257. If there is no status pending, unit check status pending flag is set in step 258. Then, TERMSTAT is entered.

An independent subroutine in termination 130 is TERMACC. This subroutine is entered when the status supplied to INTFX has been accepted. This is indicated by the receipt of SVCO on CTO. A reject of status is indicated by a CMDO which causes the microprogram to branch to TERMSTAK or TERMSTK1. For TERMACC subroutine, OPERATIONAL IN on CTI is made inactive during step 260. Then, the status of the I/O controller is scanned during cycle 261. If the I/O controller is chained or subject to a conditional connection or reserved, stat D is set in step 262. This notifies MPUY that the status furnished to INTFX has been accepted. If none of the conditions are detected in scan 261, a hold latch (not shown) is reset. This is a hardware latch which informs INTFX that the controllers connection to the currently selected interface A or B is being maintained for one reason or another. After stat D is set, MPUX waits during wait cycle 264 for MPUY to set its stat D, which is an acknowledgement that it is waiting for MPUX to proceed on initial selection processing. This action is described in detail later with respect to FIG. 27.

Immediately upon sensing MPUY stat D as being active, MPUX determines in step 265 whether or not the I/O controller is still chained. If it is not chained, MPUY is trapped in step 266 to deselect or release any MTU connected to the controller. In wait cycle 267, MPUX again waits for MPUY to set stat D. MPUY stat D being set indicates that the deselection of an MTU has been completed. After this action has been completed or the I/O controller is chained, MTU device indications in LSR are cleared for INTFX; and IDLESCAN (FIG. 8) is entered for scanning for additional DEPRIMES or other requests.

In the event the status furnished to INTFX during status 132 is rejected, TERMSTAK or TERMSTK1 is entered. If TERMSTAK is entered, the hold flag on INTFX is activated, CBI is cleared, and all channel tags in (CTI's) are reset. In LSR, the I/O busy signal is reset in the pending status byte. Then, IDLESCAN is reentered as above described.

Another entry into termination 130 is HIONOP which means "halt I/O not operating" (no data processing is occurring in controller 11). Halt I/O means "do not continue any I/O operations." This entry can be from several routines, such as from initialize shown in FIG. 16. With this mode of entry, MPUX first in subroutine 269 clears the status registers shown in FIG. 3, traps MPUY to deselect the connected MTU, resets the chain flag in LSR, clears CBI in channel registers 42, and drops all CTI's. The microprogram then returns to IDLESCAN shown in FIG. 8 for checking pending status.

During a recording operation, often referred to as "write," there may be a write check condition (a write error has occurred). One write check condition is termed WC0HIO, which means "word count zero or halt I/O." Upon detection of a write check condition wherein the input/out processing through INTFX should be held, the status surrounding the write check is stored in LSR. Unit check tag is supplied to CTI. The status pending flag is then set in LSR and HIONOP is entered at subroutine 269, as previously explained.

From the above descriptions, it can be seen that termination 130 contains many entry points which are closely associated with terminating a particular microprogram routine and transferring such information to INTFX. This, of course, is in addition to transferring status information via status routine 132 and error status routine 139. Those latter two routines do not terminate a set of microprogram routines.

FIG. 20 illustrates in simplified form read-type and test 137. For each read operation, the read-type routine determines the type of read, i.e., NRZI, PE, forward, backward, and the like, and tests conditions of the system affecting a read operation. In subroutine 270, the command received from INTFX via CBO 43 is interpreted. If a sense operation is initiated, sense 140 is entered. The purpose of a sense routine is to fetch sense data, i.e., status information and the like, for INTFX. If the command received by the I/O controller is illegal, the command is rejected with the termination 130 being entered at COMREJCT which then supplies a unit check condition to INTFX. If the command is TIO (test I/O), the link 1 register in LSR is set to TERMSTAT for use later on in the termination procedures. If the command concerns a read operation, MPUX in subroutine 271 presets the controller for read in either the forward or backward direction. Then, MPUX sets the link 1 register in LSR to subroutine "CLEANIT."

Upon acceptance of any command in the just-described processing, the TU test routines are entered. These test routines may also be entered from initial selection 125. If the command is TIO, step 272 tests whether or not MPUY stat C is active. If it is active, the status of the MTU is such that unit check must be returned to INTFX. This is accomplished by causing the micro-routine to branch to termination 130 at CMDPAR1—that is, if MPUY stat C is active, MTU status is improper for a test I/O operation. If the stat C of MPUY is off, the microprogram branches through link 1 register LSR to TERMSTAT at 247 of FIG. 19.

Upon initiation of a read command via subroutine 271, all of the sense data in controller is cleared during step 273. Test step 272 is performed as previously described. Another entry into the test routine is PROTEST. In this entry, two decision steps 274 and 275 check for stat C of MPUY and file protect. If MPUY stat C is on, MPUX resets sense and executes step 272. If MPUY stat C is off and the file protect is off, MPUX goes through reset sense step 273 to branch link 1. If the file protect is on, i.e., a write is illegal, it will go to command reject entry of termination 130.

From the above description, it can be seen that the MPUX read routine is merely a supervisory operation. The detailed read operation control is handled by MPUY with the data processing circuits 13 performing the actual data processing functions.

A similar situation occurs in the write 138 (FIG. 21). Initial selection 125 initiates the write operation at 276. In subroutine 277, MPUX sets up three branch conditions which will be used later on in the write operation. The first one is WRTFST, which means write first byte of data. The second link is WC0STP, which is word count zero stop. This subroutine is entered during an operation when a CMDO, i.e., stop, is received from INTFX in response to the first SVCIN tag. The first SVCIN tag indicates that the I/O controller is ready to receive the first byte of data for recording. The third possible branch is WC0HIO, which means word count zero halt I/O, as previously explained. After setting the branch conditions, the word count registers (tally of number of bytes recorded) are cleared to zero, CBI is cleared, and selected scratch-pad registers within LSR are cleared. Then, the microprogram branches to service-return routine of FIG. 22. That routine informs the INTFX that the I/O controller is ready to proceed with writing. After the first byte of data has been processed, SVCIN and SVCO tags are handled by circuits in signal processing circuits 13 and as described in Moyer et al., supra.

The WRTFST condition is entered at 280 to initiate set-up subroutine 281. In this set up, proper parity on CBO is checked. A word count in the sense registers of LSR is cleared to zero. If a set track in error (TIE) mode set has preceded the write command, mode routine 136 is entered to perform the transfer of the mode set data to the data flow section. This is termed DOTIEMS1 which means "do track in error mode set routine 1." The scratch pad is incremented by one with numbers being sent to CBI. In subroutine 282, MPUY is trapped to perform a write command as described with respect to write routine 145. Next, scan cycle 283 is entered. If ADDRO is up, error status routine 139 is entered. If ADDRO is up at this time, it means that the INTFX wishes to terminate the operation. If TAPE OP is up, i.e., MPUY has set its stat indicating MTU is operable, then normal write initiation routines are followed. The third point of the scan is MPUY stat D. If stat D is off, the scan is repeated. If stat D is on, it means that MPUY has terminated its operation and the write operation cannot be performed. MPUX then traps MPUY to abort the write and sends in unit check to INTFX. It then enters diagnostic routine 127 to check on the erroneous condition.

If the TAPE OP condition is satisfied, MPUX enters wait cycle 285. If SVCO is still active, the byte of data to be recorded has not yet been transferred to the I/O controller. As soon as SVCO becomes inactive, scan cycle 286 is entered. If ADDRO is active, HIOPERG (hald I/O controller operating—data processing being performed) is entered in the error status 139. If SVCO becomes active again, a diagnostic routine is performed. In step 287, the above-referred-to work register is incremented and returned to CBI. This action concerns a diagnostic routine which is beyond the scope of the present specification. If CMDO becomes active, the operation is to be terminated. In this situation, the stop flag in LSR is set to the active condition; and the burst wait (BSTWAIT) entry to error status 139 is followed. This action sets the I/O system for terminating write. Next and last, MPUY stat D is sensed. If stat D is on, it means that no MTU is connected to the I/O controller; and the write is stopped. If stat D is off, the scan is repeated until one of the flags becomes active.

An important function within the I/O controller which is previously completely hardware sequenced is the service routine (SERVRTN) 135. This routine transfers the first byte of data; thereafter data flow circuits 13 sequence the data signals as shown in Moyer et al patent, supra. First, scan cycle 287A is entered. ADDRO, SVCO, and CMDO tags are sensed. If ADDRO is active, a halt I/O is in process. Branch according to link 3 as set up in the write initialize is entered—that is, WC0HIO. If either SVCO or CMDO are active, the scan cycle is repeated. If all of the outbound tags are inactive, MPUX sets SVCIN tag in step 288. This indicates to INTFX that the I/O controller is prepared to receive the first byte of data for recording, or transfer the first byte of data to INTFX. Immediately after setting SVCIN tag in CTI, scan cycle 289 is entered. The three outbound tags—ADDRO, CMDO, and SVCO—are again scanned. If ADDRO becomes active, the link 3 entry to the termination routine is entered. If CMDO is sensed, i.e., the I/O operation is to be terminated, the stop flag (LSR) is set in step 290; and link 2 subroutine is entered (FIG. 23). This is the normal way of terminating a data processing operation. Next, SVCO is sensed; and if it has not been activated, the I/O controller is not to proceed. Receipt of a SVCO indicates that the I/O controller may proceed to the next step. In a write operation, it indicates a byte of data has been supplied to CBO; while in a sense, it means that the data has been received by INTFX. Upon receipt of a SVCO, branch link 1 is used to return to the desired routine. Use of tags in a read operation is explained in more detail with respect to FIG. 23.

Referring next to FIG. 23, error status 139 is explained. The burst wait entry (BSTWAIT) is used during the burst mode of operation. Burst mode means that channel A or B of INTFX is dedicated to the transfer of data signals from an addressed MTU and a given CPU. Scan cycle 292 is first performed. First, ADDRO is checked. If ADDRO is received, HIOPERG 293 is entered. Again, ADDRO indicates that an INTFX is attempting to terminate the connection.

The second point in scan cycle 292 is CMDO. If it is active, the burst operation is to be terminated. A stop flag in LSR is set, and branch link 2 is entered for stopping either the write or read operation. Next, the MPUY stat D is sensed. If stat D is off, the cycle is reinitiated at that point. If stat D is on, the scan is continued (MPUY has finished its operation and is at wait MPUX). An error condition must exist if this latter program sequence was followed. MPUY ALU errors are checked as well as other exceptions from MPUY. If either of these are active, set sense status 294 is entered; various LSR flags are set in subroutine 295; and TERMSTAT entry of termination 130 is entered. This means the burst mode is being terminated, and MPUY is informing INTFX of what happened.

Scan 292 is exited in a normal fashion at 296. If MPUY has set a unit check (cannot perform a function), then set flag subroutine 295 is also entered. These flags indicate a unit check status, i.e., the I/O controller cannot perform the desired function. Normally, MPUY did not supply a unit check and MPUX determines whether or not a sense command is being executed. If so, sense 140 (FIG. 24) is entered. If not, i.e., normal data processing operations are being performed, a data error is sensed for in step 297. If there are no data errors, other error checking is performed in subroutine 298. If errors are detected, data check or other forms of error indications are provided through CTI to INTFX. If there are no errors, TERMSTAT entry of termination 130 is used. If there is a data error, sense bits are set in subroutine 299; and the appropriate flags are set in subroutine 295 and TERMSTAT termination routine is entered.

Returning now to HIOPERG 293, a routine is executed in response to an ADDRO command from INTFX received during other operations. First, MPUX sets the stop flag in LSR, resets other flags such as all CTI's, chain flag, and sets busy condition (CUB) and holds for further operations. It then goes to wait cycle 300 waiting for ADDRO to become inactive. Upon ADDRO becoming inactive (INTFX ready to proceed), MPUX returns to scan cycle 292 for scanning INTFX status and subsequent branching to the appropriate routine in termination 130.

CLEANGO routine indicates the status is "clean," i.e., the I/O controller is free to proceed with the operations. Preset subroutine 301 is first performed. This includes dropping all status-in tags at CTI and transferring the data flow mask to data flow circuits 13. The latter function is described later. Then, in decision step 302, it is determined whether or not a write command is active. If it is a write command, a write initiate within write 138 is entered as previously explained. If the command relates to track in error (TIE), the write initiate command is entered as it is time shared with the TIE function. TIE functions have been used in hardware sequences before and are not further described. If both decision steps result in negative answers, the operation is determined to be a read operation. MPUY is then trapped during step 303 to perform Y-read 144. BSTWAIT routine is then entered for preparing MPUX for further action.

Additionally, an error status 139 is used in connection with stopping a write in WT0STP. It is entered through set sense subroutine 299. Also, if there is a data check, set sense subroutine 299 is executed in preparation for entering termination 130.

In response to a sense command, MPUX enters the FIG. 4 illustrated sense routine. MPUX in step 305 determines that there is satisfactory status (clean status) for forwarding the status to INTFX. At 306, MPUX traps MPUY to its sense routine, described later with respect to FIG. 36. MPUX stores branch link numbers in LSR for use later on. MPUY in its sense routine fetches two bytes of data for each cycle of operation. The even-numbered bytes are placed in YA, and the odd-numbered bytes are placed in YB. When the two bytes have been supplied to exchange registers 15, MPUY sets stat C; and upon completion of furnishing all the sense bytes, it sets its stat D. Accordingly, MPUX at 307 senses for MPUY stat C. As soon as stat C is sensed, MPUX fetches the even-numbered sense byte in YA. It then performs a routine at 308 for determining whether or not MPUX should add bits to the sense byte from its own status registers. If yes, additional bits are supplied at 309. Then, at 310, MPUX supplies the sense byte to CBI. At 311, sense routine branches to service routine for sensing SVCO as was previously described.

After sending the even-numbered byte to CBO, MPUX fetches the odd-numbered byte from YB and then sets its stat C informing MPUY to fetch the next two bytes of sense data. MPUX then determines with respect to the odd-numbered bytes whether or not additional bits should be added; then proceeds to SVCRTN at 312. Upon receipt of SVCO, MPUX transfers odd-numbered byte to CBI at 313. MPUX then again senses for MPUY stat D, i.e., whether or not the sense operation is complete. While waiting for MPUY to set stat C at 314 (indicating that the next two sense bytes are available in YA and YB), MPUX senses for ADDRO from INTFX for determining whether or not the sense operation should be aborted. Before determining whether or not all sense bytes have been transferred, MPUX resets its stat C at 315 and provides a suitable delay. If all sense bytes have been transferred, it returns to TERMSTAT. If more bytes are to be transferred, MPUX re-enters step 307.

While MPUX waits for MPUY to fetch sense bytes (MPUY stats C and D are off), ADDRO is sensed at 316. If ADDRO is active (the I/O connection is being terminated), then the link registers in LSR are cleared at 317. The stop flags are set in LSR and IDLEPEND is entered awaiting further INTFX instructions. ADDRO being active at 318 also causes exit of sense to IDLEPEND.

In addition to the above-described microprograms, MPUX also performs other functions. This includes a mode of operation which determines PE, NRZI, etc., modes of operation. Such functions being substantial duplicates of prior hardware sequences, are not described. The reset operations and the special control operations reside in a similar category. The control operations are associated with the later-described motion control routine of MPUY—that is, space, record, rewind, and other medium motion controls. The initiation of such motion controls are well understood, and the microprogram version thereof used in MPUX to initiate such actions are one of design choice.

MPUY MICROPROGRAMS

Selected MPUY microprograms are described in some detail for illustrating the transfer of signals from INTFY to MPUX via the interchange registers. For brevity, not all of the MPUY microprograms are described.

As previously explained with respect to FIG. 3, MPUY while waiting for MPUX may be forced to a static condition, i.e., the MPUY clock is turned off. This is the preferred mode of holding MPUY. An alternative approach is shown in FIG. 25 wherein at ROS address 999 unconditional branch instruction (06) is set to return the microprogram to address 999. This enables MPUY to perform an endless loop until trapped by MPUX to ROS 000. At address 000, whether it be held as explained with respect to FIG. 3 or FIG. 25, MPUY fetches signals from register XB. These signals are a ROS address for MPUY to enter one of the microprograms now to be described.

One of the first routines to be performed by MPUY concerns initial selection. Initial selection (FIG. 26) is entered at EXECSTS. The first step 321 fetches the MTU address from register XA. In step 322, MPUY determines whether multitagged interrupt (MTI) is pending in the addressed MTU connected to INTFY. If no interrupt (MTI) is pending, MPUY in step 323 fetches the MTU sense bytes and transfers same to registers YA and YB. It then sets stat C informing MPUX that information is available in registers YA and YB. The sense bytes inform INTFX as to the status of the MTU. If an interrupt (MTI) is pending, MPUY then proceeds to check the MTU in INTFY polling as described later with respect to FIG. 28.

Continuing now with respect to MTI being inactive, MPUY checks the condition of the switch (not shown) in INTFY—that is, the MTU may be switched between one or more I/O controllers. If, in step 324, the MTU is not connected to another controller, MPUY determines at 325 whether or not the MTU is physically present. If it is not, a unit check status is generated at 331. If it is present, MPUY at step 326 determines whether or not it is busy. If it is busy, it determines whether or not the MTU is executing a motion command. If MTU is executing a motion command, MPUY at 327 determines whether or not a SUPPRO is active (command chaining in process). If so, step 321 is reentered. If it has been completed, MPUY then primes for DEVICE END at 328. This consists of setting a DEPRIME bit in the registers described with respect to interrupt scan. This is a mechanism used by MPUY for recording a request from INTFX and for getting back to INTFX as soon as the addressed MTU is made available, i.e., has supplied a DEVICE END (DE). DE indicates the operation a device is performing has been completed. MPUY then clears MTU select line and sets both stats B and D, and awaits further action by MPUX. If there is no motion command sensed at 329, the end-up routine (FIG. 27) is entered. The end-up routine merely provides a short set of operations to enable MPUY to wait MPUX (FIG. 25).

Returning now to step 326, if the addressed MTU was not busy, then MPUY determines at 330 whether or not the MTU is ready. If MTU is not ready, it means power may be turned off, a tape reel may not be installed and the like. If power is turned off, unit check signal is generated at 331. When the addressed MTU is ready, MPUX in step 332 sets up to the MTU model (velocity) code in register YA for data flow control. Next, in step 333, MPUY checks whether or not there is still a DEPRIME in LSR. If not, stat D is set and MPUY waits MPUX. If there is a DEPRIME, MPUY sets both stats B and C and enters POLLMTIX of FIG. 9.

The Y-termination 147 is explained with respect to FIG. 27. The code name "ENDUP" is used to indicate MPUY is entering this routine. The purpose of this routine is to make all data available to MPUX and prepare MPUY for waiting for the instructions. First off, MPUY resets TAPE OP status. This means that MPUY is in effect closing down data flow operation. TAPE OP status active indicates that an MTU is connected to MPUY and is in an operational state, i.e., transferring data signals. Next, MPUY fetches the MTU sense bytes and stores them in its own LSR. MPUY then checks and logs any error conditions that it may have. Stat D is finally set, and MPUY waits MPUX.

Part of the initial selection process requires MPUY to poll or search INTFY. Microprograms effecting this search are shown in FIG. 28. The longer program is entered at MTISEARCH, while the shorter program is entered at CHECKDEV. CHECKDEV is a portion of the MTISEARCH. The first step in MTISEARCH determines whether the MTI (multi-tagged interrupt line) is active or inactive for any MTU. MPUX has a control line (not shown) to INTFY that gates the logical "OR" of all MTU interrupts to MPUY. If it is inactive, stat D is set of 340 and MPUY waits MPUX. On the other hand, if MTI is active, MPUY sets stat B at 341. MPUX now activates INTFY to supply only the MTI indication of the addressed MTU to MPUY and scans all MTU addresses in sequence until the MTU having MTI is located. During this scan, MPUX and MPUY stat registers are used to synchronize the two programs. It then waits for MPUX stat C at 342. Remember that MPUX stat C indicates that MPUY may proceed. MPUY then resets its own stats B and C and again senses whether MTI is active. If it is inactive, MPUY sets stat C at 343 and again waits for MPUX stat C. This latter situation indicates that MTI went from active to inactive status. On the other hand, when MTI remains active, stat B is set at 344; and MPUY awaits MPUX stat C to be reset at 345. As soon as MPUX stat C is turned off, (it having been turned on during wait cycle 342), MPUY enters polling cycle 346. As soon as MPUX sets its stat C active again, MPUY enters the CHECKDEV subroutine. On the other hand, as long as MPUX stat C remains off, it will sense whether or not MTI is active. If it is active, MPUY then remains in the polling cycle. If it becomes inactive, it enters termination step 340 as will be described with respect to CHECKDEV.

CHECKDEV is entered either from initial selection 148 of FIG. 26 or when MPUX stat C is turned on during MTISEARCH. In the first activity, MPUY fetches sense from the addressed MTU. Then, in step 348,

MPUY determines whether or not the MTU is assigned to I/O controller 11. Remember that various MTU's may be connected through various switching devices (not shown) to several I/O controllers. If the MTU is not assigned to I/O controller 11, termination step 340 is entered. This involves clearing the MTU tags from LSR, resetting the connection, and setting stat D. Normally, the MTU being polled is assigned to I/O controller 11. In that instance, MPUY sets stat C at 349 and waits at 350 for MPUX stat D to be turned on. MPUX setting its stat D on indicates to MPUX that all activity required for MTISEARCH has been completed. All the activity having been completed, MPUY resets MTU at 351 and enters termination step 340 as previously described.

An important microprogram used in practically every MTU operation except for sense and polling is the motion control program shown in abbreviated form in FIG. 29. The entry point is coded as TURNARND. This program effects all tape motion of the addressed MTU. Commands are exchanged between MPUY and the addressed MTU during the motion control program for carrying out motions required for read, write, diagnostics, and for positioning tape in preparation for any of the latter operations. This program is usually not entered by a trap operation from MPUX, rather, it is entered from other programs yet to be described. MPUX, however, does have the capability of trapping MPUY to this program.

The first step 355 sets TAPE OP condition, i.e., the addressed MTU, is going to perform a function for MPUY. This condition is set in LSR of MPUY. The PE bit is also set. The MTU is reset such that new commands from MPUY may be received. All error conditions are cleared from LSR. Then, MPUY executes a series of decision steps at 356 with regard to the instructions received from MPUX in REG XB as well as sensing conditions in MTU. The first decision step determines whether or not MTU is at beginning of tape (BOT). When it is not BOT, MPUY executes step 357 to determine whether or not the addressed MTU is set in NRZI mode. The MTU's of this disclosure can be only set in either NRZI or PE modes.

Returning now to decision step 356, if it is BOT, MPUY determines whether or not a write operation is to be performed. If yes, then MPUY fetches a data mask (a control word for data flow circuits 13) from register XA in step 358 and proceeds as will be later described. On the other hand, if the instruction from MPUX is not write, MPUY determines whether or not the command is rewind unload (run). If not, it proceeds further in decision step 356 to determine the direction of motion whether it should be a read forward or a read backward. If it is a read backward, an error condition occurs and unit check is set at step 359; and MPUY enters ENDUP as previously described. On the other hand, if it is a forward read, the illustrated preparatory steps are followed.

Returning now to the sequence followed when initial condition is not BOT. Assume there is NRZI capability in the addressed MTU (step 357). In step 360, MPUY sets NRZI mode indicators in LSR and in data flow control register XA. Then, at 361, MPUY determines whether the commanded motion is in the forward or backward direction. If it is in the backward direction, MPUY at 362 sets the addressed MTU in the backward mode, i.e., sets the command MOVE BACKWARD. Upon a MOVE BACKWARD, a forward hitch is performed at 363. A forward hitch is described in detail in the commonly assigned F. R. Hertrich patent Ser. No. 814,689, filed Apr. 9, 1969, now U. S. Pat. No. 3,561,656. Then, MPUY enters time delay 364 permitting the addressed MTU to stabilize tape in columns. After this delay, MPUY sets the addressed MTU in the drive status at 365. Another delay is introduced for permitting the addressed MTU to effect the command.

Next, MPUY performs a series of checks and sends a final move command to the addressed MTU. First, it detects whether or not the command is read forward. If it is read forward, MPUY activates the read forward command line. It then checks command status in MTU. If the command status is not all right, a flag in LSR 75 is set rejecting the command based upon MTU error. This information is also forwarded to exchange registers 15. MPUY then sets stat D and waits MPUX. Normally, the command status is OK. Then, at 366, MPUY does final checking associated with the MTU move-tape operation as is well known and has been performed in hardware-sequenced controllers. The move command is then set to the addressed MTU. Following this, MPUY performs velocity check 367. This consists of counting timing pulses between successive tachometer pulses supplied to MPUY over line 36 from the addressed MTU. The counted timing pulses are compared with a predetermined number for indicating whether or not velocity is within predetermined limits. If it is proper, MPUY waits MPUX. If there is bad velocity, i.e., the tape is moving too slow, tachometer error is set at 368. The error information is supplied to registers 15, and stat D is set during error return 369. MPUY then waits MPUX.

Returning now to decision step 356, when the read backward decision indicated a forward direction of motion, the forward/backward status of MTU was sensed at 370. If it already was in the forward direction, step 365 is entered. On the other hand, if the command is a forward move and the addressed MTU is in backward mode, the MTU is set to the forward condition and time delay 364 is entered.

If the operation is to be a write operation, i.e., TURNARND is entered from Y-write routine shown in FIG. 30, a data mask (a control word) for use by data flow circuits 13 is fetched by MPUY in step 358. In step 371, MPUY senses whether or not the write operation is PE or NRZI. If NRZI, step 360 is performed, and the sequence described above is followed. If the write is PE and PE was previously set in step 355, the program branches directly to step 361.

The Y-write program 145 is described with respect to FIGS. 30, 31, and 32. After MPUX traps MPUY to WRTOP, MPUY first sets the write flag at 375 in LSR 75. Then, TURNARND motion control program of FIG. 29 is entered. Upon the completion of TURNARND, the branch setup (not shown) in step 375, which set up the write condition, branches back to step 376 of Y-write 145. In this step, MPUY counts tachometer pulses for metering a given amount of tape to form an IBG. After a predetermined amount of tape has been transported, decision step 377 is entered. If it is a NRZI write, NRZI write routine 378 is performed as shown in FIG. 31. If PE is to be written, the write PE routine shown in FIG. 32 is performed. Upon completion of either write routine, ENDUP in Y-termination 147 (FIG. 27) is entered.

NRZI write 378 (FIG. 31) supervises operation of data flow circuits 13 during the write mode of operation for recording data received from INTFX in NRZI recording scheme. All of the discussion with respect to NRZI is directed toward recording in the present known NRZ recording formats. MPUY determines whether or not the operation commenced at load point in step 380. If so, it then sets up a special erase gap operation. NRZI mode is set in the selected MTU, and data flow operations are set in data flow circuits 13. Next, if an erase gap is to be performed, an erase subroutine (not shown) is entered. This subroutine merely requires the addressed MTU to supply an erase current to its transducer for a predetermined length of tape. Upon completion of that operation, ENDUP routine of FIG. 25 is entered. If it is not an erase operation, MPUY determines whether or not a tape mark is needed. If a tape mark is needed in NRZI format, write tape mark 381 is performed. Again, the subroutine is relatively simple and merely uses data patterns placed in TUBO to record the standard NRZI tape mark. After the tape mark operation, the read-after-write portion of the write data subroutine 382 is entered for checking the tape mark.

Generally speaking, data flow circuits 13 perform all of the write signal generation and coordination with the addressed MTU. The addressed MTU must accept data over INTFY as the data flow circuits 13 supply it. During this period of time, coordination with INTFX is performed by MPUX by hardware sequences, as described in Moyer et al, supra.

Many digital magnetic tape subsystems have two gaps for each track on the tape. The upstream gap in a write operation is called the write gap, which records data signals on the tape. The downstream gap is the read gap. As data is recorded on the tape, the recorded data signals eventually pass the read gap. Many I/O controllers verify recording operations by what is termed "read-after-write" operations. It is intended that the presently described I/O controller be used in this mode, no limitation thereto intended. Data flow circuits 13 may include hardware sequences for performing this read-after-write function as is well known in the industry. Alternatively, microprograms in MPUY can perform supervisory functions—that is, when data flow circuits 13 detect a lack of readback envelope when a readback envelope should have appeared in the read gap, then a BOC can be performed by MPUY. Such BOC will indicate to MPUX that there is a write error, MPUX then branches to error logging operations and informs INTFX of the write error. Normally, there is no write error; the MPUY microprogram proceeds to subroutine 383 which continues the reading operation even after signals are no longer being recorded. The signal delay between the write and read gaps requires a supplementary read operation. Upon completion of the read and detection of the end of record, the ENDUP routine in FIG. 25 is entered.

The philosophy of control for recording in the PE mode follows generally that of the NRZI mode. However, because of many additional format requirements known of PE recording, the write PE program shown in FIG. 32 is necessarily more complex than the NRZI write program. Entry into the program is at BOT decision step 385. If it is BOT, a PE format mark is recorded. After BOT operations, the PE preamble is written in step 386. The program loop in dash box 387 is performed during the burst mode of recording data in the PE mode. A write data command at 388 makes the data flow circuits supply write data. In decision step 389, MPUY checks whether or not preamble recorded in step 386 should be arriving at the downstream read gap as mentioned in the NRZI mode. If the preamble has not yet reached the read gap, beginning of record decision step 390 is performed.

BOR flag in LSR 75 of MPUY is set upon the detection of data during the read-after-write operation. This should occur within a predetermined time after the preamble starts to write. If BOR is not detected by the read gap, which occurs at the beginning of the write operation, velocity check 391 is performed. This is performed in the same manner as described for NRZI. Generally, the velocity check will be OK and loop 387 is re-entered. However, if the velocity check is bad, the write condition is reset and end of data is set requiring data flow circuits 13 to stop recording. Loop 387 is then entered for reaching write reset decision step 392 as will be later described.

If, in step 389, the preamble should have reached or has reached the read gap in the read-after-write operation, the preamble is checked in step 393. This consists of counting the number of signals recorded therein. Generally, the PE preamble contains 40 zeroes. The preamble may be acceptable if 35 zeroes are detected. It may be assumed that during the initial resynchronization portion of the preamble the recorded signals may not be successfully recovered. Upon completion of the checking of the preamble, the record must be continuous since writing is still in process; therefore, the program goes directly to check BOR routine 394. This subroutine checks to see that the data signals from the addressed MTU over INTFY are still active. This branch condition remains active as long as signals are being detected by the read gaps. In step 392, MPUY determines whether or not the write condition is reset. During normal operations, the write condition will be reset at the end of the record as determined by INTFX or in the alternative of a detection of a velocity error. When write is reset, loop 387 is exited for terminating the write PE program. Initially, there is a delay provided at 395 to allow some of the tape to pass by the read head. In step 396, MPUY senses whether or not the read gap is still sensing the record. If not, there is a write error; and the status of the write error is set in step 397. Following this, ENDUP routine is entered. Normally, the read gap would still be sensing the record. The program then senses for end of data (signal generated by data flow circuits 13) in step 398. If it is end of data, the data flow circuits 13 are reset at 400; and the postamble is checked for proper length of recording. Then a series of decision steps at 401 are performed. These check MTU read, write time, IBG, write tape mark op (WTM OP), and the like. From these decision steps, readback checks 402 are performed. Based upon the analysis of the decision steps 401 and readback checks 402, either the write error 397 step is entered or ENDUP routine of FIG. 27. Normally, ENDUP routine of FIG. 27 is directly entered. If the BOR is off but was on previously as detected in step 403, series of decision steps 404 are performed. These determine whether or not too many write times have occurred, IBG was being written, or a tape mark was being written (write times are used as a time/distance measurement). As shown in FIG. 32, the program moves to either an error condition or back to decision steps 401 in accordance with the various operating statuses.

The Y-read program is shown in FIG. 33. This is entered on a read operation, space, or space-file command operation. In the latter two, the read circuits are operated with a threshold of 10 percent maximum. The threshold is forced on the data flow by MPUY as explained with respect to FIG. 2. In the read program, MPUY first checks the direction of motion in step 410. Depending on the direction desired, the addressed MTU is set in either the forward or backward mode. Then, the motion control program at TURNARND is entered at 411. The branch condition set up in step 410 causes the TURNARND program to branch back to the Y-read program of FIG. 33. Then, MPUY in step 412 determines whether or not BOT is encountered. If it is, MPUY checks the tachometer velocity and meters tape in step 413. It then proceeds to decision step 414 for determining whether NRZI or PE recording scheme was used on the tape being read. If it is NRZI, MPUY determines whether or not the NRZI feature was included in the addressed MTU. If the NRZI tape is loaded on a MTU not having the NRZI feature, it is not capable; and an error condition exists. This is logged in step 415 and ENDUP routine of FIG. 27 is entered. If it is NRZI and capable of being performed, TURNARND 411 is again entered for moving the tape to the first record block. If PE was recorded on the tape, the PE read routine 416 is directly entered.

On the other hand, if the read operation is in the middle of the tape, BOT is "no" with decision step 417 being entered. If it is a NRZI tape, NRZI read routine shown in FIG. 34 is entered. If it is PE, PE read routine 416 is entered. Upon completion of either of the read routines, terminate read routine 419 is performed. This includes error checking which may cause entry of a diagnostic routine (not described in detail). Normal exiting of terminate read routine 419 is to ENDUP routine of FIG. 27. Also, during terminate read 419, a creased tape may be detected—that is, a tape being read may have a crease in it causing no readback signals for a short period of time. This period of time is normally much less than an IBG. Known detection schemes for detecting creased tape are used. A creased tape routine 418 is entered if the tape is stopped because of the crease, and ENDUP routine of FIG. 27 is entered. Otherwise, PE read routine 416 is entered as will become apparent.

The NRZI read routine of FIG. 34 is entered from decision block 417 of FIG. 33. The first step in the routine is 420 in which MPUY sets the read mode in MPUY and data flow circuits 13. It also sets decision thresholds. Initially, before the record is encountered, the threshold is set high, and after the record is encountered, it is lowered. This function can be performed by hardware sequences in data flow circuits 13, as was performed in previous controllers. NRZI data transfer loop 421 permits MPUY to idle through a pair of decision steps, while data flow circuits 13 process data from the addressed MTU directly to INTFX. SRVRTN routine of MPUX again provides coordination between INTFX and the I/O controller. Within NRZI data transfer loop 421, end of data is continually sensed. If there is end of data, MPUY then determines whether or not a tape mark is being read. If a tape mark is being read, the read routine is terminated. If a tape mark is not being read, MPUY determines whether or not a file operation is being performed. If not, terminate read subroutine 419 is entered. If the file operation is being performed, tape operation condition is reset momentarily; and NRZI data transfer 421 is re-entered. This permits resetting the end data flag to allow the next data block to be scanned for the presence of a tape mark.

During the data tansfer, the addressed MTU may become incapable of performing the read operation. In such a situation, it provides an interrupt through INTFY to MPUY. An interrupt from the addressed MTU is a BOC for MPUY. If there is no interrupt, MPUY idles through the two decision steps until end of data occurs. Upon detection of an interrupt indicating that the MTU cannot continue the read operation, unit check is set at 422; and terminate read operation 419 is entered. This will be explained in some detail with respect to read PE set forth in FIG. 35.

The read PE routine starts with setup PE read in the MTU at 425. The preamble of the PE record mentioned above with respect to write PE is read by the read preamble sequence of steps in dash box 426. This includes detection of beginning of record, tracing the BOR, detecting whether or not read operation has been set up, and doing a tape velocity check may be performed using tachometer pulses. Finally, data ready is detected in step 427. This corresponds to detection of the mark or signal marking the boundary between the preamble and the record. If the beginning of record or read op are turned off, special conditions are checked in step 428. These include detection of an MTU interrupt, detection of a tape mark, IBG, unit exceptions, and the like. Such operations have been performed in previous I/O controllers and are not discussed further for this reason. If none of the special conditions are detected, read preamble 426 is re-entered. If a special condition is detected, terminate read 419 is entered on FIG. 33.

Transfer of actual data signals from the addressed MTU to INTFX occurs during PE data transfer 430. This includes monitoring for IBG and MTU interrupt. If an IBG or MTU interrupt occurs during transfer of data, errors are set at 431 and terminate read is entered. Upon detection of end of data, the PE data transfer routine is terminated; and postamble checking is performed. The end-of-data signal is supplied from data flow circuits 13 to MPUY as a BOC. This is one of the status lines shown in FIG. 2.

In postamble checking, MPUY checks whether or not the postamble is too long, too short, or appears as an IBG. As long as data ready is sensed at 431, the postamble checking continues. As soon as an IGB or MTU interrupt is sensed, terminate read is entered. If the postamble is too long or too short, an end data check is flagged and forwarded to MPUX at 432.

Terminate read routine is a microprogram version of a previously used hardware sequence. It is not shown in the drawing in detail for that reason. The functions performed include drop the move signal to the addressed MTU and continue to monitor the read bus until MTU is stopped. This is a velocity check performed by counting tachometer pulses. If a read data signal is received from INTFX via MPUX, the move tag to the addressed MTU is again raised; and the read operation is re-entered as shown by line 433 of FIG. 33. In the latter situation there is a possibility of a creased tape. Raising or activating the move tag enables the system tag to read data signals after traversing a tape crease.

Response of I/O controller 11 to a sense command by MPUX was described in detail with respect to FIG. 24. In that routine, MPUX trapped MPUY to the MPUY's sense program shown in FIG. 36. Upon being trapped, MPUY fetches two sense bytes from the MTU. Then, at 435, MPUY indexes to the next two MTU sense bytes by changing the contents of the TUBO. MPUY then transfers both bytes of data to YA and YB respectively and sets stat C as set forth in 436. A decision cycle is then entered at 437. First, MPUY senses whether or not the stop flag from MPUX is on. This is one of the stat bits in register 89 of FIG. 3. If the stop flag is on, MPUY merely waits MPUX. If it is not on, it senses for MPUX stat C. It may be recalled from the description of FIG. 24 that when MPUX has transferred both sense bytes from registers YA and YB to INTFX, it sets stat C. MPUY must wait until MPUX has stat C. Then it goes to a set of decision steps 438. Again, the stop flag is sensed and MPUY waits for MPUX stat C. It should be on, and then proceeds to clear the LSR sense byte memory locations at 439. Finally, in decision step 440, MPUY checks whether or not all the sense bytes have been forwarded to MPUX. If not, the sense routine is re-entered for fetching two additional sense bytes. If the sense operation is completed, it goes to wait MPUX.

MICROPROGRAM SEQUENCE FOR MPUX ENABLING

Concurrent Diagnostics

A simplified flowchart later shows microprogram flow for setting and sensing chained and diagnostic flags effecting concurrent diagnostics. MPUY microprograms are subservient to the described microprogram for effecting certain diagnostic functions not necessarily associated with enabling concurrency and, therefore, are not described. The references to steps in the following flowcharts are only to those steps listed herein and do not refer to steps M1–M36 in the flowchart for controller 11 responses and other flowcharts in this description. All flowcharts are mutually exclusive descriptions. LSR 75 in MPUX retains diagnostic and operating flags upon which the microprograms branch to various sequences for effecting the designated concurrent operations. For ease of reference, a partial LSR map for control flags in MPUX LSR 75 is set forth below:

TABLE II

| Register and Bit | Flag |
|---|---|
| **Selected Diagnostic Flags** | |
| 4-0 | DIAG MODE |
| 4-1 | BLK INT |
| 4-2 | FORCE DVE BSY |
| 4-3 | ARM CUB |
| 4-4 | BLK UC |
| 4-5 | |
| 4-6 | |
| 4-7 | |
| **Selected Operation Flags** | |
| 5-0 | CHAIN A |
| 5-1 | CHAIN B |
| 5-2 | REW/DSE |
| 5-3 | OP COMPLETE |
| 5-4 | UNIT CHECK |
| 5-5 | ENABLE |
| 5-6 | |
| 5-7 | |
| 6-0 | OPIN |
| 6-1 | STATIN |
| 6-2 | CUB-A |
| 6-3 | CUB-B |
| 6-4 | ADDRI |
| 6-5 | SVCI |
| 6-6 | CUR |
| 6-7 | DE |
| 7-0 | DEPRIME |
| 8-0 | DEPRIME |

In the flowchart below, each major sequence step is listed, followed by the description. Entry to the various sequence steps is from the immediately preceding step unless otherwise indicated after the word "Enter." Exit from the sequence step is to the immediately following listed sequence step unless otherwise indicated. The function is described in abbreviated form indicating the function performed during the particular step. That is, each step represents several microinstructions in MPUX, the exact code listing being one of programming design not necessary to practicing the present invention. Following the flowchart, a brief description ties selected steps of the microprogram flowchart into the functions performed for concurrent diagnostics. Reference to particular steps in this flowchart will be by reference to sequence step number.

Sequence Step M1 – X-IDLESCAN 120

Enter From: M19 when $\overline{\text{DE STS}}$; M16 when $\overline{\text{CHAIN}}$ (entry from M16 only when not chained).

Function: Scans to find pending status in subsystem such as interrupts, device ends, etc.

Exit To: M2 at end of scan or detection of interrupt, device end, or status to be reported to CPU, raise REQIN upon exit; M3 when trapped by channel or hardware.

Sequence Step M2 – X-IDLEPEND (A Part of X-IDLESCAN 120)

Enter From: M1; M20 when $\overline{\text{SUPPRO}}$ (M20 entry only when SUPPRO from channel is inactive which indicates channel has completed its sequence).

Function: Wait for channel SELO.

Sequence Step M3 – X-Trap 122

Enter From: By trap only.

Function: On trap by channel, logic 150 or 151 set branch conditions in branch control 41. Microprogram scans these branch conditions to enter a microprogram corresponding to a channel command.

Sequence Step M4 – Initial Selection 125

M4A Function: Perform initializing functions as described in patents showing channel operations. Below are particular functions related to concurrent diagnostics as implemented in I/O controller 11.

M4B Function: BOC Not Chained, Go to M4C; BOC Chained, skip M4C, go to M4D (maintain diagnostic mode). (Never chained on first command of a chained sequence).

M4C Function: Reset all LSR diagnostic flags. This is done on first command of any chained sequence initiated by an SIO (start I/O). See remarks of effect on concurrent diagnostics. Since chaining has been broken, CPU is indicating to I/O controller that the diagnostic procedures have been completed. Accordingly, all diagnostic flags including BLT INT are reset for enabling usual data processing operations.

M4D Function: Initial status bytes from LSR 75 are transferred to CBI with STATIN activated on CTI in accordance with patents describing channel operations. The chained condition in I/O controller 11 is reset if SUPPRO is inactive and continues set if SUPPRO is active. This enables the CPU to either selectively continue the chain or break it after execution of the command in step M5. CUB is activated in the channel interface not chained.

Sequence Step M5

Function: Detect for a rewind (REW) or data security erase (DSE).

Exit: 0 exit to M10 for executing command. 1 continue on testing chain.

Sequence Step M6

Function: Test for chained condition in an interface.

Exit: 0 exit to M9. 1 continue testing for forcing unusual conditions on interface.

Sequence Step M7

Function: Test LSR flag to see if device busy (DVE BSY) is to be sent to CPU. 1 exit to M10 for executing command. 0 perform M8.

Sequence Step M8

Function: Set LSR hold status. This status indicates a freestanding or time-consuming operation to be performed by an I/O device upon completion of initiation of I/O device function. CU will continue to do other things and will not send ending status to channel for device until a DVE is received.

Sequence Step M9

Function: Set LSR REW/DSE FLG. This indicates to the microprogram that an REW/DSE is being performed by the addressed MTU. There is one flag for each I/O device or MTU. This flag is used during IDLESCAN 120 for checking whether or not the REW/DSE is still being performed by the address MTU.

Sequence Step M10

Function: Executes channel command. This may be a read, write, sense, or print in accordance with I/O subsystem functions as related to the CPU.

Sequence Step M11

Function: Sense for REW/DSE. 0 exit to M13 for assembling ending status (do not have to wait for completion of I/O device operation). 1 exit to M12.

Sequence Step M12

Function: Check for DVE from device doing REW/DSE.

Exit: 0 device has completed free-standing operation. Return to 1 for scanning activity of other devices. 1 wait loop for completion of I/O device operation.

Sequence Step M14

Function: Assemble ending status. Various indicators in LSR 75, as well as latches in CU, are sensed and assembled into a fixed number of sense bytes for transmittal to the I/O channel simultaneously with STATIN in step M15.

M14A Function: Sense for blocking interrupt flags, i.e., determine whether or not the unit check (UC) can be sent to channel.

Exit: 1 exit directly to M15 for sending ending status to CBI. 0 block interrupt is off, CU must check for UC condition.

M14B Function: Check LSR 75 for "send UC" flag.

Exit: 0 not UC, exit directly to M15. 1 UC condition is sensed without a block interrupt. Exit to M14C for adding UC to ending status.

M14C Function: UC sense bit in LSR status byte is set in preparation for sending UC status to channel in CPU.

Sequence Step M15

Enter: Steps M14A, B, or C.

Function: Transfer status information to CPU. Status byte from LSR 75 is supplied to CBI while simultaneously STATIN bit is activated on CTI. If SUPPRO is received from connected channel, the chaining latch in CU is set for continuing the diagnostic or chaining operation.

Sequence Step M16

Function: Check for chaining condition.

Exit: 0 return to M1 for IDLESCAN operation, i.e., all channel commanded functions have been completed. 1 continue on chained operation.

Sequence Step M17

Function: Reset all CTI's.

Sequence Step M18

Function: Check for ARM CUB flag.

Exit: 0 to M20. 1 exit to M19.

Sequence Step M19

Function: ARM CUB sets flag in LSR 75 for supplying a CUB signal in response to the next received channel command (note that chained condition is maintained).

Sequence Step M20

Function: Since chain command has been received, SUPPRO is active. Wait loop in M20 until SUPPRO is deactivated, then go to step M2.

With regard to the above flowchart, in step M4B, the CU will never be chained if the command being received is the first command in a set of chained commands of the only command. Accordingly, the block interrupt flag (BLK INT FLG), as well as all other diagnostic flags, is reset in step M4C. To maintain the BLK INT FLG during a chained diagnostic operation for preventing the control unit from interrupting with ending device status, all SIO's must have a SET DIAGNOSE command with a channel control word (CCW) indication BLK INT FLG being set. This set of operations interlocks the diagnostics from other data processing operations which are operating concurrently. Data processing operations, whether or not chained, do not use SET DIAGNOSE; and, therefore, the BLK INT FLG will never be set during normal data processing operations. Also, upon dropping a chained condition by not supplying SUPPRO, the block interrupt and other diagnostic flags are reset enabling the CU to return to data processing operations. Accordingly, the BLK INT FLG will only be activated from the SET DIAGNOSE following an SIO to the beginning of the next SIO.

Testing Stackable Device Status

This section describes three tests in simplified flowchart form using the BLK INT FLG set forth in the microprogram flowchart. The first portions D1 and D2 set up the various tests. Test 1, steps D3–D10, concurrently tests stackable DVE STS for all devices attached to a given CU. Test 2, steps D11 through D16, tests the ability of a CU to maintain stackable status while performing other commands. Test 3, steps D17–D24, concurrently tests pending DVE STS on an SIO.

The below flowchart represents a program within a CPU connected to the CU having the microprogram flowcharted above.

Setup Tests

Program Step D1

Function: Set DX to SIO. The address X of the first device to be tested for stackable status is set in an SIO instruction to be sent to a channel processor.

Program Step D2

Function: SET DIAGNOSE and its CCW. The BLK INT FLG is set, together with the chaining flag. The chaining flag causes the channel processor to supply SUPPRO upon each STATIN from CU.

Test 1 — Check Stackable DE's

This concurrent test verifies CU's ability to stack DEVICE END indications.

Program Step D3

Function: Issue SIO instruction including issuing SET DIAGNOSE and its CCW.

Program Step D4

Function: Cause I/O OP to be executed.

Program Step D5

Function: Increment X to next address.

Program Step D6

Function: Determine whether X=K, where K is a number of devices. If not, return to D3; if yes, continue to D7.

Program Step D7

Function: SET DIAGNOSE instruction with CCW resetting BLK INT and resetting chain flag. This operation is preparing to complete the diagnostic operation enabling the CU to return to data processing functions.

Program Step D8

Function: Issue SIO with SET DIAGNOSE set up in D7. Issue a command to the I/O program "wait."

The WAIT Macro

This is a macroinstruction used in OS 360 and OS 370 with regard to supervising a task, in this case, an OLT function having a subtask performed by IOS. The control program has a task control buffer (TCB) for each task in the system including the diagnostic task. The TCB has identification of the location of core storage areas allocated to such tasks. Once control has passed from the control program to the task, i.e., OLTEP or OLT, the task management programs in OLTEP keep track of the task current state. Such current state depends upon the readiness of the task program (OLT, in this case) to use the CPU. If such OLT can make immediate use of a CPU, it is READY. While it is actually using the CPU, the task is ACTIVE. The other state is WAIT. During the WAIT state, the task is inactive because more information is required from the I/O subsystem, for example. In this particular instance, the task must wait until all DE's are received from the I/O subsystem being diagnosed. The completed use of a resource, i.e., all DE's have been received, the appropriate resource manager takes control. The OLT will get control of the CPU only if higher priority tasks have been performed. Tasks controlled by initiator/terminator programs are well undetstood with respect to OS 360 and are not further described.

Program Step D9

Function: This step is entered after the WAIT macro has been satisfied. The step checks to see whether or not DE's were received from all activated devices. If yes, the OLT is completed. If no, step D10 is performed.

Program Step D10

Function: This step causes a printout of the error in that not all DE's were received. Additionally, errors may be logged in outboard data recorder (ODR) for later analysis. ODR is a programmed data log keeping operational status.

Test 2 — Concurrent Testing of Maintaining Stackable Status While Subsystem Performs Another Command This test initiates operation to the CU in the first device. It then initiates a second operation in a second device having an extended time duration such as read/-write in the burst mode. It then checks for a DE upon completion of the BURST command from the first device to see whether or not the CU stacked the DE. If it was not stacked, an error is logged.

Program steps D1 and D2 are the same except that chained instructions are different. A BURST command such as read or write, plus a control command (rewind, space OP, etc.), is performed while maintaining the BLK INT flag. This test also exercises the subsystem in an intermix situation, i.e., two devices are doing two different functions at the same time.

Program Step D11

Function: An SIO channel command is issued followed by a SET DIAGNOSE set up in accordance with D2. Chaining is initiated.

Prgram Step D12

Function: A BURST (another) command is sent to the subsystem chained to a control command on a different device.

Program Step D13

Function: A second SIO channel command followed by a SET DIAGNOSE which resets the BLK INT FLG.

Program Step D14

Function: In response to D13, was a CUB signal received If yes, exit test; if no, proceed to D15.

Program Step D15

Function: Test for DE from addressed MTU or I/O device. If DE was received, exit test. Note: A DE should be received when CUB is no. If no DE or no CUB, proceed to D16.

Program Step D16

Function: Print detected error condition and log same within CPU for further analysis. Exit OLT.

Test 3 — Concurrent Test on Maintaining Stackable Status While Performing a Second Command This test, by sensing for either a BUSY or DE in an SIO following a previous SIO initiating a command, concurrently tests pending DE status in the addressed CU. The test can be performed for each device; however, it is primarily a test directed toward response of a CU. BLK INT blocks SUPPRI when CU responds to a second SIO from the channel. The status resulting from the first SIO should be stored (stacked) in CU during the performance of the second SIO. This concurrent test verifies that ability.

Program Step D17

Function: Issue SIO SET DIAGNOSE with BLK INT active as set up in D2.

Program Step D18

Function: Initiate a command function in CU with regard to device having address X.

Program Step D19

Function: Increment address X by 1.

Program Step D20

Function: Issue BURST command to device X+1.

Program Step D21

Function: Issue SIO to CU with SET DIAGNOSE resetting BLK INT.

Program Step D22

Function: Issue WAIT macro to IOS for receiving DE from device X.

Program Step D23

Function: Check for received DE using a timeout in accordance with the length of the issued BURST command to device X+1. Go to step D24 if no DE is received; otherwise, exit Test 3 returning CPU to OS.

Program Step D24

Function: The error is printed and logged for further error analysis by other programs.

Test 4 — Concurrent Testing Ending Control Unit End (CUE) Satus on SIO (C1–C8)

This tests the capability of a CU to send a CUE upon receipt of an SIO of channel command.

Program Step C1

Function: Set a device address into an SIO instruction. SET DIAGNOSE instruction with a CCW having a BLK INT and chain a FILE OP to SET DIAGNOSE.

Program Step C2

Function: Send SIO to CU for device DX.

Program Step C3

Function: Send SIO FILE OP for device X.

Program Step C4

Function: Test for CUB. If no CUB (FILE OP was not executed), print an error. If CUB is received, proceed to step C5.

Program Step C5

Function: Time out FILE OP. At end of time out, proceed to C6.

Program Step C6

Function: Send a second SIO to CU for device X+K, where X is the device doing the FILE OP and K is a constant for addressing a second I/O device. Then, check for responses in steps C7 and C8.

Program Step C7

Function: Check for CUB. If CUB is received, exit test as everything is operating O.K. If no CUB, proceed to step C8.

Program Step C8

Function: Test for CUE. If CUE has been received, exit normally, If it has not been received and CU is not busy (CUB = 0), an error should be logged since a CUE should be sent upon completion of FILE OP. Note: BLK INT being blocked permits the second and third SIO's to be performed by the CU and enables sending CUB and CUE to initiating channel for diagnostic purposes.

In a variation of the above flowcharted test, a CUB test can be performed before the FILE OP is timed out in C5. This would be an independent test of CUB. Then, after timing out the FILE OP, the test will include a CUE test; hence, testing both CUB and CUE. Additionally, a test for DE can be provided after receiving a CUE. If the DE is not received from device X, then an error is logged.

Test 5 — Concurrent Checking Nonstackable Status (C10–C21)

In an I/O subsystem using MTU's, there are two types of status—stackable and nonstackable. Stackable status is status that can be held by the control unit while performing operations on other devices. Nonstackable status is that status that must be accepted by the CPU before another operation is initiated on the CU. Accordingly, it is important for CU to maintain nonstackable status until it is accepted by the CPU. This concurrent test tests such ability.

Program Step C10

Function: Set device address X into an SIO instruction. Chain it to a SET DIAGNOSE with a CCW having its BLK INT FLG active. Set chaining.

Program Step C11

Function: Issue SIO instruction with chained SET DIAGNOSE. Rewind an MTU to beginning of tape (BOT). Write one record on the tape by issuing a burst write to stop the tape. With BLK INT on, issue a backspace record (BSR). This moves tape between the first record and load point. Issue a second BSR. As a result of second BSR, CU should issue a CUE, DE, UC. With BLK INT active, Uc will not be supplied to channel with the pending nonstackable status (tape is at load point and should not receive a BSR). If another MTU is addressed and was an SIO, a CUB should be received since the CU cannot complete its operation.

Program Step C12

Function: Issue SIO to device address X+K, where K is a constant.

Program Step C13

Function: Was a CUB received from the CU If yes, a response has been received; proceed to C15. If no, log an error in C14.

Program Step C14

Function: Log error detected in step C13.

Program Step C15

Function: Issue a second SET DIAGNOSE channel command with a CCW resetting BLK INT.

Program Step C16

Function: Issue a WAIT macro for device X in order to receive the status generated in step C11.

Program Step C17

Function: Was appropriate status received, i.e., CUE, DE, and UC Note: BLK INT is now erased and UC will be transferred to channel. If yes, proceed to step C19; if no, proceed to C18.

Program Step C18

Function: Log an error based upon improper response. Note: all three responses should be received; otherwise, an error will be logged. The absence of one of the three will indicate the location of the error in the CU.

Program Step C19

Function: Issue SIO's to device X and device X+K. At this time, both devices should be available to the CPU.

Program Steps C20 and C21

Function: Check whether devices X and X+K are busy. If either or both are busy, log an appropriate error. If neither are busy, exit the test.

Test 6 — Concurrent Testing of Enable/Disable With and Without Pending Device Status (C30–C37)

On some I/O sybsystems, there is a manually actuable enable/diasable switch. When the switch is in the enable position, operations with the connected data processing system are enabled. When the switch is in the disabled position, only off-line operations are permitted with all signal transfers to and from the data processing system being inhibited. The present test provides for concurrent testing of the enable/disable switch and its effect on pending status. An operator must intervene for actuating the enable/disable switch in accordance with instructions printed out at the operator's console.

Program Step C30

Function: Perform steps D1–D6 of the above flowchart. This stacks DE status wihin the CU being diagnosed. Note: BLK INT is active.

Program Step C31

Function: Print "drop enable" in the operator's console for an operator to switch the enable/disable switch to the disable position.

Program Step C32

Function: Send SIO to the CU just disabled along with SET DIAGNOSE with a CCW BLK INT. This program step will not be initiated until after the operator has verified the enable/disable switch has been set to the disable position. The OLT will be keyed to a console input interrupt.

Program Step C33

Function: Verify that the I/O subsystem appeared to be off-line. If it went off-line, an error condition occurs. The I/O subsystem must remain on-line until all stacked status has been reported to CPU. If the I/O subsystem is still enabled, as it should be, step C34 is entered without logging an error.

Program Step C34

Function: Send SIO with a SET DIAGNOSE with the CCW resetting BLK INT.

Program Step C35

Function: Reset all DE's in CU. This is cleared by the channel receiving all of the DE's.

Program Step C36

Function: Supply another SIO to the I/O subsystem. The response should be from the channel processor that the I/O subsystem is now off-line. If it is not off-line, an error should be logged. In either event, proceed to step C37.

Program Step C37

Function: Print out "set enable" to the operator's console and exit the test.

The above flowchart verifies operation of the enable/disable switch, both with pending status when the I/O subsystem is not allowed to go off-line and when there is no pending status such that the I/O subsystem should go off-line upon setting the switch to the disable position.

Test 7 — Concurrent Test of all DVE BSY's on a Simultaneous Basis

This test actuates all devices on a free-standing operation such as rewind, after all the MTU's are in a rewind condition. An SIO is issued to all devices, with a busy signal being received from all of them if the operation is proper. BLK INT is necessary in order to obtain the DVE BSY signal.

Program Step C40

Function: The test is set up in accordance with steps D1–D6 with the chained operation being rewind for all devices, plus in the SET DIAGNOSE CCW the BLK INT is activated as well as the force DVE BSY bit.

Program Step C41

Function: An SIO is given for each and every device connected to the CU such that a rewind is initiated.

Program Step C42

Function: A second SIO with a SET DIAGNOSE maintaining the BLK INT and force DVE BSY set for each and every device in accordance with steps D3–D6. A DVE BSY should be received for each and every device. If not, an error is logged. If it is received, the OLT is exited with the subsystem being reset to normal conditions by a second SET DIAGNOSE resetting the BLK INT and DVE BSY flags and breaking the chain.

Test 8 — Establishing Concurrent Scope Loops Using BLK UC FLG

The subject flag is effective only for ending status, i.e., blocks interrupts for ending status only—not for intermediate status. It enables maintenance personnel, via an OLT or tuility program, to enter a failing chain of CCW's that will continuously loop in the channel independent of the CPU. That is, a channel processor has a transfer in channel (TIC) which enables a set of chained CCW's, i.e., commands, to be repeated thereby establishing a repetitive loop suitable for presenting signals on an oscilloscope. This can be done on a concurrent basis as set forth below. Repeating program loops is so well known it is not described.

Such TIC is usually broken based upon a UC interrupt and requires a second SIO to restart the commands. By suppressing the UC by setting the BLK UC FLG, the channel processor which is intermediate to the CPU and the I/O subsystem never sees the interruption condition and therefore will continuously execute the command loop at channel speeds, which are much higher than CPU channel processor I/O subsystem speeds. The I/O controller assembles ending status in a normal manner. The microprogram then proceeds to the branch operation which checks for BLK UC. Since the flag has been set by the SET DIAGNOSE CCW, normal ending status is supplied to the channel processor. The CU then retruns to IDLESCAN routine awaiting the next channel processor command. With a TIC in the channel processor, the command comes almost immediately such that the command is repeated and ending status is again assembled with the process being repeated until the operator supplies a command through the operator's console to supply an SIO resetting BLK INT to the channel processor. The programs in the CPU are a utility that sets a selected command sequence that would fail with CCW BLK INT inhibiting ending status. The utility can run concurrently with data processing operations with the command being erased through the operator's console. Additionally, by manually dropping the ready condition on the device associated with the TIC loop, a UC initial status is given which is not blocked by the BLK UC FLG. This initial UC breads the command chain and the diagnostic. BLK UC stops CU from sending status at the end of a burst operation (read, write). Compare with BLK INT which inhibits sending SUPPRI.

A modification to such a utility is an automatic restart. Upon the resetting of ready by the operator, the utility could restart the device and continue on with the loop. By dropping the loop, which releases the channel processor for other operations, the concurrency reaches to the channel level, i.e., the channel can be used for diagnostic purposes during scoping; then, releasing for data processing operations by dropping ready on the addressed MTU. By raising ready, the automatic restart within the utility restarts the TIC loop for more diagnostics.

While the invention has been particularly shown and described with reference to preferred embodiments thereof, it will be understood by those skilled in the art that various changes in form and details may be made therein without departing from the spirit and scope of the invention.

What is claimed is:

1. The method of establishing peripheral sybsystem operation in a programmable I/O controller via I/O command signals from a data processing system connected to said controller, the improved method including the following steps in combination:

sending command signals from said system to said controller chained with signal code permutations indicating a desired set of program-affecting connections in said I/O controller plus a first control signal indicating such program-affecting connections are to be maintained, responding to said command signals and said first control signal to set up and maintain said program-affecting connections in said controller in accordance with said code permuations, then selectively sending data processing type command signals from said system to said controller in association with or without said first control signal for commanding said controller to perform data processing type operations that are relatable to said system, and responding to said data processing type command signals in accordance with said program-affecting connections in said controller only when said first control signal is received from said system in timed association with said additional command signals.

2. The method set forth in claim 1 further including the steps of:

maintaining said first control signal in said controller while sending a plurality of additional command signals including said data processing type command signals;

then erasing said maintained first control signal;

then sending further command signals including some of said data processing type command signals from said system to said controller; and interpreting said further data processing type command signals in said controller independent of said signal code permutations.

3. THe method set forth in claim 2 further including the steps of:

including a sequence of command functions in said additional command signals not performable by said controller without said maintained program-affecting connections;

executing said last-mentioned sequence of commanded functions to result in error signals, and maintaining controller action via said program affecting connections regardless of such error signals for enabling such error-causing sequence to be executed.

4. The method set forth in claim 2 further including the steps of:

establishing a branch-on-condition sequence in said controller after receiving each of said additional command signals, sensing for said first control signal in said controller before attempting execution of operations indicated by said additional data processing type command signals, while receiving said first control signal in said controller, branching to a microprogram for executing such operation indicated by said additional data processing type command signals including executing said additional data processing type command signals indicated operation with said program-affecting connections to thereby alter said branch-on-condition sequence and, when not receiving said first control signal in said controller, clearing said program affecting connections and then executing an operation indicated by said additional data processing type command signals.

5. The method set forth in claim 2 further including the steps of:

operating a magnetic tape handler, indicating motions of motive portions for said handler by some of said additional data processing type command signals, and analyzing said controller in accordance with certain ones of said additional command signals.

6. The method set forth in claim 2 further including the steps of:

sequentially supplying plural sets of said signal code permutations, maintaining only one set of said signal code permutations in said controller at a given time, erasing a first set of said signal code permutations whenever said first control signal is removed, and removing a second set of said signal code permutations only after receiving a command signal indicating a new I/O sequence.

7. The method set forth in claim 2 wherein said command sequences include a plurality of separate I/O control chains of CCW's, plural chains being performable during one chained connection, initiating each chain by a given CCW, the improved method further including the steps of:

changing said program affecting connections for some of said given CCW's, responding to certain ones of said CCW's within said sets of chained CCW's to set certain ones of said program affecting connections, and maintaining said certain ones program affecting connections until said given CCW is received, and then resetting said certain ones of said program affecting connections while maintaining said chained connection.

8. The method set forth in claim 2, further including the steps of:

responding to said signal code permutations for indicating a function to be performed, interpreting a ginve one of said additional data processing type command signals for setting data flow conditions in said controller for the code permutation indicated function, after receiving said additional data processing type command signal, executing said indicated function in said peripheral sybsystem, and in the absence of said signal code permutations, performing, in said subsystem, predetermined functions other than said set indicated function.

9. The method set forth in claim 8 further including the steps of:

responding to other ones of said signal code permutations including setting a condition for affecting command signal performance, then after setting up said condition, responding to a set of subsequently received ones of said additional data processing type command signals to perform functions in accordance with said subsequently received additional data processing type command signals and said other ones of said signal code permutations, and interleaving said setting up code permutations with said data processing type command signals.

10. An improved I/O controller having program means with selectively actuable program connections which, when actuated, alter functions performed by said program means;

separate means for receiving and storing command signals and control words;

means for receiving control signals;

means responsive to first stored command signals and a first received one of said control signals to establish a set of said program affecting connections in accordance with code permutations in certain stored ones of said control words;

means responsive to second ones of stored command signals and to not receiving said first ones of said control signals to effect operation of said program means in accordance with said second ones of said stored command signals; and means responsive to said first control signal and said second ones of said stored command signals to modify operation of said program means in accordance with said program affecting connections.

11. The controller set forth in claim 10 further including:

means responsive to said program affecting connections for establishing a function to be performed in the controller; and means responsive to a given one of said additional command signals to indicate a direction of signal flow for a function indicated by said program connections.

12. The controller set forth in claim 11 further including:

channel connection means for connection to a channel;

device connection means for connection to a device;

data flow means for selectively transferring signals between said connection means; and signal processing means operatively associated with said data flow means and both said connection means for exchanging signals therewith, said program means being in said signal processing means, said means responsive to said first stored command signals generating control signals for actuating said data flow means to perform a given function with respect to said I/O device in accordance with said first-stored command signals, and another means further responsive to said program affecting connections to abort said given function; and means responsive to said another means to establish a given data flow in said data flow means independent of said device.

13. The controller set forth in claim 12 further including:

additional means in said signal processing means responsive to said first one of said received control signals for interpreting said program affecting connections in association with a given stored command signal; and means further operative to disassociate a given command performance with said program affecting connections while still maintaining said program connections.

14. The controller set forth in claim 13 further including:

other means in said signal processing means responsive to a function being performed for resetting said program affecting connections irrespective of receipt of said control signals.

15. The controller set forth in claim 12 including:

means in said channel connection means for receiving an execute control signal, means jointly responsive to said first one of said received control signals and said execute received control signal to actuate said program means to interpret said program affecting connections, and means further operative, in the absence of either one of said received control signals, to execute said command signals in a given manner independent of said program affecting connections.

16. The controller set forth in claim 12 further including program affecting connecti on storage means for receiving and storing signals indicating program affecting connections, means in said signal processing means responsive to a control signal received over said channel connection for fetching one of said program affecting connection indicating signals, and means interpreting said fetched signal in connection with a received and stored command signal.

* * * * *